March 1, 1966     J. E. SCHNOOR ET AL     3,238,509
CONTROL MEANS FOR A RANDOM ACCESS STORAGE SYSTEM
Filed Dec. 8, 1961     17 Sheets-Sheet 1

INVENTORS:
Joerg E. Schnoor
Richard G. Fisher
Arthur M. Angel

By Louis A. Kline
John J. Matlago
Nathan Cass
Their Attorneys

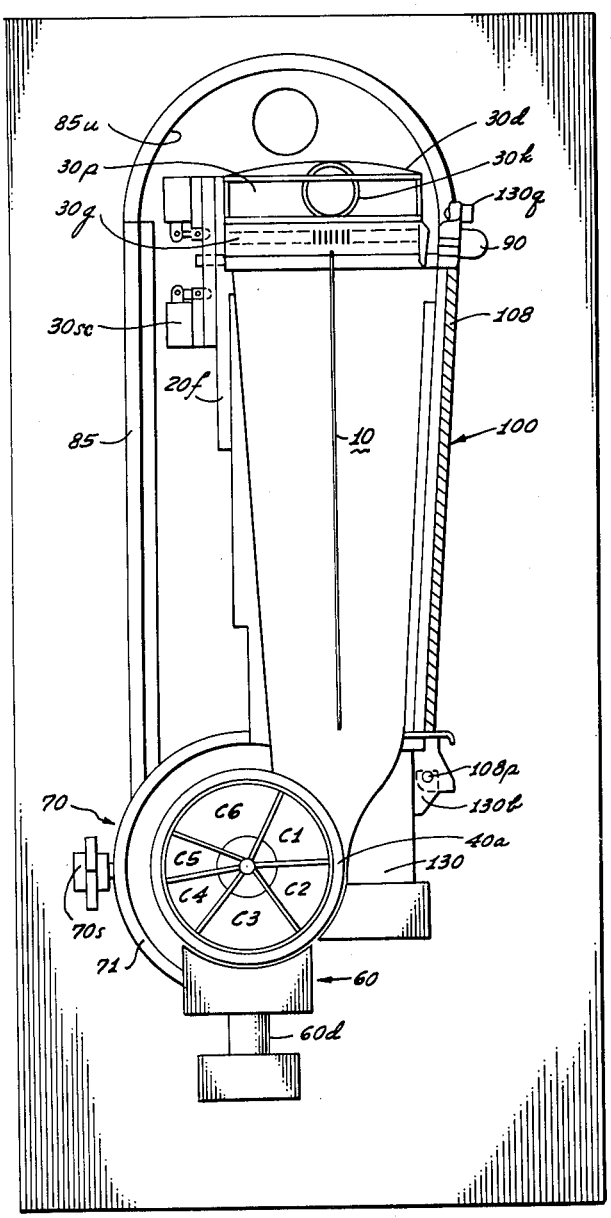

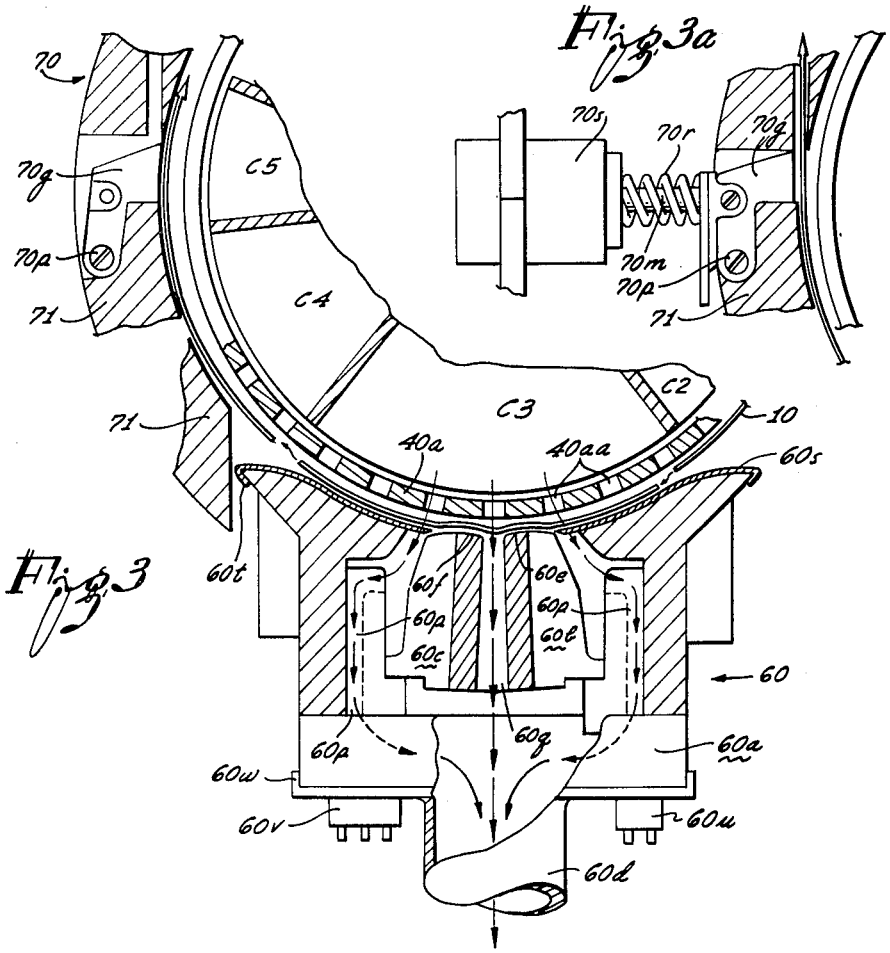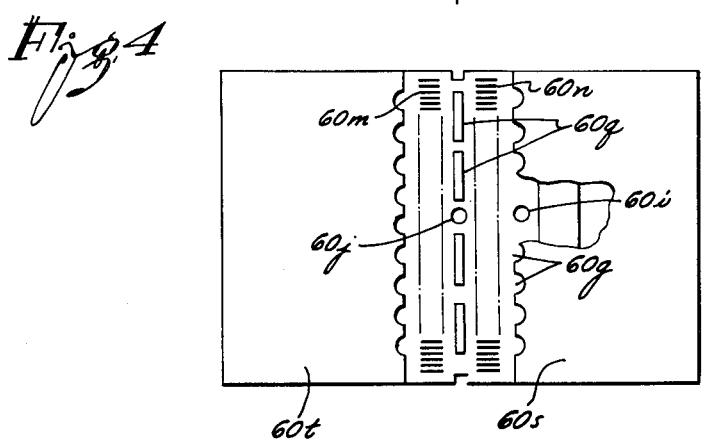

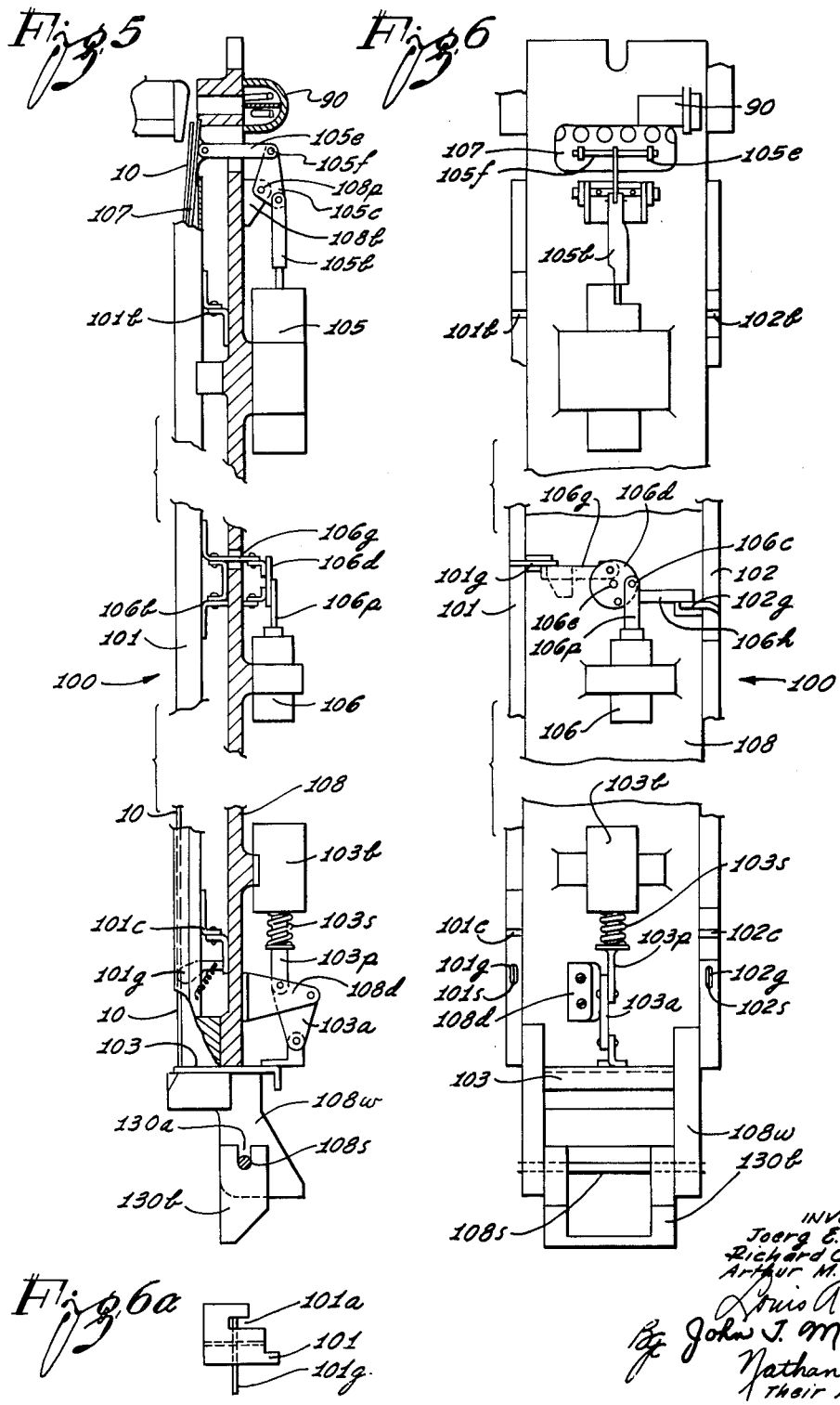

March 1, 1966    J. E. SCHNOOR ET AL    3,238,509
CONTROL MEANS FOR A RANDOM ACCESS STORAGE SYSTEM
Filed Dec. 8, 1961    17 Sheets-Sheet 5
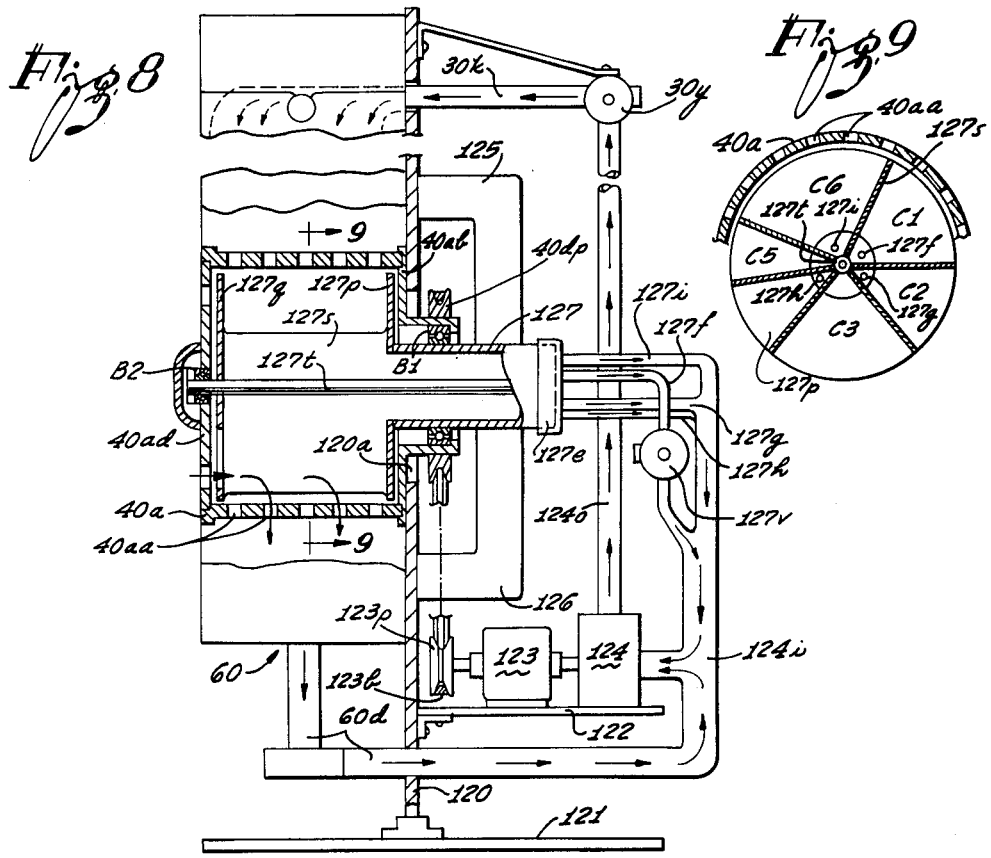
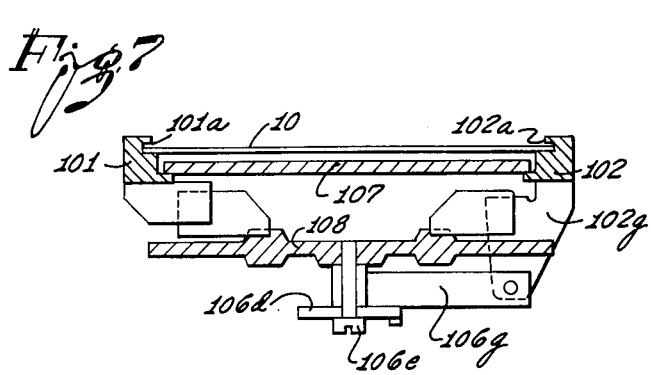
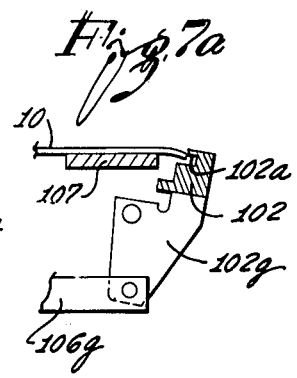
INVENTORS:
Joerg E. Schnoor
Richard G. Fisher
Arthur M. Angel
Their Attorneys March 1, 1966  J. E. SCHNOOR ET AL  3,238,509
CONTROL MEANS FOR A RANDOM ACCESS STORAGE SYSTEM
Filed Dec. 8, 1961  17 Sheets-Sheet 6
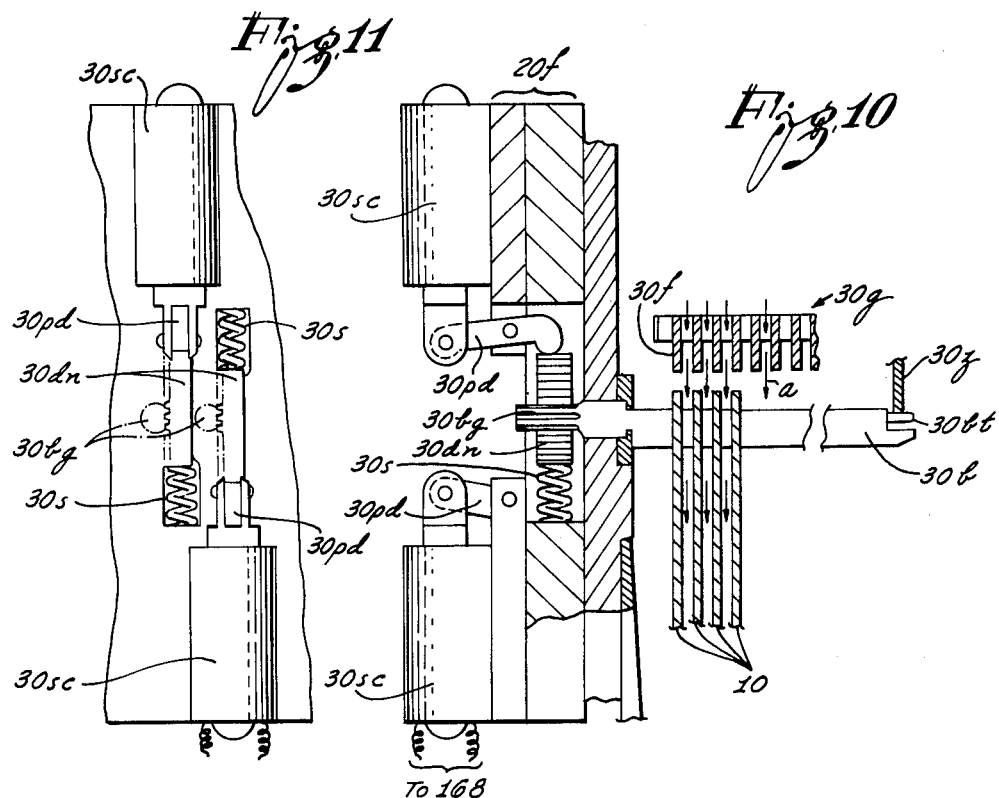
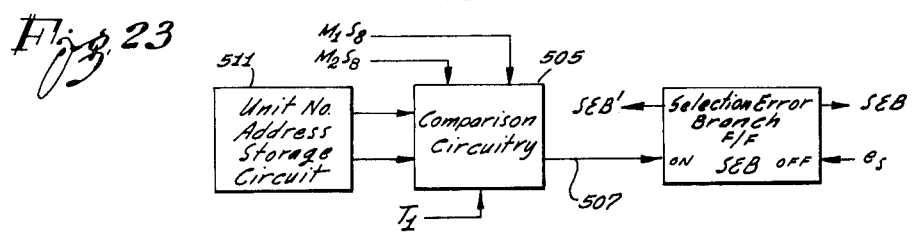
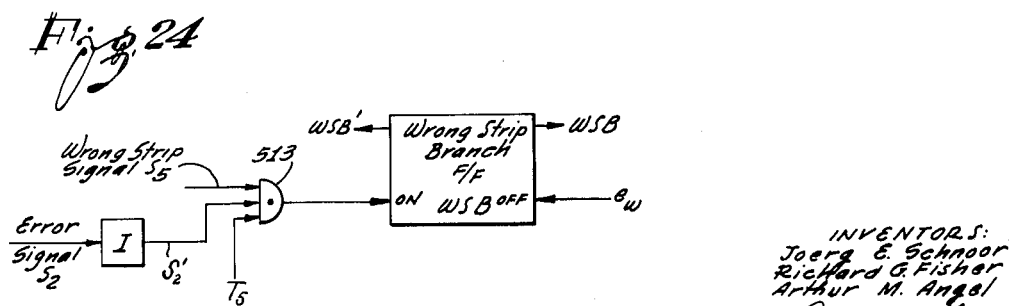
INVENTORS:
Joerg E. Schnoor
Richard G. Fisher
Arthur M. Angel
Louis A. Kline
By John J. Morlago
Nathan Cass
Their Attorneys March 1, 1966  J. E. SCHNOOR ET AL  3,238,509
CONTROL MEANS FOR A RANDOM ACCESS STORAGE SYSTEM
Filed Dec. 8, 1961  17 Sheets-Sheet 7
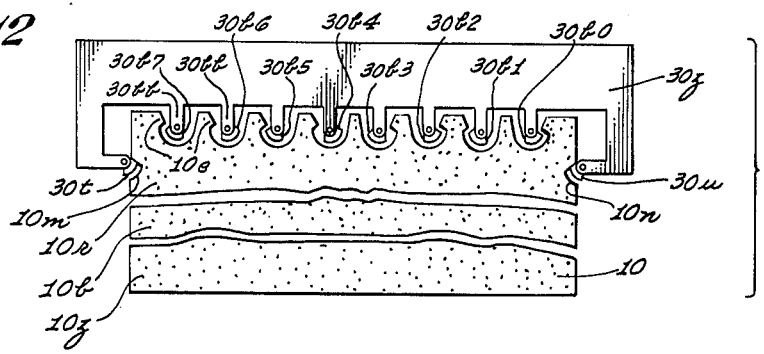
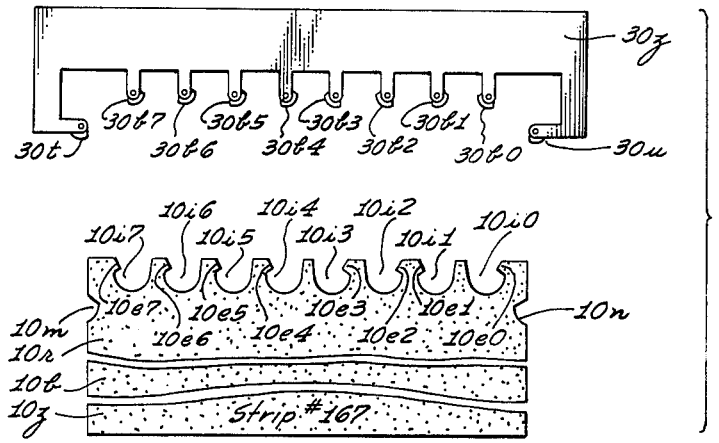
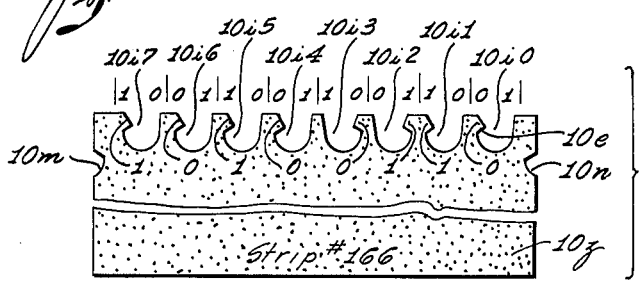
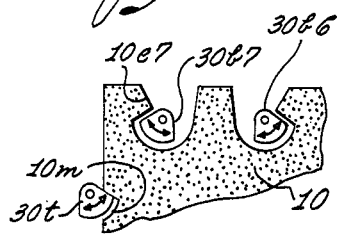

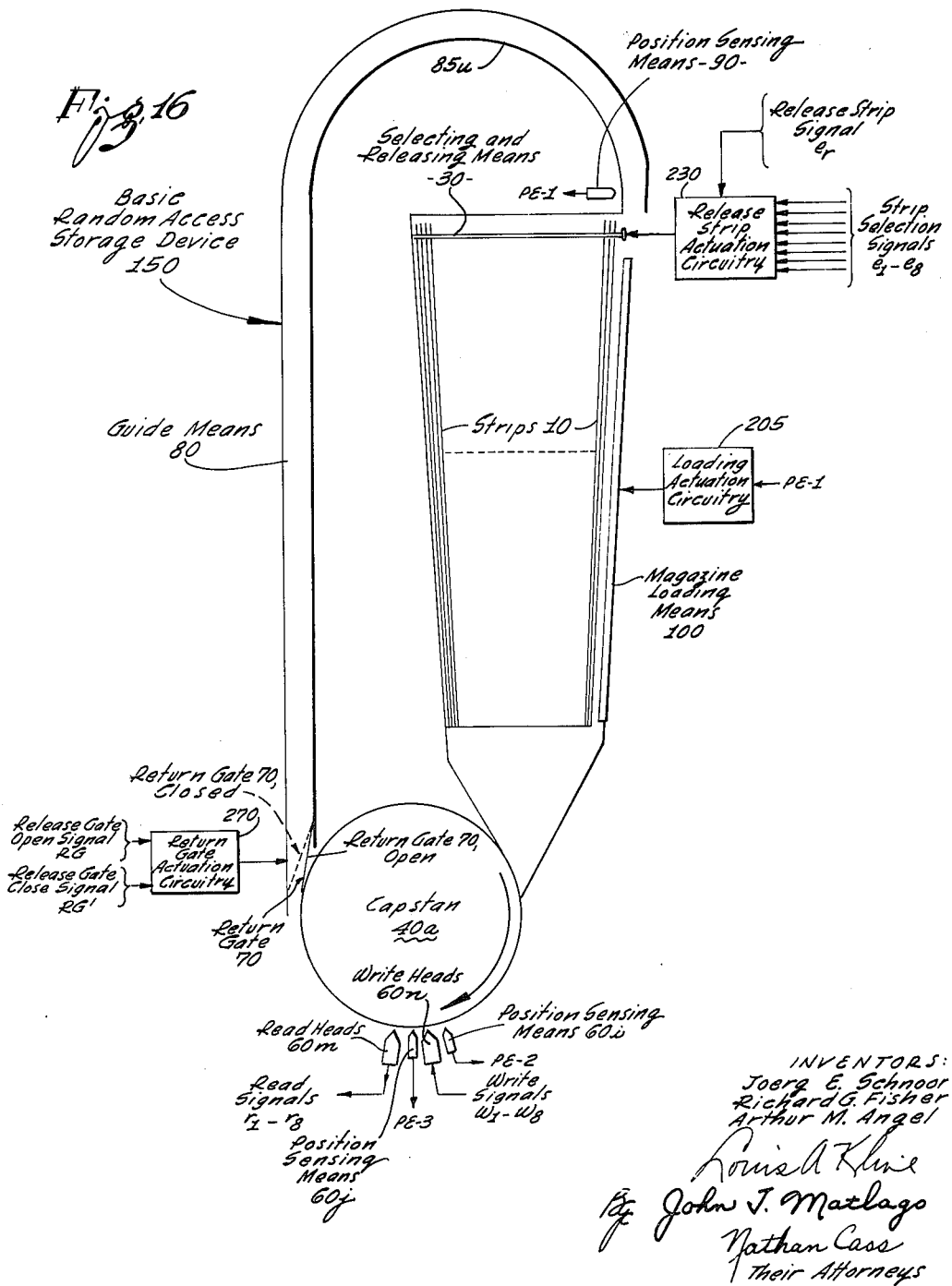

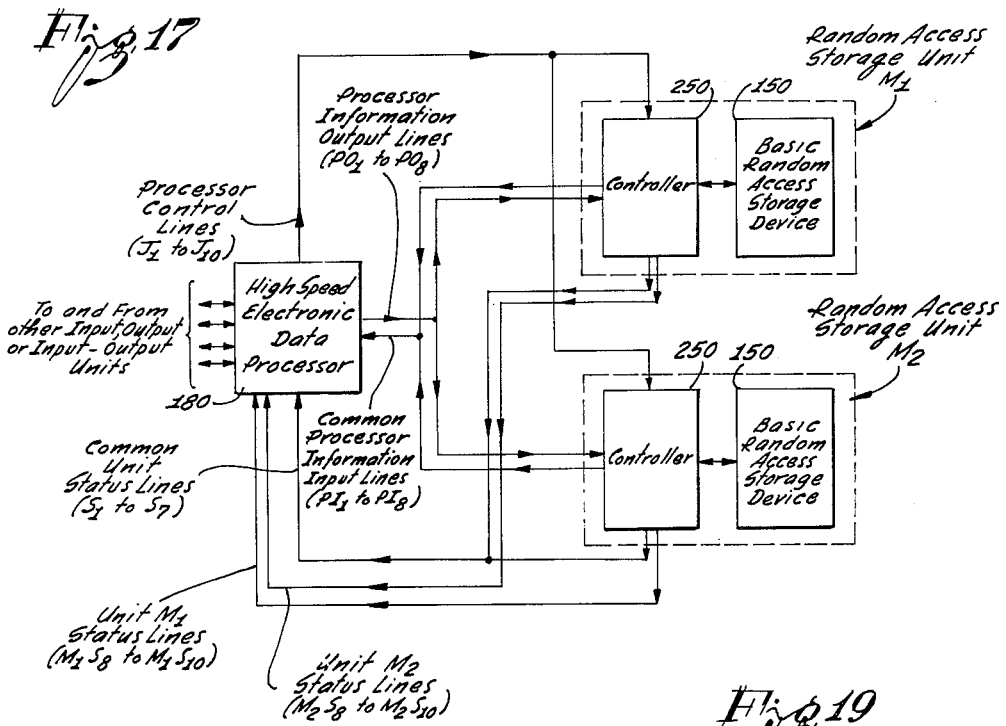
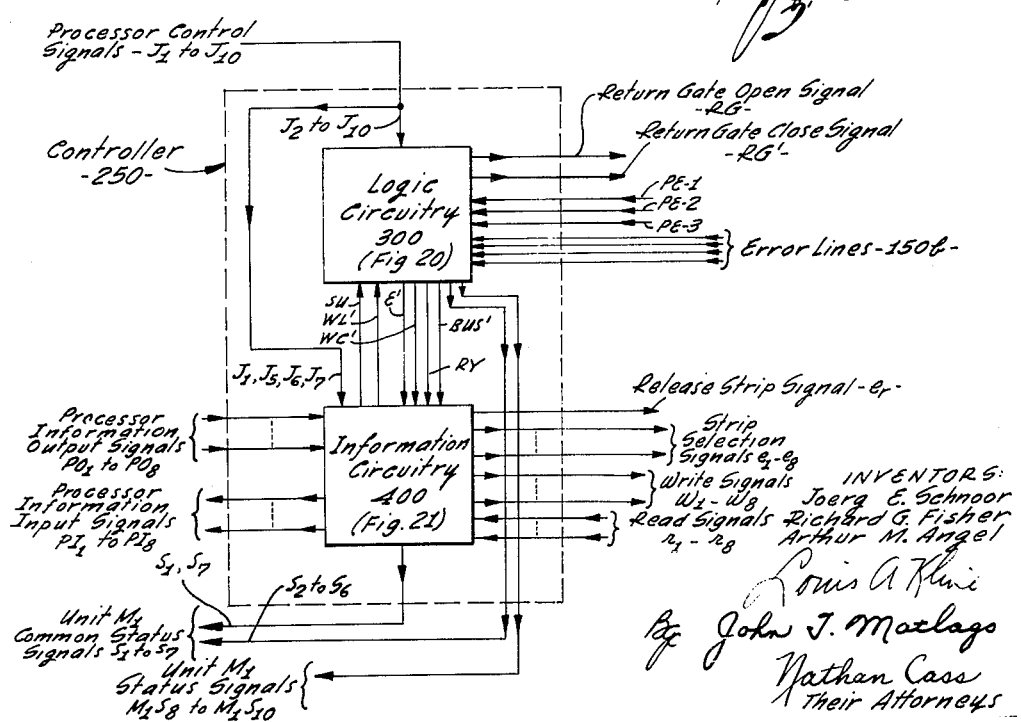

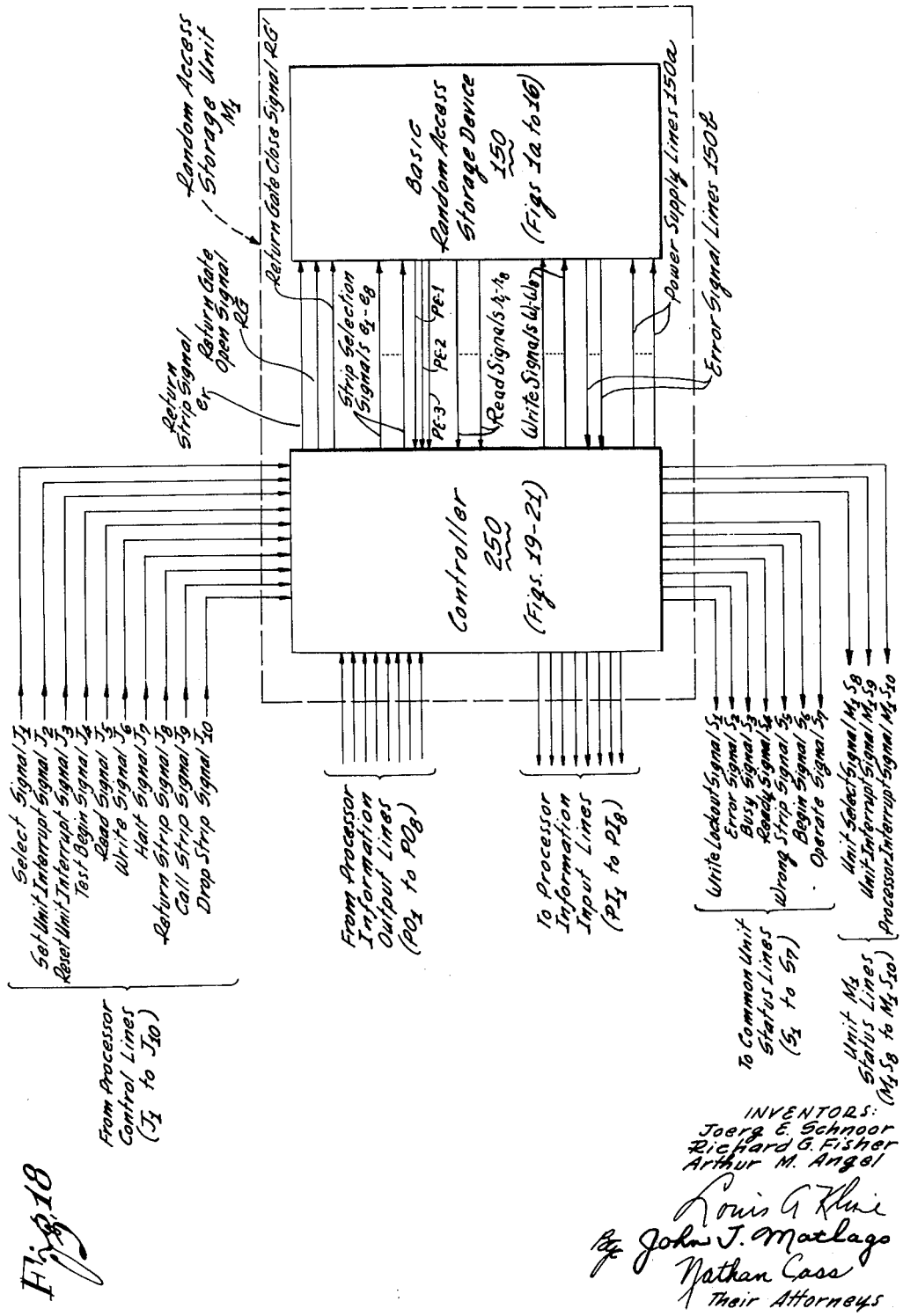

INVENTORS:
Joerg E. Schnoor
Richard G. Fisher
Arthur M. Angel
Their Attorneys

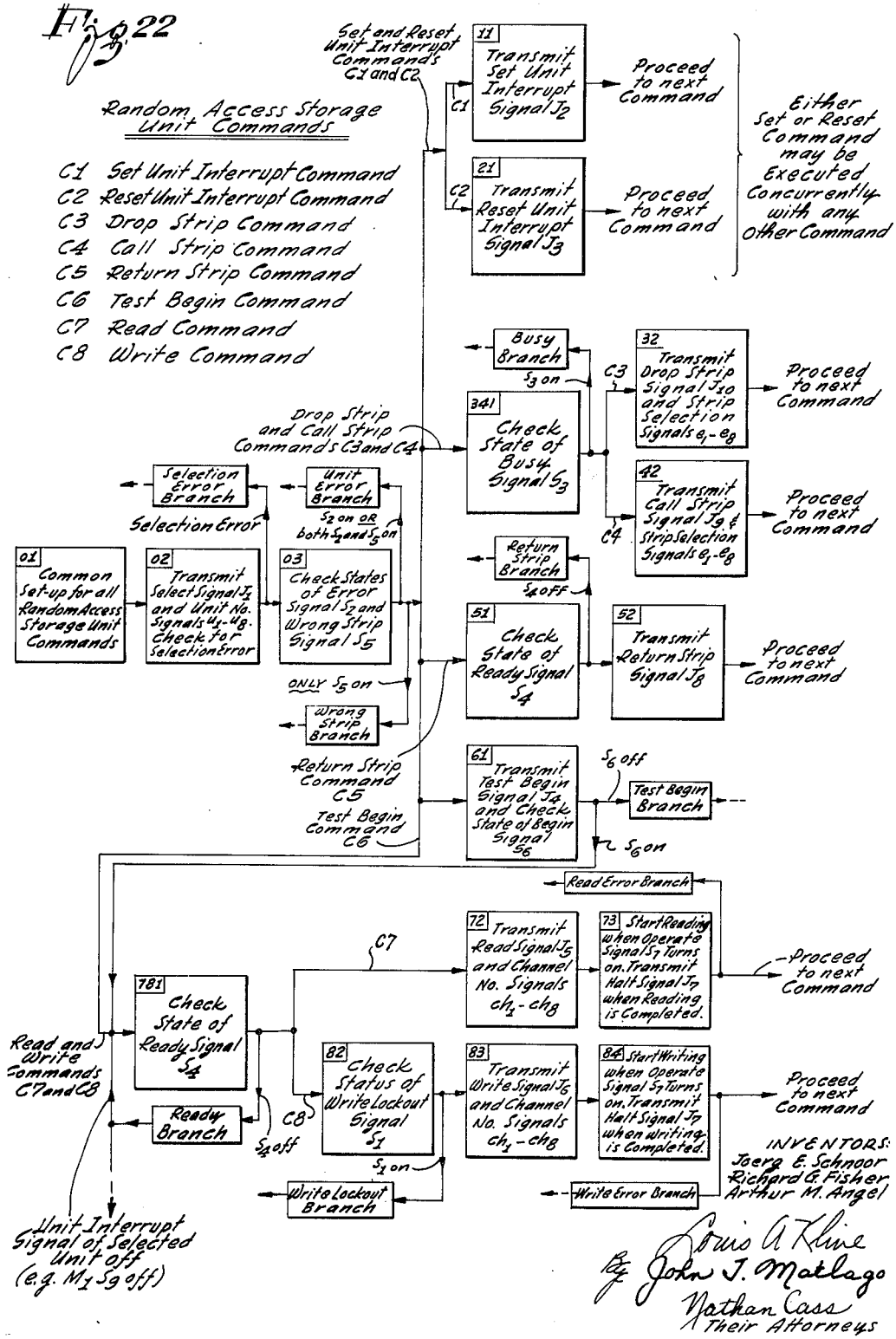

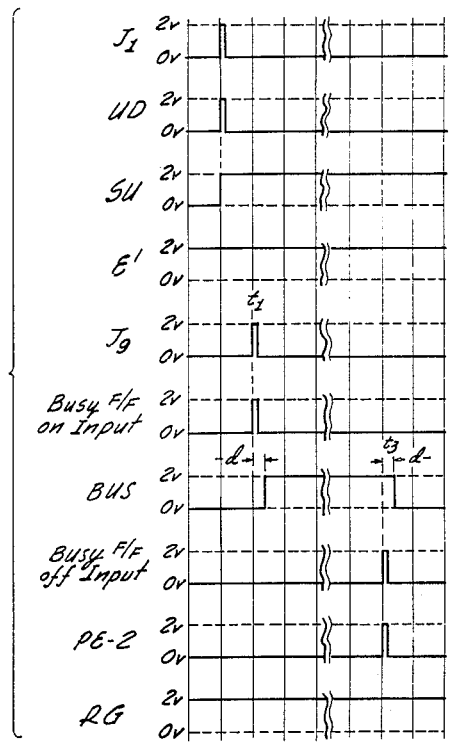

Fig. 26

| Control Signals | Approx Time (Milliseconds) | Location of Leading Edge of Strip | | | Select F/F | Unit Interrupt F/F | Busy F/F | Ready F/F | Position F/F | Processor-Interrupt F/F | Begin Gate | Read F/F | Write F/F | Operate F/F | Call Strip F/F | Command F/F | Return Gate Control F/F | Return Gate | REMARKS |
|---|---|---|---|---|---|---|---|---|---|---|---|---|---|---|---|---|---|---|---|
| | | Strip 1 | Strip 2 | Strip 3 | | | | | | | | | | | | | | | |
| C1 {Select Unit M₁(I₁) / Set Unit Interrupt (J₂)} C3{Drop Strip 1 (J₁₀)} | 000.00 | Strip 1 Rel. | | | | | | | | | | | | | | | | | Unit M₁ Selected and Set for Unit Interrupt Operation. No other Strip can be Released in Unit M₁ since Busy Signal S₃ is on |
| C6 {Select Unit M₁(I₁) / Test Begin (J₄)} CP {Read Strip 1, Ch#3 (J₅)} Halt (J₇) | 164.00 165.00 165.75 185.75 | 60 i 60 j | | | | | | | | | | | | | | | | | Unit M₁ Interrupts Processor Ch#3 Read Drivers Actuated Operate Signal S₇ turns on Strip 1, Ch#3 Processor Halts Reading } is Read |
| C4 {Select Unit M₁(I₁) / Call Strip 2 (J₉)} C6 {Select Unit M₁(I₁) / Test Begin (J₄) / Read Strip 1 / Ch#4 (J₅)} CP Halt (J₇) | 190.00 210.10 211.00 211.85 231.85 | | Strip 2 Rel. 60 i 60 j | | | | | | | | | | | | | | | | Unit M₁ Interrupts Processor Ch#4 Read Drivers Activated, Ready Signal S₄ Turns off Return Gate Opens to Return Strip 1 to Magazine Operate Signal S₇ turns on } Strip 1, Processor Halts Reading } Ch#4 is Read |
| C4 {Select Unit M₁(I₁) / Test Begin (J₄) / Write Strip 2} C8 {Ch#5 (J₆)} Halt (J₇) | 354.00 355.00 355.75 385.75 | | 60 i 60 j | | | | | | | | | | | | | | | | Unit M₁ Interrupt Processor Ch#5 Read & Write Drivers Activated Operate Signal S₇ turns on } Strip 2 Ch#5 Processor Halts Writing } is written into |
| C3 {Select Unit M₁(I₁) / Drop Strip 3 (J₁₀)} | 390.00 400.10 401.85 | | 60 i 60 j | Strip 3 Rel. | | | | | | | | | | | | | | | Drop Strip Signal J₁₀ Turns off Ready Signal S₄ Return Gate Opens to Return Strip 2 to Magazine |
| C6 {Select Unit M₁(I₁) / Test Begin (J₄) / Write Strip 3} C8 {Ch#6 (J₆)} Halt (J₇) | 554.00 555.00 555.75 585.75 | | | 60 i 60 j | | | | | | | | | | | | | | | Ready Signal S₄ Turns on Unit M₁ Interrupts Processor Ch#6 Read and Write Drivers Activated Operate Signal S₇ turns on Strip 3 Ch#6 Processor Halts Writing } is written into |
| C2 {Select Unit M₁(I₁) / Reset Unit Interrupt (J₃)} C5 {Return Strip (J₈)} | 585.75 600.10 601.85 | | | 60 i 60 j | | | | | | | | | | | | | | | Unit Interrupt Operation Terminated. Return Gate Opens to Return Strip 3 to Magazine |

INVENTORS:
Joerg E. Schnoor
Richard G. Fisher
Arthur M. Angel

Their Attorneys

Fig. 27

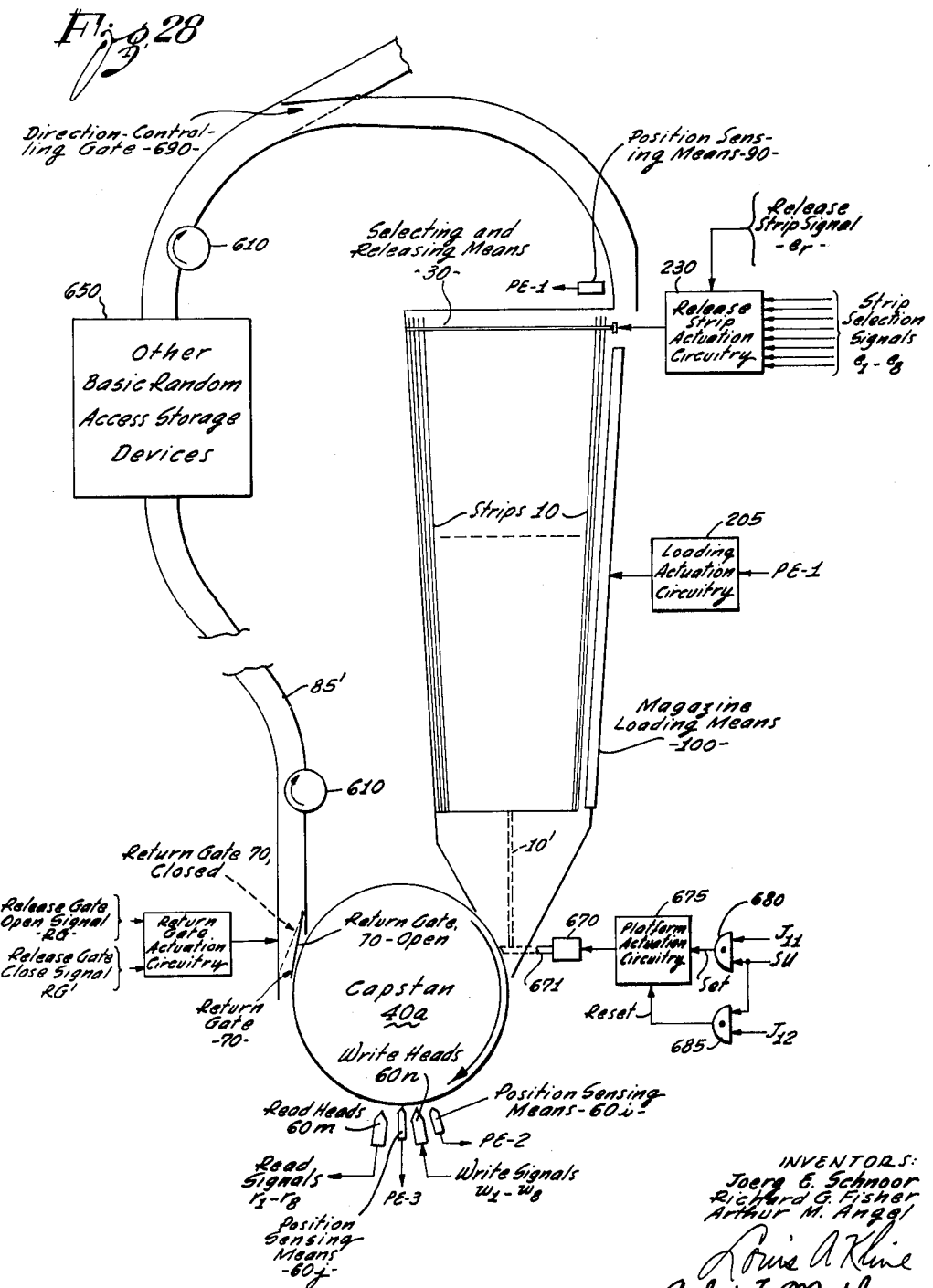

3,238,509
CONTROL MEANS FOR A RANDOM ACCESS STORAGE SYSTEM
Joerg E. Schnoor, Rolling Hills, Richard G. Fisher, Torrance, and Arthur M. Angel, Rolling Hills, Calif., assignors to The National Cash Register Company, Dayton, Ohio, a corporation of Maryland
Filed Dec. 8, 1961, Ser. No. 162,626
60 Claims. (Cl. 340—172.5)

This invention relates generally to high capacity, rapidly accessible random access storage units, and to improved means and methods for coordinating the operation of such units with the operation of a high-speed electronic data processor. More particularly, the invention relates to improved means and methods for coordinating the operation of a high-speed electronic data processor with the operation of one or more random access storage devices of the type disclosed in the commonly assigned copending patent application Serial No. 12,032, filed March 1, 1960.

The advantages to be derived from a high capacity, rapidly accessible random access storage device for use in a computer system are so numerous and well recognized as to require little elaboration. However, in spite of the acknowledged advantages to be gained from the use of such a random access storage device, progress towards the development of a practical device has been quite slow and the computer art has been forced to rely on sequentially accessible magnetic tape units for much of its large capacity storage. The relatively few high capacity random access storage devices which have been attempted leave much to be desired, chiefly because they suffer from one or more of the following disadvantages: (1) relatively slow access time, (2) limited storage capacity, (3) high cost, (4) failure to provide rapid interchangeability of storage elements, as a result of which, it is necessary to provide sufficient built-in storage capacity for the maximum amount of data which might be required to be stored, and (5) the unit is not easily coordinated with the operation of a high-speed electronic data processor and vice versa so as to permit full advantage to be taken of both the random access capability of the random access unit and the high-speed capability of the processor.

The random access storage device disclosed in the aforementioned copending patent application, Serial No. 12,032 represents the first real breakthrough in the development of a commercial high capacity, rapidly accessible random access storage device, and makes it possible to substantially overcome the previously listed disadvantages which have hampered other random access storage devices. Briefly, in a typical embodiment of the random access storage device disclosed in the aforementioned copending application, a rapidly removable magazine is provided containing a plurality of magnetic data storage strips (for example, 256 strips), each of which has a different set of binary coded notches provided at one end thereof representing the strip number. The magazine is mounted in the random access storage device so that each of the plurality of strips therein is vertically suspended from a plurality of selection rods (for example, eight rods). The selection rods are constructed and arranged in conjunction with the shape of the coded notches so that, by proper selection of the rods, a selected strip may be released and caused to drop under the influence of gravity until it engages a rotating capstan to which it is drawn by means of a vacuum. Once engaged, the strip is rapidly accelerated to the surface speed of the capstan and, while on the capstan, is caused to traverse a plurality of read and write heads, in intimate head contact therewith, so as to permit reading and/or writing on the strip. Provision is made to permit the strip to recirculate one or more times on the capstan before being returned to the magazine from which it was dropped. This is accomplished by means of a return gate which in one position allows the strip to remain on the drum for recirculation, and in the other position peels the strip from the capstan and causes it to enter a guide means which leads back to the magazine. The return to the magazine is accomplished by allowing the centrifugal force of the strip, obtained as a result of rotation of the strip by the capstan, to provide the momentum which sends the card through the return gate, and upward through the guide means, until it arrives at a magazine loader mechanism. The loader mechanism acts to return the card to the magazine, after which the strip is once again available for selection. The sequence of strips on the selection rods is, of course, inconsequential since the selection of a strip is independent of its position in the magazine.

Continuing with the description of the random access storage device of the aforementioned copending patent application Serial No. 12,032, it will be understsood that a large number of bits of data or information can be stored on each of the above-described magnetic data-storage strips which, for example, may be three and one-fourth inches wide and fourteen inches in length. Such a strip may typically store in excess of fifty-eight million binary bits. And, since according to the invention of the aforementioned patent application, any desired one of the strips may be selected, released, dropped, operated on, and returned to the magazine, all within a small fraction of one second, it is evident that the invention provides a random access storage device which not only has a remarkably high storage capacity, but in addition, provides a very rapid access time which is very much faster than that required, for example, with apparatus utilizing long runs of magnetic tape as the storage medium. Also, besides providing high storage capacity and rapid access, the random access storage device of the aforementioned copending patent application has the further advantage that a magazine containing a set of strips may be easily and quickly replaced by any other magazine, as a result of which, access to almost any possible amount of stored information is made possible. Still further, in addition to providing these highly desirable random access capabilities, this random access storage device is also capable of efficient sequential operation, competitive with a conventional tape unit, so as to permit considerable versatility in the choice of operating mode.

With the above brief description of the random access storage device of the aforementioned copending patent application Serial No. 12,032 in view, it may now be stated that the primary object of the present invention is to further extend the considerable step forward achieved by this novel random access device by the provision of improved means and methods for coordinating the operation of a high-speed electronic data processor with one or more of such random access storage devices, in a manner so that the data processor as well as the storage devices can operate at maximum efficiency with a high degree of system flexibility.

Another object of this invention is to provide means for operating a random access memory device of the type disclosed in the aforementioned copending patent application in a manner so that jamming or destruction of the magnetic data-storage strips is prevented, and so that errors and/or malfunctioning of the unit, if they should occur, are brought to the attention of the processor and/or programmer.

Still another object of the present invention is to provide means and methods for operating one or more random access storage devices with a high-speed electronic data processor so that each random access memory device can operate independently of, or in synchronism with, the data processor in a manner which permits the most expeditious operation of all units.

A still further object of this invention is to provide means and methods in accordance with any one or more of the preceding objects which provide operation in a manner so that the status of each random access device is made readily available to the data processor to aid in the most expeditious operation thereof.

A still further object of the present invention is to provide means and methods in accordance with any one or more of the preceding objects which operate to insure that reading or writing will not occur on a wrong magnetic data-storage strip and, if such reading or writing is attempted, an indication of such an attempt will be made available to the data processor.

An additional object of the invention is to provide means and methods in accordance with any one or more of the preceding objects such that a command flow arrangement is provided for the data processor which permits the accurate section of one or more random access storage devices, and selected strips therein, in a manner which makes possible the most expeditious use of processor operating time, and a high degree of system flexibility.

Yet another object of the present invention is to provide means and methods for establishing an operational sequence for a random access storage device of the type disclosed in the aforementioned patent application so as to achieve maximum reliability of operation.

An additional object of the present invention is to provide the means and methods of the aforementioned objects in highly reliable form, in a simple and practical manner, and with a minimum of complexity and expense.

As will be explained in considerable detail hereinafter, the above objects are accomplished, in accordance with a typical embodiment of the present invention, by providing properly located strip position-sensing means on each random access storage device, and logic and control means cooperating therewith so as to provide optimum control of each device in response to control signals generated by the data processor during random access storage unit commands; the position-sensing means and the logic and control means also cooperate to provide status signals for each random access storage device which are made available to the processor to permit the processor to make the most expeditious use of its high speed operating capability, while also permitting maximum utilization of the random access characteristics of each storage device.

The specific nature of the present invention as well as other objects, uses, and advantages thereof will become apparent from the following description of a typical embodiment of the invention illustrated in the accompanying drawings in which:

FIG. 2 is a vertical view of the device of FIG. 1a, partly in section and transversely through the device, with some parts removed and some portions broken away;

FIG. 3 is a partial sectional view of various portions of the device of FIG. 1a; specifically FIG. 3 illustrates a capstan, a strip-gate, a transducing means, and an information-storage strip in operative relationship therewith, the transducing means and capstan being moved apart somewhat to facilitate illustration;

FIG. 3a is a fragmentary view of a typical return gate means in its open position. In this position, the return gate will act to remove a strip from the capstan;

FIG. 4 is a face view of the multiple-head electromagnetic transducing means shown in FIG. 3 with strip-contacting shields in place, but with portions broken away, showing air passages;

FIGS. 5 and 6 are a partial-section side-view, and a face view, respectively, of a typical magazine face plate and a typical strip-loading apparatus used in the device of FIG. 1a; various sections are removed in FIGS. 5 and 6 to facilitate disclosure;

FIG. 6a is a sectional view of a strip-guide-bar, and a strip-restraining sprag used in the strip loading apparatus of FIGS. 5 and 6;

FIG. 7 is a sectional view of the strip-loading means depicted in FIGS. 1, 5, and 6, illustrating an exemplary information-store strip in place ready for loading into a magazine, with parts removed;

FIG. 7a is a fragmentary view illustrating the action of guide bar and loading plate means in loading a strip into a magazine;

FIG. 8 is a partly-schematic partly-sectional diagram of various blower and drive portions of the device of FIG. 1; specifically, FIG. 8 illustrates principal support means, a strip-driving capstan, associated apparatus used to drive the capstan, and pneumatic apparatus employed to exhaust and supply air;

FIG. 9 is a partial-section view of a capstan and spider means shown in part in FIG. 8, taken on line 9—9 in the latter figure, with parts broken away;

FIG. 10 is a partial-section view depicting various other portions of the device of FIG. 1a; specifically FIG. 10 illustrates an air-entrance grille, a strip-selector rod, the actuating means for the rod, and the spatial relationship of those parts to each other and to a plurality of information-store strips;

FIG. 11 is a face view depicting the driven ends of two strip-selecting rods and their respective driving or actuating means, such as may typically be employed in the selecting and releasing means 30 generally shown in the device of FIG. 1a;

FIG. 12 is a view showing strip suspending and strip selecting bar and rod means, with a typical information storage strip retained by the bar and rod means, such as may be employed in the selecting and releasing means 30 generally shown in the device of FIG. 1a;

FIG. 12a is an enlarged fragmentary view of FIG. 12 depicting details of strip-selecting and strip-suspending means in operative relationship with an information-store strip with a portion of the latter broken away;

FIG. 13 is a view indicating the relative dispositions of the strip and the strip suspending and releasing means of FIG. 12, shortly following selection and release of a strip;

FIG. 14 is a view of a typical information-storage strip, with a part broken away, illustrating the means used for coding individual strips;

FIG. 15 is a binary truth table, with portions removed, indicating the coding configuration or plan for a plurality of information-store units or strips;

FIG. 16 is a schematic view of the random access storage device 150, showing the pertinent electrical means incorporated therein for actuating the various mechanical components of the device 150;

FIG. 17 is a block diagram of a typical overall system in accordance with the invention illustrating, generally, various communication lines provided between the data processor and a plurality of random access storage units;

FIG. 18 is a more detailed block diagram showing the specific communication lines provided between the data processor and a particular random access storage unit $M_1$ in FIG. 17;

FIG. 19 is a block diagram of the controller 250 in FIG. 18 showing the two functional components thereof and the communication lines provided therebetween;

FIG. 21a is a series of graphs illustrating typical signal waveforms in the diagrams of FIGS. 20 and 21;

FIG. 22 is a schematic diagram illustrating a typical command flow structure for executing random access storage unit commands in accordance with the invention;

FIGS. 23 and 24 are circuit diagarams generally illustrating typical circuitry which may be provided in the data processor for achieving branching in response to certain random access storage unit status signals;

Figure 27:
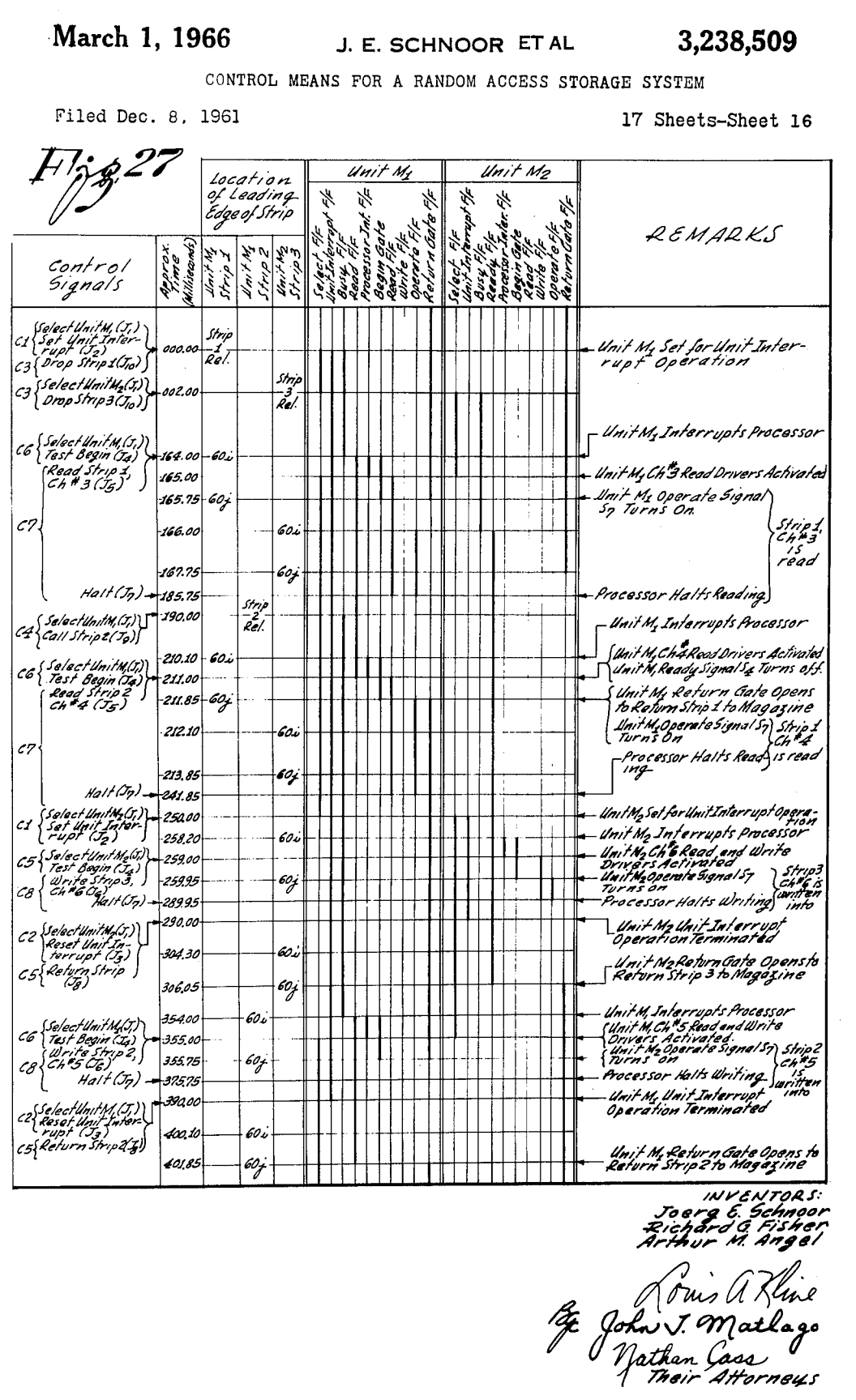

FIGS. 25 to 27 inclusive are timing diagrams illustrating typical overall system operation, in accordance with the invention; and FIG. 28 is a schematic view of various modifications which may be incorporated in the random access storage device 150 shown in FIG. 16 in order to adapt it for wider applications.

Like characters and numerals designate like elements throughout the figures of the drawings.

INTRODUCTION

Figure 1:
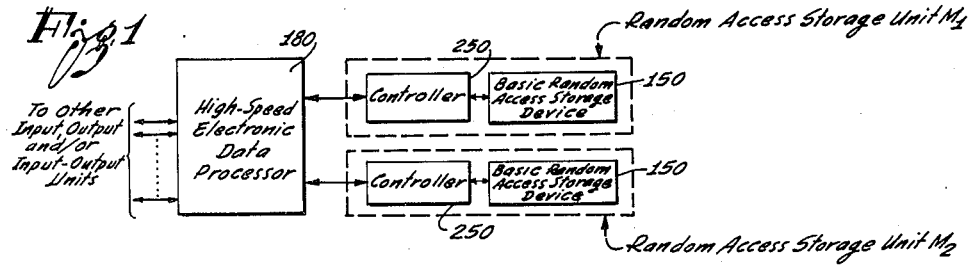
FIG. 1 is a general block diagram of an overall system in accordance with the invention.

Referring to FIG. 1, a general block diagram is shown of a typical overall system in accordance with the invention, including a high-speed electronic data processor 180, and a plurality of random access storage units $M_1$ and $M_2$ communicating therewith. As is well known, a data processor is a device which is able to accept data and to perform logical operations thereon in accordance with one or more commands (or instructions) for which the processor is programmed, the end result being, of course, to provide the desired processing of the input data.

A data processor such as illustrated at 180 in FIG. 1 may, for example, include a program control unit which governs the command flow arrangement, an arithmetic unit for operating on the data in accordance with one or more commands, an internal storage means (usually of limited capacity, such as a core memory) for the intermediate storage of data and/or permanent storage of commands and other program data, and various registers and logical circuitry as may be required for manipulating data during processor operation. Such a data processor is generally well known in the art and is not the subject of the present invention. Consequently, in order not to distract from the present invention, further description of the data processor will be given only as is necessary to permit the novel features of this invention to be understood and put into practice using presently available knowledge.

To take advantage of the data processing capabilities of a data processor, means must, of course, be provided so that the data processor will be able to communicate with other devices. Specifically, means must be provided for inputting and outputting data to and from the processor as may be required in any particular application. Means used for inputting and outputting data are commonly referred to as "input" units, "output" units, or "input-output" units, depending on whether the unit performs the functions of inputting, outputting or both. Typical of such units are punched card readers, printers, electric typewriters, magnetic tape units, etc. A typical computer system may then be considered as comprising the combination of a data processor and any input, output, and input-output units employed therewith.

As pointed out previously, the present invention is primarily concerned with improved means and methods for coordinating the operation of a data processor with one or more random access storage devices of the type disclosed in the aforementioned copending patent application Serial No. 12,032. Such random access storage devices fall into the class of input-output units, and thus may be considered as a replacement for, or as a supplement to, a conventional magnetic tape unit. The important difference, however, is that in addition to providing the sequential accessing capability of a magnetic tape unit, as well as its high capacity storage capability, such an output unit also provides a fast random access capability. In FIG. 1, two such random access storage units $M_1$ and $M_2$ are shown communicating with the data processor 180, each of which may be considered as including (1) a basic random access storage device 150 generally corresponding to the device disclosed in the aforementioned copending patent application Serial No. 12,032, and (2) a controller 250 (disclosed only in very general form in the aforementioned patent application) which serves to coordinate communication between the data processor 180 and the basic random access storage device 150.

Having thus generally described the overall system shown in FIG. 1, the details of a typical embodiment of the basic random access storage device 150 of FIG. 1 will now be described with particular reference to FIGS. 1a through 16, inclusive. This description will, for the most part, be of a mechanical nature and will be generally similar to that provided in the aforementioned copending patent application Serial No. 12,032. Consequently, if familiarity has already been gained with this copending application, or if the mechanical details are not of present concern, it will be sufficient to merely read the "General Description" section immediately following this paragraph, and then to skip to FIG. 16 and the section entitled "Electrical Means and Operative Description." These two sections should provide sufficient background to permit a complete understanding of the remainder of the description, which is concerned with the construction and arrangement of the controller 250 and the manner in which it communicates with the processor 180 and the basic random access storage device 150. It should be noted for purposes of comparison that the chief structural difference between the random access storage device 150 described herein and the similar device disclosed in the aforementioned copending patent application is in the provision and location of the position-sensing means 60i and 60j in the transducing region as will become apparent by comparing FIG. 4 in both applications.

Figure 1A:
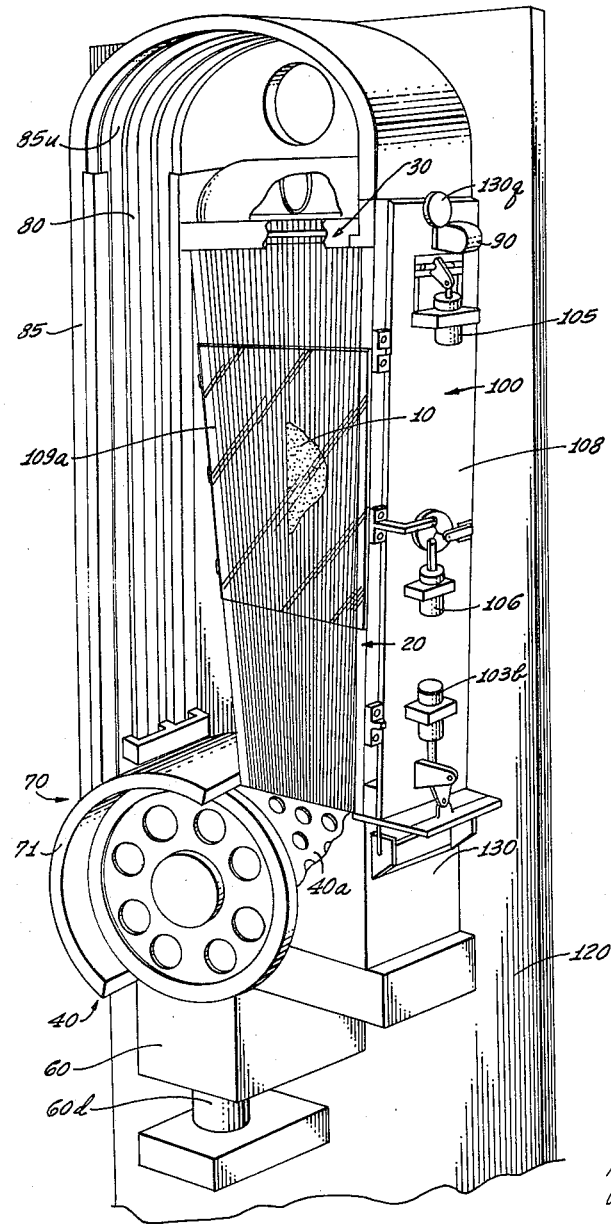
FIG. 1a is a perspective view of principal portions of the random access storage device 150 in assembled form, with portions broken away and parts including a base plate removed to facilitate disclosure of certain details.

GENERAL DESCRIPTION OF A TYPICAL BASIC RANDOM ACCESS STORAGE DEVICE
(FIG. 1a)

Referring to FIG. 1a, a plurality of data-storage strips 10 are releasably suspended in a magazine represented generally by the ordinal 20, by strip suspension, selecting and releasing means indicated generally by ordinal 30. The magazine 20, means 30 and other components of the apparatus are supported upon frame means hereinafter described. Means 30 comprise a plurality of rod-like elements, and are constructed and arranged to support a large number of strips 10 and to be operable to select and release any desired one of the strips irrespective of its position in the magazine 20. The strips 10 are assigned respective binary code numbers and each strip comprises means uniquely representing its number which cooperate with the rod-like elements so that the rod-like elements may be operated in correspondingly coded configurations to release desired strips at the proper times. These means on each strip representing the strip number and the mode of operation thereof for selecting and dropping any specified strip will hereinafter be explained in detail.

A released strip drops gravitationally into an operating means indicated generally at 40, and into a position in which its lower end portion engages the periphery of a perforated drum or capstan 40a comprised in operating means 40. Appropriate portions or arcs of the path of the peripheral inner surface of the capstan 40a are during appropriate intervals of time pneumatically connected to suction means for provision of a pressure differential between the exterior and interior of the capstan 40a whereby the strip is forcibly held in contact with and is moved by the capstan. During operation of the apparatus the capstan 40a is continuously rotated at a suitable speed by driving means such as an electric motor, whereby the engaged strip is very rapidly driven or transported through the transducing region in which read and write magnetic transducer means, indicated generally at 60, are situated. Application of the pressure differential or suction during appropriate intervals and over only certain limited arcs of the peripheral path of the capstan 40a permits the strip to follow a course or path only parts of which are coincident with the surface of the capstan, whereby good contact with transducing means 60 may be secured, and whereby the strip is permitted to be guided away from the capstan 40a for return to the magazine 20. The transducer region also includes first and second strip position-sensing means preferably of the photoelectric type for producing signals indicative of the position of the strip in the transducing region.

Electrically controlled and operated return gate means indicated generally at 70 are provided to permit, alternatively, the aforementioned immediate return of the strip to the magazine 20, or one or more additional passes of the strip past the transducer means 60. The return gate means 70, when open, allows the lower or leading end of the strip to enter a raceway formed as part of guide means indicated generally at 80 and extending upwardly and over the magazine. When closed, the return gate means 70 forces the moving strip to follow a path in which the strip is again drawn by suction into contact with the surface of the capstan 40a and thereby brought around and again passed through the transducing zone 60. For proper operation of the strip-transport means the diameter of the capstan 40a is such as to provide a circumference of sufficient length to preclude overlap of the leading and trailing ends of a strip when the latter is being re-passed through the transducing zone 60. Preferably the strip is chosen to have a length equal to approximately two-thirds of the circumference of the capstan 40a.

As previously indicated, when operations with a strip by the operating means comprising transport means 40 and transducer means 60 have been completed and the return gate 70 is open, the strip is propelled upwardly along the guideway in guide means 80 and the strip proceeds by its momentum along the inner surface of the curved upper portion of the guideway, and downwardly past a third strip position-sensing means indicated by ordinal 90, into a loading means indicated generally at 100. Like the first and second strip position-sensing means located in the transducing region, the third strip position-sensing means is also preferably of the photoelectric type. The loading means 100 serves to arrest the strip in proper position for loading onto the suspension means, and to thereafter force the returned strip onto the suspension and releasing devices in means 30. The strip-position-sensing means 90 senses arrival of the leading end of the returning strip and initiates certain loading-means operations, and later senses passage of the trailing (upper) end of the strip and initiates other operations of the apparatus, as will hereinafter be explained in detail.

It will be understood that following release of a strip the strip-selecting-and-releasing means 30 may be temporarily rendered inoperative for releasing another strip, and maintained in this inoperative status until the dropped strip is removed from the lower (operating) end of the apparatus. The strip selecting and releasing means 30 include pneumatic means for intermittently supplying and directing narrow streams or currents of air downwardly upon and between portions of the suspended strips during appropriate time intervals, for the purpose of keeping the strips separated so any selected and released strip will readily descend into the operating means without appreciable interference by the other strips.

With the foregoing principal components of the apparatus and their functions and relationships thus generally disclosed, more detailed descriptions of the several enumerated principal means of the apparatus will now be made, commencing with the strip suspension, selecting, and releasing means.

STRIP SUSPENSION AND RELEASING MEANS
(FIGS. 12, 12a, 13, 14 AND 15)

As indicated in FIGS. 13 and 14, the strips 10 are each provided with a pair of opposed indentations or notches 10m and 10n disposed at respective upper side margins. The upper inclined edges provided by these notches 10m and 10n cooperate with complementary supporting surfaces of respective ones of a pair of rotatable suspender bars 30t and 30u. These suspender bars 30t and 30u are formed of sector-shaped cross-section as indicated in FIG. 12a, and are mounted for rotation about the axes of the sectors, in a frame 30z formed as part of the selecting and releasing means 30. The two suspender bars 30t and 30u are constructed and arranged for opposite concurrent rotation outwardly from the strips, and inwardly into supportive engagement with the strips, by power means hereinafter described.

As indicated in FIGS. 12 and 13 each of the strips 10 comprises a lower end portion 10z (hereinafter termed the leading end), a middle or body portion 10b and an upper end portion 10r in which the supporting notches 10m and 10n are located. As shown in FIG. 14, in the upper marginal edge of each of the strips there is formed a plurality of indentations or notches generally denoted 10i and exemplified by notch 10i0, and of which indentations there are eight in the exemplary form; and each individual strip has a unique set of retainer lugs or ears generally denoted 10e and exemplified by ear 10e7, formed integral therewith and disposed at one or the other (left or right) side of a respective one of the upper marginal indentations in dependence upon a code notation to be described. The retainer lugs or ears 10e are adapted for cooperation with respective ones of a set of eight rotatable selector rods 30b (FIG. 13), such as 30b7 for example, and which bars are similar to the suspender rods 30t and 30u in shape, construction, and mounting. The selector rods 30b are adapted to be rotated into and out of engagement with retainer ears 10e of the strips for selective release of individual ones of the strips as presently will be explained. Each of the selector rods 30b is individually operable by means hereinafter explained.

The system employed to permit selection of any individual strip by operation of a respective set of selector rods 30b, is illustrated in FIGS. 13, 14, and 15. In accord with principles of the binary system of numbers employed in the code designation of strips 10 whereby control of releasing of the strips may be easily effected by a suitable combination of actuating signals, each of the strips 10 is provided with as many upper-margin notches or indentations 10i as there are binary orders in the code numbers used; and occurrence of a binary "1" in a code number is represented by a retainer ear 10e in a particular position in the corresponding indentation 10i of the strip bearing that code number. In the illustrative or exemplary apparatus there are two hundred and fifty-six strips in each set or pack (magazine-full), hence, as indicated in FIG. 13, there are eight upper margin indentations 10i0, 10i1, . . . 10i7, each corresponding to a respective binary order $2^0$, $2^1$, $2^2$, . . . $2^7$. Each marginal indentation 10i has two sides, left and right, and it is evident that either of the sides may be selected to represent the binary value "1" and the other side the value "0." For purposes of securing more uniform retention and suspension of the strips 10, the binary value "1" is assigned to the right side of each of the alternate indentations, 10i0, 10i2, 10i4, and 10i6, and to the left side of each of the other indentations; and the binary value "0" is assigned to the sides opposite those assigned the value "1," all as indicated above exemplary strip No. 166 in FIG. 14.

With the described arrangement, the binary numbers corresponding to respective decimal numbers 0 through 255 may be represented by respective configurations or dispositions of retainer ears 10e in the upper marginal identations 10i. Thus, in FIG. 14, the retainer ear configuration for binary number 10100110, corresponding to decimal number 166, is shown as it occurs on the strip of that designation. Therein the retainer ear 10e for indentation 10i0, that is, for the lowest order position, is at the left or "0" side of the indentation, that for indentation 10i1 corresponding to the next higher binary order is at the left or "1" side of the indentation, etc.; and the corresponding binary digit represented by the ear in each of the indentations is thereunder indicated. Thus, it is evident that to select strip No. 166, selector rods 30b in each of indentations 10i0, 10i3, 10i4, 10i6 must be in or rotated to "0" attitude or position, and the other selector rods similarly be in or rotated to "1" position. The configuration of retainer ears for any of the set of strips is readily derived from an ordinary "truth table" which lists all the possible combinations of binary digits in representations of any specified number of binary positions. For example, a truth table 200 for the eight binary positions required in the strip-coding in the exemplary apparatus, is depicted in fragmentary form in FIG. 15. Therein the code designations for the first four strips, the last three strips, and the aforedescribed exemplary strip No. 166 are indicated; and from the binary values represented in the table the respective retainer-ear configurations for the strips of the set are derived for use in punching the several strips.

As indicated in FIG. 12, a typical strip 10 is shown suspended by suspender bars 30t and 30u and retained by engagement of selector rods 30b engaging respective retainer ears 10e. By reference to FIGS. 13 and 14 it is evident that the ear-configuration corresponds to binary number 10100111, or decimal number 167, and hence the strip is identified as strip No. 167. In the exemplary apparatus the selector rods 30b are spring-stressed to the "1" positions, that is, to positions in which they engage retainer ears 30e that are in the "1" sides of identations 10i. This normal attitude or positional realtionship is illustrated in FIG. 12. Thus it is evident that when strip No. 167 is to be selected, selector rods 10i0, 10i1, 10i2, 10i5, and 10i7 must be rocked or rotated from "1" position to "0" position, and rods 10i3, 10i4, and 10i6 must be left in "1'" position. Thus for the selection of this exemplary card, activating current signals will be supplied to the respective actuators for the selector rods to be moved, and no current signals will be supplied to the other selector rod actuators. The actuators will presently be described. Following operation of the required set of selector rods 30b in response to receipt of a respective set of signals, the two suspender bars 30t and 30u are rocked outwardly and the selected strip drops under the influence of gravity, and the selector rods 30b and suspender bars 30t and 30u are then permitted to return to respective normal "1," and strip-supporting, positions. It is evident that during the interval in which the suspender bars 30t and 30u are rocked outwardly, all strips excepting the selected strip are momentarily suspended from at least one of the selector rods 30b.

STRIP SEPARATION BY AIR CURRENTS
(FIGS. 2, 8 AND 10)

During operation of the apparatus, with the exception of the brief intervals during which a strip is being loaded into the magazine 20 or is being selected by rotation of the selector rods 30b and released by rotation of the suspender bars 30t and 30u, currents of air are directed downwardly against the upper ends of the suspended strips in the magazine 20. These air currents, which are formed by division of a single air current by a slit-type grille, pass downwardly between upper-end portions of the strips and laterally therefrom, and serve to maintain the strips separated. The grille is formed with n+1 slits or passages, n being the number of strips in a full magazine; and the grille is so disposed as to form thin wide air currents and to direct the currents parallel to the planes of the suspended strips. If desired, the air supply to the grille may be stopped-off during strip selection and release, but this is ordinarily not necessary.

As indicated in FIG. 2, air is supplied through a conduit 30k into a generally rectangular chamber 30p formed by a box 30d closed at its top and sides and having as its floor a grille 30g formed by a number of closely-spaced parallel plates secured together with intervening spacer-strips at their ends only, by suitable means such as solder. As indicated in enlarged fragmentary form in FIG. 10, the plates 30f of the grille 30g are disposed slightly above and transversely of the selector rods 30b; and as there indicated, individual thin wide air streams, indicated by downwardly directed arrows a, pass down from the grille and between respective pairs of strips 10. As previously noted, the air is supplied through a conventional tubular conduit 30k, which conduit extends from a conventional rotary-solenoid-operated valve 30y (FIG. 8), to which air is supplied by means hereinafter described and explained. The solenoid of valve 30y may be supplied energizing current at the proper times from means hereinafter described, the valve 30y being so constructed as to be normally spring-stressed into position to supply air to conduit 30k but arranged to exhaust air into the ambient atmosphere when the solenoid is energized.

During selection, release, and dropping of a strip it is desirable to prohibit the downwardly directed air streams from interfering with the releasing and falling of a strip, and accordingly, the release signal which initiates actuation of the selecting and releasing means 30 is also applied to valve 30y (FIG. 8), whereby to divert the air stream from the grille 30g to the ambient atmosphere; and this diversion is caused to continue until the strip has been engaged by the capstan 40a (FIG. 1a).

SELECTOR ROD AND SUSPENDER BAR ACTUATORS (FIGS. 10, 11, AND 12)

The means provided for operating the eight selector rods 30b and the two suspender bars 30t and 30u (FIG. 12) are illustrated in FIGS. 10, 11, and 12. Since the selector rod actuators and the suspender bar actuators may be essentially alike, a description of one will suffice for all. As depicted, the front ends of the rods and bars are provided with respective round trunnions 30bt which extend into and are supported in aperture-bearings, such as 30bb (FIG. 12), provided in a front support-plate 30z formed as part of the grille-mounting frame of selecting and releasing means 30 (FIG. 1a). The rear ends of the rods and bars are formed as (or have secured thereto) small gears such as 30bg, which are constructed and arranged to be driven by respective racks, such as 30dn. The racks are constructed and arranged to be driven in one direction by respective suitably mounted compression springs such as 30s, mounted as indicated and bearing upon or effective against one end of a respective rack; and the racks 30dn are arranged to be driven in the opposite direction by respective levers, such as 30pd pivoted to magazine frame means 20f as indicated and arranged to be rocked in one direction by respective solenoid-and-core means such as 30sc.

As indicated in FIG. 11, the solenoid and rack means for alternate rods may be mounted in inverted relationship to the intervening solenoid and rack means, in the interest of good design; and it will be evident that the means for operating the suspender bars 30t and 30u are suitably mounted to accommodate the slight difference in elevation of those bars. Thus the bars and rods are by the respective springs normally forced to their "1" position, and may be rotated or rocked to the respective "0" positions by energization of the corresponding solenoid coils, selectively.

Actuating signals for each of the solenoid means 30sc may be by way of a set of conductors typically illustrated by lead 168. It is evident, therefore, that a set of eight selector rod signals (represented by respective currents, or absence thereof) may thus be supplied through their respective circuits, with a following but concurrent set of suspender-bar signals, all of which become effective through the described mechanism to select and release the particular strip whose code designation corresponds to the coded signals supplied to the selector-rod solenoids.

CAPSTAN DRIVE, VACUUM, AND BLOWER MEANS (FIGS. 2, 8, AND 9)

As indicated in FIG. 8 the principal support means of the apparatus is an upright plate 120 supported by a laterally extending foot or base plate 121 to which it is secured. Extending laterally from and supported by upright plate 120 is a shelf plate 122 upon which is mounted driving and blower means which in the interest of simplicity are shown as a single drive-motor 123 and a single direct-connected blower means 124. It will be understood that a plurality of blowers, and separate drive-motors, may be used for more economical operation.

Secured to plate 120 is a pair of brackets 125 and 126. The brackets are constructed and arranged to rigidly support a tubular support 127 with its axis perpendicular to plate 120. The support 127, secured to the brackets in any suitable manner, as, for example, by brazing, extends through a large hole or aperture 120a formed in plate 120, as indicated. At its outer end the support is covered with a cap 127e, into which extend four ducts or conduits whose function will presently be explained. Support 127 has secured to its interior a plurality of vane-like elements of a spider 127s which, as indicated in FIG. 9, divides the interior of the support and the interior of the capstan into a plurality of separate chambers denoted C1, C2, C3, etc. The spider also comprises an annular flange member 127p which is secured to the inner end of the support 127, a disc-like end piece 127q, and an axially-disposed trunnion shaft 127t. Affixed upon the exterior of support 127 as indicated in FIG. 8 is the inner race of an antifriction bearing B1, the outer race of which is fitted in a complementary portion of the inner end member 40ab of capstan 40a. The outer end of the capstan comprises a disc 40ad which is rotatably mounted on a second bearing B2 affixed to and supported by the outer end of trunnion shaft 127t. Secured upon end member 40ab of the capstan is a pulley 40dp, disposed in alignment with the drive pulley 123p of motor 123, whereby the capstan 40a may be driven by a belt 123b which is engaged with both pulleys. The capstan is provided with a multiplicity of spirally arranged perforations 40aa through which air may be drawn into one or another of the aforementioned chambers C1, C2, etc.

Shown secured in respective openings in cap 127e of tubular support 127, and thus communicating with respective ones of chambers C1, C2, C4, and C6, are four exhaust or suction ducts 127f, 127g, 127h, and 127i. Of these ducts the latter three exhaust directly into intake duct 124i of blower 124; and the other, 127f, communicates with duct 124i through a solenoid-operated valve 127v. For simplicity in illustration these ducts have been illustrated as opening into respective chambers through cap 127e; however, it is to be understood that in certain embodiments of the apparatus the ducts be larger than shown and may open into respective chambers C1, C2, etc., by way of apertures formed in the periphery of support 127.

Also connected to the intake duct 124i is the transducer means exhaust ducting 60d. The outlet port of blower 124 is connected to a duct 124o which serves to supply air to duct 30k by way of valve 30y. Thus, when the apparatus is in operation, air is by the described means normally continuously drawn through perforations 40aa of the capstan 40a and into and through chambers C2, C4, and C6, and through the transducer means into ducting 60d. Further, when valve 127v is open, air is drawn from chamber C1; and air is continuously supplied to valve 30y for use in maintaining the strips separated in the magazine. Directions of air flow are indicated by arrows in FIGS. 8 and 9; and it is to be understood that damper-type valves (not shown), may be employed in the several ducts to regulate air flow, dependent upon the physical dimensions and capacities of the pneumatic means. Further, for maximum economy of operation, separate blowers for each exhaust duct may be employed. The power supply to the motor and valve solenoids will hereinafter be explained in connection with FIG. 16.

During operation of the apparatus the drive motor is energized and the capstan 40a rotates at a substantially constant speed. Air is continuously exhausted from within the transducer means 60 and from within chambers of the capstan 40a and air is supplied to the stream-forming grille above the strips. Contemporaneously with release of a strip 10 from the magazine, suction in chamber C1 may be cut off by valve 127v. If this is done, when the leading edge of the strip engages the capstan 40a, it is not violently jerked but is more gently accelerated by frictional contact; and a brief interval thereafter the suction may be re-applied so that the leading end of the strip is positively driven through the suction zone or sector C2 and thence into and through the transducing zone opposite chamber C3, as indicated in FIG. 2.

After once being engaged by the capstan 40a due to pressure differential, the strip is propelled or driven in an obvious manner by only partial engagement over those sectors at which the pressure differential is evident. Since suction is not applied to chamber C3 but is in the transducing zone applied from within the transducing means 60, the strip is induced, by a combination of centrifugal force and downwardly acting pressure differential, to move away from the capstan and two intimate and effective transducing relationship with the transducer means. As the leading edge of the strip moves out of the transducing zone it enters the region or sector opposite chamber C4 to which suction is applied, and is thus again drawn into driven engagement with the capstan. As the leading edge of the strip approaches the return gate means 70, it enters a zone or sector opposite chamber C5 in which suction is not evident, and it therefore may move away from the capstan if the return gate 70 is open. If the gate 70 is closed as the result of actuation of gate solenoid 70s, a guide-surface on the gate guides the leading edge along a path in which the strip travels substantially in contact with the periphery of the capstan 40a and onward into the zone opposite chamber C6 in which the suction is effective. If the gate is open, centrifugal force causes the leading edge of the strip to move away from the surface of the capstan and into the lower end portion of guideway 85. In either case, the leading end and body portions of the strip follow the leading edge; in the first case the strip is drawn or carried on around a generally circular path and again passes through the transducing region, and in the second case the strip is propelled upwardly into the guideway 85 at high speed with the result that following movement of the trailing edge away from the capstan the momentum of the strip drives the strip around through the upper portion 85u of the guideway and down into the magazine loading means 100.

OPERATION OF THE RETURN GATE AND TRANSDUCER MEANS (FIGS. 3, 3a, AND 4)

The return gate means 70, as indicated in FIGS. 3 and 3a, comprises a gate bar 70g pivotally mounted on a pivot 70p carried upon a fixed shroud 71 which extends part-way around the periphery of the capstan 40a. The gate bar 70g is pivotally connected to a spring-stressed actuator link 70m which is moved toward gate-closing attitude by a spring 70r and drawn into gate-opening attitude by the core of solenoid 70s when the solenoid is energized. The solenoid is fixedly secured to shroud 71 as indicated.

That part of the operating and transducing means disposed in the transducer zone will next be described.

As depicted most clearly in FIGS. 3 and 4, transducer means 60 comprise a housing including a frame 60a in which are adjustably mounted first and second multiple-head electromagnetic transducers 60b and 60c. The transducers have respective curved and polished upper faces 60e and 60f, over which strips 10 are propelled and into contact with which the strips are urged by a pressure-differential provided between air chamber C3 formed in the interior space within capstan 40a, and open air-passages formed in the transducer means. Air is admitted to chamber C3 at atmospheric pressure through apertures in the end disc 40ad of the capstan, and is exhausted through passages in the transducer means into a conduit 60d connected to blower 124 (FIG. 8). As indicated in FIG. 3, wherein sections of the two multiple-unit transducers have been removed, and in FIG. 4 which depicts the active or strip-contacting faces of the transducers, air passages 60p and 60q are provided, the latter being formed by opposed grooves produced in the abutting faces of the transducers. Outer air passages 60p and 60q are produced by suitable forming or shaping of the parts comprising frame 60a of the transducer means, and these passages lead to small openings 60g formed by the scalloped edges of right and left tape-guiding shields 60s and 60t (FIG. 4) along the lines of contact of the shields with the transducer upper faces 60e and 60f. The paths of the air currents are indicated by arrow-pointed lines, and it will be evident that due to the pressure-differential between opposite faces of a strip as it progresses over the transducer heads, the strip will be urged downwardly into intimate contact with shields 60s and 60t, and with the faces 60e and 60f of the transducers. Thus the strip travels in an undulatory path over the transducer means, as indicated in FIG. 3; whereby uniform and excellent transducing action is achieved.

As previously indicated, the space within capstan 40a is divided into chambers by stationary baffles or partitions some of which chambers are connected to the intake of the blower to provide suction over sectors of the periphery of the capstan, and the others of which chambers are open to the ambient air at atmospheric pressure. Thus within a zone or sector defined by chamber C2 and extending to the curved lip of right-hand shield 60s, a strip is subjected to suction applied from within the capstan through apertures 40aa, so that the strip is propelled along in contact with the capstan. The suction is relieved at the juncture of the zones defined by chambers C2 and C3, and at that point centrifugal force acts to cause the strip to lose contact with the capstan and to follow a path leading to contact with shield 60s. It is under that condition that the strip moves past the air passage openings in the transducer means, and hence the strip may proceed in the aforementioned undulatory path and into contact with shield 60t. As the strip is propelled along the surface of shield 60t it enters a zone opposite chamber C4, wherein the pressure differential is inward and the strip is thus again drawn firmly into driven contact with the periphery of the capstan 40a.

The exemplary transducers depicted comprise respective aligned rows of read and write magnetic transducer heads, such as those magnetic pole pieces indicated at 60m and 60n in FIG. 4, and may be of well-known or conventional construction. The electrical connections to the multiplicity of transducer heads are through conventional insulated leads connected to multiple-contact quick-disconnect plug sockets 60u and 60v (FIG. 3) which are mounted in a base cap 60w secured to frame 60a. From the preceding description it is evident that a strip, progressing from right to left in the direction of the arrow in FIG. 3 may be subjected to a reading (read) operation as it progresses past the gaps of pole pieces 60m, and to a recording (write) action as it moves past the gap of pole pieces 60n, and that all or a part of either of these actions or operations may be omitted by suitable switching of the electrical circuits connected to the individual transducer heads. The position of a strip in its traversal through the transducing region is made known by the first and second position-sensing means 60i and 60j (FIG. 4), each of which produces an electric signal in response to the interception of the strip thereby. As shown in FIG. 4, position sensing means i precedes both the read and write heads 60m and 60n, while position-sensing means 60j is disposed therebetween.. As mentioned previously, position-sensing means 60i and 60j are preferably of the photoelectric type.

MAGAZINE LOADING (FIGS. 5, 6, 6a, 7, AND 7a)

The transducing operation and the operations of the strip-moving means having been explained, it will next be explained how a strip 10 which has been selected, released, and operated upon is returned to the magazine 20 (FIG. 1a) with its lug or lugs engaged with the proper selector rods and its side notches engaged with the suspender bars as shown in FIG. 12. The preceding descriptions have made evident the fact that the position of any strip in the pack of strips in the magazine 20 is immaterial to the operation of the apparatus; hence strips are returned to the "top" of the pack irrespective of their code designations or numbers. Due to the normally flowing air currents passing between the strips, any selected and released strip will drop, regardless of its position in the pack, and upon return of a strip to the pack the air currents directed by grille 30g are effective to automatically re-distribute the strips in the magazine.

As a strip is carried by its momentum along or through the upper curved portion 85u of the raceway 85, its leading edge interrupts the optical path of a photo-detector unit 90 (FIGS. 1a, 2, 5, and 6). The detector unit thereupon transmits a signal which by suitable means is employed to arm and initiate action of apparatus used to stop and re-suspend the strip on the bars and rods. As the leading edge (bottom end) of the strip passes the photo-detector unit 90 it enters a straight guideway defined by opposed longitudinal grooves 101a and 102a (FIGS. 7 and 7a) produced in respective hinge-mounted guide bars 101 and 102 which form part of the magazine-loading mechanism designated generally by ordinal 100. The guide bars are mounted on respective pairs of hinges 101b, 101c, 102b, and 102c (FIGS. 5 and 6) secured to the magazine cover plate 108 (FIGS. 1a, 2, 5, and 6) and have guideway-opening and closing movements limited by suitable means such as stops on the hinge elements. As the strip enters and proceeds downwardly in the guideway thus provided by grooves 101a and 102a, the guide bars are in closed position as indicated in FIG. 7. Downward motion of the strip is arrested as the lower end thereof strikes a sliding stop-plate 103 (FIGS. 5 and 6) which has been moved into stopping position in the path of the descending strip near the bottom ends of the guide bars as shown.

The stop plate is moved by a bell-crank lever 103a operated by a solenoid-type actuator 103b. The solenoid 103b is caused to be energized in response to the signal from photo-detector means 90 as the leading (bottom) edge of the strip passes the detector. As the strip nears stop plate 103, its lower end engages one or more pivoted sprags 101g and 102g, which are pivotally mounted in respective slot-apertures 101s and 102s formed in the guide bars, as indicated. The sprags 101g and 102g are urged into strip-engaging attitude by the distribution of mass on opposite sides of their pivots, preferably aided by spring means as indicated in FIG. 6a. As a strip engages the sprags 101g and 102g, the latter are pivoted slightly and pinch the strip against adjacent portions of respective guide bars, and thus rebound of the strip is prevented.

Actuator 103b comprises a conventional solenoid having a movable core or plunger 103p which is returned by spring means 103s as indicated; the plunger being pivoted to lever 103a at its lower end and the lever being pivoted to a relatively fixed bracket 108d which is secured to or formed integrally with the magazine cover 108.

As the trailing (top) end of a strip passes the detector means 90, the latter emits a signal which is used to (a) initiate operation of means acting to rock the guide bars 101 and 102 on their hinges into strip-releasing position, (b) initiate operation of means whose function is to load or press the upper end of the returned strip onto the suspender bars, and (c) initiate subsequent retraction of stop-plate 103. The signal from detector means 90 is electric, and is employed to trigger means, such as conventional relay means, which (a) close power-supplying circuits to a solenoid-type actuator 106 which rocks the guide bars as presently explained, and to a spring-returned solenoid-type actuator 105 which serves to actuate a loading plate 107 (FIGS. 5, 6, and 7), employed to force a strip onto the selector rods and suspender bars, and (b) open the power-supplying circuit to solenoid 103b.

As indicated in FIG. 5, actuator 105 operates, when energized, to force upwardly a link 105b which is pivotally secured at its upper end to one arm of a bell-crank lever 105c. Lever 105c is pivotally mounted on a cross-pin 108p mounted in outstanding legs of a relatively fixed bracket 108b as indicated; and its upper lever arm is pivotally secured to the middle portion of a similar pin 105f secured between a pair of push bars 105e. Push bars 105e are mounted on and adapted to push (to the left in FIG. 5) the upper end of a long flat generally upright resilient loading plate 107. Normally the loading plate is retracted outwardly of the magazine by the spring means comprised in actuator 105, thus permitting a returning strip to enter the guideway provided by guide bars 101 and 102; but the plate is pushed inwardly at its upper end immediately prior to and concurrently with rocking of the guide bars outwardly away from the strip, and thus, as indicated in FIG. 7a, the upper end of the strip is snapped at its upper outer edges and forced onto the free outer ends of the suspender bars.

The hinged guide bars are spread or rocked outwardly into strip-releasing attitude by linkage moved by an actuator 106 (FIGS. 5 and 6) which is secured to magazine cover plate 108. The actuator comprises a spring-stressed solenoid core of plunger 106p whose upper end is articulated to a rotatable crank-disc 106d by a pin 106c. The crank-disc is pivotally mounted on the magazine cover plate 108 at 106e and has pivotally secured thereto by crank pins a pair of draw-bars 106g and 106h which at their outer ends are pivotally secured to respective rocker-arms 101g and 102g secured to respective ones of guide bars 101 and 102. The structural arrangement is such that the spring means in actuator 106 maintains the linkages in the retracted positions indicated in FIGS. 5 and 6, and such that upon energization of the solenoid in actuator 106 the plunger is drawn downwardly to thereby rotate crank-disc 106d and cause the draw-bars to rock the guide bars outwardly as indicated by the position of guide bar 102 in FIG. 7a. This outward rocking of the guide bars occurs substantially contemporaneously with the inward thrusting of the upper end of loading plate 107, and thus permits the strip 10 to snap free of its side-edge restraints as noted, and thus to be loaded onto the free outer ends of the rods and bars. As previously indicated, actuators 105 and 106 are operated in response to passage of the top end of a returning strip past the detector station at detector means 90; and shortly thereafter the concurrent de-energization of the solenoid of actuator 103b permits the spring 103s of that actuator to retract stop plate 103. The returned strip is by that time fully loaded onto the rods and bars, and actuators 105 and 106 return to their inactive positions, returning loading plate 107 and guide bars 101 and 102 to strip-receiving positions. Entry of the newly-returned strip into the pack causes an immediate and automatic adjustment of strip-spacing by the air streams, the result of which is that each strip is separated from its next-adjacent neighbors. The magazine is thus prepared, in a very brief interval of a few milliseconds of time, for selection and release of the next-needed strip.

The loading strip 107, stop plate 103, actuators 103b, 105, and 106, and their appurtenant linkages, are mounted upon a readily removable magazine cover plate 108 which forms one side of the magazine structure. As indicated in FIGS. 5 and 6, plate 108 is removably supported at its lower end by a cross-pin 108s affixed in dependent wings 108w, and the cross-pin is supported in slots 130a formed in a protruding bracket 130b comprised in the housing or frame 130 of the apparatus. As indicated in FIGS. 1 and 2, the upper end of plate 108 is secured in proper relative position to the magazine frame means 130 by conventional quick-disconnect attachment means 130q. Thus the plate and loading means forming the front of the magazine may be easily removed for exchange of one set of information strips 10 by a different set from a storage file. To facilitate this operation the side face cover of the magazine is formed as a transparent door 109a (FIG. 1a) which may be opened for strip-pack replacement. This cover or door is constructed and disposed to leave the upper portion of the magazine open, as indicated in FIG. 1a, so as to permit exhaust of the air streams which pass downwardly between the suspended strips.

ELECTRICAL MEANS AND OPERATIVE DESCRIPTION (FIG. 16)

Turning now to FIG. 16, schematically depicted therein is the basic random access storage device 150 of FIG. 1, including the pertinent electrical means incorporated therein for actuating the various mechanical components of the device 150. The construction and operation of these electrical means as well as the overall operation of the device 150 will become evident from the following description of a typical operative sequence.

When the device 150 is in operation, the capstan 40a will be turning at its normal speed. To release a selected strip 10 for reading or writing thereon, a release strip signal $e_r$ is applied to release strip actuation circuitry 230 to permit strip selection signals $e_1$–$e_8$ to pass therethrough to the generally illustrated selecting and releasing means 30, which thereupon functions to release only the selected strip therefrom. The release strip actuation circuitry 230 is constructed and arranged in any well-known manner to provide the necessary signals for application to the selecting and releasing means 30 for proper operation thereof, such as, for example, is described in connection with FIG. 10 through 15.

Once released, the selected strip falls freely until it engages the rotating capstan 40a, and is then rapidly accelerated to capstan velocity. As the strip is carried along by capstan 40a, it encounters position-sensing means 60i, write heads 60n, position-sensing 60j, and read heads 60m in that order before approaching the vicinity of the return gate 70. Position-sensing means 60i and 60j provide output signals PE–2 and PE–3, respectively, in response to the sensing of the leading edge of the strip. These signals PE–2 and PE–3 are fed to the controller 250 for control purposes which will hereinafter be explained in considerable detail. While the strip is passing the read and write heads 60m and 60n, either reading or writing or both may be performed in one or more channels provided on the strip, typical read and write signals being designated in FIG. 16 as $r_1$–$r_8$ and $w_1$–$w_8$, respectively.

If the return gate 70 is closed when the leading edge of the strip arrives, the strip will remain on the capstan 40a and again be recirculated past the read and write heads 60m and 60n and the position-sensing means 60i and 60j, during which another read, write, or combined operation may be performed. Thus, by keeping the return gate 70 closed, any desired number of recirculations of a strip may be obtained. If, on the other hand, the return gate 70 is open when the strip arrives thereat (either following the first pass of the strip or any following pass) the return gate 70 will act to peel the strip from the capstan 40a and direct it into the guide means 80 for return to the stack of strips 10. Opening and closing of the return gate 70 are accomplished by a release gate open signal RG and a release gate close signal RG', which are applied to the return gate 70 from the controller 250 (FIG. 1a) through suitable return gate actuation circuitry 270. The conditions determining when these return gate signals RG and RG' are applied will be considered in considerable detail hereinafter. The construction and arrangement of the return gate actuation circuitry 270 in FIG. 16 may be of conventional form and is chosen so as to provide proper actuation of return gate 70, a typical embodiment of return gate 70 being illustrated in FIGS. 3 and 3a.

After leaving the return gate 70, the strip passes upward through the guide means 80, through the upper portion 85u thereof, past the position-sensing means 90, and down into engagement with the generally indicated magazine loading means 100. The output signal PE-1 obtained from position-sensing means 90 in response to the passage of the strip thereby is fed to loading actuation circuitry 205, which provides signals for the magazine loading means 100 such that the strip is returned into engagement with the selecting and releasing means 30 from which it was released. The strip is thus again made available for selection. The loading actuation circuitry 205 is constructed and arranged in any well-known form so as to provide proper operation of the loading means 100, a typical embodiment of the magazine loading means 100 being illustrated in FIGS. 5, 6, 6a, 7, and 7a.

GENERAL DESCRIPTION OF THE ARRANGEMENT OF THE DATA PROCESSOR 180 WITH A PLURALITY OF RANDOM ACCESS STORAGE UNITS (FIGS. 17 AND 18)

Now that the construction and operation of the basic random access storage device 150 has been described in some detail, the general arrangement of the high-speed electronic data processor 180 with one or more random access storage units $M_1$ and $M_2$ will next be considered with reference to FIGS. 17 and 18. It will be remembered from the previous description of the overall system shown in FIG. 1, that each of the random access storage units $M_1$ and $M_2$ comprises the basic random access storage device 150 (just described) and a controller 250 for coordinating communications between the data processor 180 and each of the basic random access storage devices 150.

Considering FIG. 17 first, it will be seen that the data processor 180 is provided with five sets of lines for communication with the controller 250 of each of the random access storage units $M_1$ and $M_2$. These communication lines are as follows: (1) processor information output lines $PO_1$ to $PO_8$ which are used to transfer information signals from the high-speed electronic data processor 180 to a selected one of the storage units $M_1$ and $M_2$, (2) processor information input lines $PI_1$ to $PI_8$ which are used to transfer information signals from a selected random access storage unit to the processor 180, (3) processor control lines $J_1$ to $J_{10}$ which are used to transfer information signals from the processor 180 to a selected unit, (4) common unit status lines $S_1$ to $S_7$ which serve to carry status signals from a selected random access storage unit to the data processor 180, and (5) individual unit status lines $M_1S_8$ to $M_1S_{10}$ for random access storage unit $M_1$, and $M_2S_8$ to $M_2S_{10}$ for random access storage unit $M_2$, which are used to provide concurrent indications to the processor of certain particular status conditions.

It will be noted from FIG. 17, that the sets of lines in categories (1) to (4) above, that is, processor information output lines $PO_1$ to $PO_8$, processor information input lines $PI_1$ to $PI_8$, processor control lines $J_1$ to $J_{10}$ and common unit status lines $S_1$ to $S_7$ are common to all random access storage units; that is, only one set of such lines is provided for the data processor 180, the corresponding lines of each of the random access storage units $M_1$ and $M_2$ being connected in parallel therewith. In order to prevent confusion between units, as a result of such parallel connections, only one unit is selected at a time and the common lines are permitted to communicate only with the selected unit. As will hereinafter become evident, such an arrangement permits a very considerable simplification in the circuitry and wiring that would otherwise be necessary. On the other hand, as also indicated in FIG. 17, the remaining set of lines in category (5) above, that is, unit status lines $M_1S_8$ to $M_1S_{10}$ and $M_2S_8$ to $M_2S_{10}$ are not common to all units, but are made up of individual status lines fed to the processor 180 from each unit. This is done so that certain status conditions are continuously made available to the processor, regardless of which unit is selected. In FIG. 17 only two groups of unit status lines are necessary, since only two units $M_1$ and $_2$ are illustrated. It is to be understood, however, that any number of units may be provided and connected in the same manner as illustrated for units $M_1$ and $M_2$ in FIG. 17.

With the general description of FIG. 17 in mind, the more detailed illustration of FIG. 18 will now be readily understood. FIG. 18 shows only the random access storage unit $M_1$, but it is to be understood that the random access storage unit $M_2$ may be similarly arranged. It will be seen from FIG. 18, that ten control lines $J_1$ to $J_{10}$ are provided to the controller 250 from the processor 180. A short identification of the particular control signal which is to be carried by each control line is written adjacent thereto. Also, eight processor information output lines $PO_1$ to $PO_8$ and eight processor information input lines $PI_1$ to $PI_8$ are provided for the communication of information signals between the processor 180 and the controller 250. For example, the information signals on processor output lines $PO_1$ to $PO_8$ may typically contain (at various times) four sets of information signals corresponding to the unit number of the random access unit to be selected, the strip number of a strip to be released, the channel number of the selected strip in which data is to be written or from which data is to be read and, also, the particular data which is to be written in the selected channel. Processor information input lines $PI_1$ to $PI_8$, on the other hand, typically contain only the data read from a selected channel of a released strip.

In addition to the processor control lines $J_1$ to $J_{10}$ and the processor information output and input lines $PO_1$ to $PO_8$ and $PI_1$ to $PI_8$, FIG. 18 also shows the common unit status lines $S_1$ to $S_7$ along with a short identification of the particular status signal carried by each status line. Further shown in FIG. 18 are the particular unit $M_1$ status lines $M_1S_8$ to $M_1S_{10}$ along with their appropriate status signal identifications. The functions of all these signals and the manner in which they are used and/or generated by the controller 250 will become evident from the further description provided in considerable detail hereinafter. Also, for convenience of notation in the remainder of the description and in the remaining figures of the drawings, the designations $J_1$ to $J_{10}$, $S_1$ to $S_7$, and $M_1S_8$ to $M_1S_{10}$ will be employed to refer to both the lines and the signals carried thereby. However, the designations $PI_1$ to $PI_8$ and $PO_1$ to $PO_8$ will continue to refer only to the processor input and output lines.

With regard to communication between the controller 250 and the basic random access storage device 150, it will be seen by reference to FIG. 16 along with FIG. 18 that suitable communication lines are provided between the controller 250 and the basic random access device 150 for transfer therebetween of the release strip signal $e_r$, the return gate signal RG, and the return gate close signal RG', as well as for the strip selection signals $e_1$–$e_8$, write signals $w_1$–$w_8$, read signals $r_1$–$r_8$, and position-sensing signals PE–1, PE–2, and PE–3 from position-sensing devices 90, $60i$, and $60j$, respectively. Also, error lines 150b are provided for the communication of error signals between units, as will be explained further on in this description. Additionally illustrated in FIG. 18 are power supply lines 150a from the controller 250 to the basic random access storage device 150 for the purpose of providing the power necessary for proper operation of the basic random access storage device 150 in the manner described previously. The provision of suitable power supply sources in the controller 250 and their connection to the various components of both the controller 250 and the basic random access storage device 150 is well within present knowledge in the art and, thus, will not be further shown or described. Consequently, in the description and in the figures of the drawings, it may be assumed that suitable power sources are included in each of the various components as may be required for the proper operation thereof.

GENERAL DESCRIPTION AND OPERATION OF THE PROCESSOR CONTROL SIGNALS $J_1$ TO $J_{10}$ (FIGS. 16–18)

Before considering the controller 250 in detail, it will be helpful for the further description to follow, to functionally describe the operations which are performed by each of the processor control signals $J_1$ to $J_{10}$, and their relation to the four sets of information signals carried by processor information output lines $PO_1$ to $PO_8$. The origin of these signals may be understood by remembering that, as mentioned previously, the processor 180 (FIG. 17) operates in accordance with one or more commands to process the data applied thereto, and to communicate with any input, output, or input-output units for the purpose of transferring data to or receiving data from such units as may be required in the command program. Certain ones of these commands, or certain portions of these commands, are preferably chosen specifically for the purpose of permitting communication between the processor 180 (FIG. 17) and one or more of the random access storage units. The discussion of typical forms of such commands will be reserved until later on in this description, after familiarity has been gained with regard to the workings of the controller 250, so as to permit these commands to be best understood. All that need be noted at the present time is that the control signals $J_1$ to $J_{10}$ and the sets of information signals carried by lines $PO_1$ to $PO_8$, which are now under consideration, are produced by the processor as a result of operation thereof in accordance with one or more of such commands.

It is also to be noted at this time that each of the control signals $J_1$ to $J_{10}$, as well as each of the information signals carried by lines $PO_1$ to $PO_3$, may typically be in the form of a pulse of relatively short duration. In any case, it is to be understood that both the magnitude and the time duration of these signals are chosen in a conventional manner so as to be sufficient for their intended purposes to be described herein. It is further to be noted that control signals $J_1$ to $J_{10}$ and the sets of information signals carried by output lines $PO_1$ to $PO_8$, being common to all random access storage units, are transmitted to all units at the same time. However, only the one selected unit is permitted to respond to these signals. Similiarly, only the read signals from the selected unit are permitted to be transmitted to the processor by way of lines $PI_1$ to $PI_8$.

With the above preliminary discussion of the control signals $J_1$ to $J_{10}$ and the information signals carried by lines $PO_1$ to $PO_8$ serving as background, the specific purpose and operative function of each of these signals will next be considered. Below, each of the control signals $J_1$ to $J_{10}$ is listed along with a description of its particular purpose and the operation in unit $M_1$ initiated thereby.

Also, where applicable, the description will consider the relation of the control signals to the four sets of information signals transmitted by the processor on output lines $PO_1$ to $PO_8$ concurrently with respective ones of the control signals $J_1$ to $J_{10}$. Additionally, where applicable, the description will further consider the relation of control signals $J_1$ to $J_{10}$ to the head signals $r_1$–$r_8$ sent to the processor from the selected random access unit by way of processor input lines $PI_1$ to $PI_8$.

*Select Signal $J_1$.*—Select Signal $J_1$ is transmitted by the processor concurrently with a first set of information signals $u_1$–$u_8$ on lines $PO_1$ to $PO_8$. These information signals $u_1$–$u_8$ designate the particular random access storage unit which is to be selected and, in conjunction with signal $J_1$, operate to select the designated unit, while inhibiting selection of all other units.

*Set Unit Interrupt Signal $J_2$.*—Set Unit Interrupt Signal $J_2$ serves to set a selected random access storage unit for unit interrupt operation so that the unit, when in a suitable condition for a read or write operation, will be capable of interrupting the processor program, if the processor is programmed to permit such unit interrupt operation to occur.

*Reset Unit Interrupt Signal $J_3$.*—Reset Unit Interrupt Signal $J_3$ serves to reset (or nullify) the effect of the setting operation performed on a selected unit by Set Unit Interrupt Signal $J_2$.

*Test Begin Signal $J_4$.*—Test Begin Signal $J_4$ is transmitted to a selected random access storage unit by the processor to inform the unit that the processor is testing the unit to determine whether a released strip is in the minimum access position—that is, in a position such that the leading edge of a released strip is located between position-sensing devices $60i$ and $60j$, in which position the unit is able to perform a read or write operation with a minimum of delay.

*Read Signal $J_5$.*—Read Signal $J_5$ is transmitted to a selected random access storage unit concurrently with a second set of information signals $ch_1$–$ch_8$ on lines $PO_1$ to $PO_8$. These information signals $ch_1$–$ch_8$ designate the channel number of the selected strip in which reading, is to take place and, if the selected unit is ready for a read operation, Read Signal $J_5$ will initiate the storage of these channel number signals $ch_1$–$ch_8$ and prepare the selected unit for a read operation. When the leading edge of a released strip on the capstan next reaches position-sensing device $60j$, it will be in the proper position with respect to the read and write heads $60m$ and $60n$ (FIG. 16) for the reading operation to start. At this time, reading of the data in a channel selected in accordance with the stored channel signals $ch_1$–$ch_8$ will automatically be initiated, and the read signals $r_1$–$r_8$ produced during reading will be fed to the processor by way of processor input information lines $PI_1$ to $PI_8$.

*Write Signal $J_6$.*—Write Signal $J_6$, like Read Signal $J_5$, is transmitted concurrently with channel information signals $ch_1$–$ch_8$ and, if the unit is ready, Write Signal $J_6$ initiates storage of channel signals $ch_1$–$ch_8$ and prepares the unit for writing in basically the same manner as occurs for Read Signal $J_5$. When the leading edge of a released strip next reaches position-sensing device $60j$, the processor will automatically be initiated to start the writing operation, as a result of which, a third set of information signals corresponding to write signals $w_1$–$w_8$ will be transmitted to the unit by way of processor output lines $PO_1$ to $PO_8$ for writing in the selected channel on the released strip. Also, in order to provide a check of the data written into the selected channel of the released strip, a reading operation is initiated by signal $J_6$ along with the writing operation, the read signals $r_1$–$r_8$ thereby produced being sent to the processor for checking by way of processor input lines $PI_1$ to $PI_8$.

As a safety measure, a write lockout switch is provided on each random access storage unit which prevents writing therein. If this switch is on, the Write Signal $J_6$ will not be permitted to initiate any of the operations described above. The write lockout feature is provided to insure against inadvertently destroying data stored in a particular unit in the event that the unit remains connected to the processor for other than writing operations.

*Halt Signal $J_7$.*—Halt Signal $J_7$ is transmitted to the selected random access storage unit by the data processor after completion of the read or write operation initiated by the leading edge of a released strip reaching position-sensing device $60j$, as described above in connection with Read Signal $J_5$ and Write Signal $J_6$. The time of occurrence of the Halt Signal $J_7$ is determined by the processor based on the length of data which is to be read from or written into the selected channel, and may conveniently be made variable for greater system flexibility.

*Return Strip Signal $J_8$.*—Return Strip Signal $J_8$ is provided by the processor for the purpose of removing a strip from the capstan and returning it to the stack whenever such a removal is expedient for the processor and, in addition, the basic random access storage device 150 is in the proper state to permit such action to occur.

Removal of a strip from the capstan is also initiated by signals $J_9$ and $J_{10}$, as will be brought out in the following descriptions thereof. Additionally, to prevent excessive strip wear, removal of a strip is caused to occur without the need of any control signal, whenever a strip remains on the capstan for a predetermined period of time without any of the Control Signals $J_4$, $J_5$, $J_6$, $J_9$ or $J_{10}$ being applied to the selected unit.

*Call Strip Signal $J_9$.*—Call Strip Signal $J_9$ is transmitted by the processor to a selected random access storage unit concurrently with a fourth set of information signals $e_1$–$e_8$ on lines $PO_1$ to $PO_8$. These information signals are the strip selection signals $e_1$–$e_8$ which designate the particular strip which is to be released in device 150 (FIG. 16). If the leading edge of a previously released strip has already reached position-sensing device $60i$ for the first time (that is, if the selected unit is not busy), the signal $J_9$ will initiate the generation of release strip signal $e_r$ (FIGS. 16 and 18) and, at the same time, gate strip selection signals $e_1$–$e_8$ to the release strip actuation circuitry 230 (FIG. 16) to release the newly selected strip.

Call Strip Signal $J_9$ also acts on the selected random access storage unit in a manner so that, following release of the new strip, the previous strip is permitted to remain on the capstan for only one more recirculation during which an opportunity is provided for the performance of a read or write operation. Of a read or write signal $J_5$ or $J_6$ is given after the new strip is released, but too late for the previous strip, this situation is noted and steps are taken to prevent a read or write operation from being performed on the newly released strip for which it is not intended. This mode of operation, thus, permits a new strip to be released without having to wait for the previous strip to leave the capstan and, at the same time, permits one more read or write operation of the previous strip, while insuring against reading or writing on the wrong strip.

*Drop Strip Signal $J_{10}$.*—Drop Signal $J_{10}$ cooperates with concurrently transmitted information signals $e_1$–$e_8$ on lines $PO_1$ to $PO_8$ to release a selected strip in the identical manner described for the Call Strip Signal $J_9$ in the previous paragraph. Also, as was the case for Call Strip Signal $J_9$, Drop Strip Signal $J_{10}$ acts on the selected unit to permit a previous strip to remain on the capstan for only one more recirculation following release of the new strip. However, unlike signal $J_9$, the Drop Strip Signal $J_{10}$ initiates a different mode of operation such that no further reading or writing is permitted on the previous strip on the capstan, the next read or write operation being performable only on the new strip.

This mode of operation initiated by Drop Strip Signal $J_{10}$ may conveniently be employed by the processor where reading or writing has already been completed on the strip on the capstan before the new strip is released. In such a situation, the next read or write signal $J_5$ or $J_6$ is intended for the new strip, and the mode provided by Drop Strip Signal $J_{10}$ neatly insures that the next read or write operation can be performed only on the newly released strip, and not on the previous strip.

GENERAL DESCRIPTION OF STATUS SIGNALS $S_1$ TO $S_7$ AND $M_1S_8$ TO $M_1S_{10}$ (FIGS. 16–18)

Now that the operation of the control signals $J_1$ to $J_{10}$ has been generally described, a general description of the indications provided by status lines $S_1$ to $S_7$ and $M_1S_8$ to $M_1S_{10}$ will next follow. Below, each status line is listed with a description of its pertinent characteristics, the common status lines $S_1$–$S_7$ being listed first, followed by the individual unit $M_1$ status lines $M_1S_8$ to $M_1S_{10}$. It is important to note with respect to the following status line descriptions that, since status lines $S_1$ to $S_7$ are common to all random access storage units, the signals provided by the common status lines $S_1$ to $S_7$ of a particular unit are made available to the processor only when that particular unit has been selected. On the other hand, since the individual status lines, such as $M_1S_8$ to $M_1S_{10}$ are separately provided for all units, the status signals provided by these individual status lines will continuously be available to the processor, regardless of the unit selected. Where applicable, the descriptions of each status signal will be related to the operations initiated by the previously described control signals $J_1$ to $J_{10}$.

*Write Lockout Signal $S_1$.*—Write Lockout Signal $S_1$ indicates that the selected random access storage unit has been placed in a condition such that it will not permit writing on any of the strips in its respective device 150. As mentioned previously in connection with Write Signal $J_6$, this write lockout feature is provided for the purpose on insuring that information will not be destroyed on any of the strips of a particular unit as a result of inadvertent writing operations, such as could conceivably occur if the unit remained connected to the processor, even though no writing is desired on any of its strips.

Write Lockout Signal $S_1$ may conveniently be turned on or off by a switch provided in each random access storage unit.

*Error Signal $S_2$.*—Error Signal $S_2$ serves to indicate to the processor that an error has occurred somewhere in the random access storage unit as a result, for example, of the failure of some component either in the controller 250 or in the basic device 150. The provision of such an Error Signal $S_2$ permits the data processor 180 to take any corrective action for which it has been programmed.

Error Signal $S_2$ is turned on by the detection of an error, and may be turned off by a manual push-button switch provided with each unit.

*Busy Signal $S_3$.*—Busy Signal $S_3$ indicates to the data processor that a previously released strip has not yet reached position-sensing device $60i$ (FIG. 16) for the first time. While Busy Signal $S_3$ is on, neither Call Strip Signal $J_9$ nor Drop Strip Signal $J_{10}$ will be permitted to initiate the release of a new strip.

Busy Signal $S_3$ is turned on in response to the release of a strip initiated by Call Strip Signal $J_9$ or Drop Strip Signal $J_{10}$, and is turned off when the leading edge of the released strip first reaches the position-sensing device $60i$.

*Ready Signal $S_4$.*—Ready Signal $S_4$ indicates to the data processor that the selected unit is ready to receive a Read Signal $J_5$ or a Write Signal $J_6$ for the initiation of a read or write operation, or is ready to receive a Return Strip Signal $J_8$ to initiate the return of a strip on the capstan back to the stack. If Ready Signal $S_4$ is not on, neither a Read Signal $J_5$ nor a write signal $J_6$ will be effective to initiate a read or write operation.

Ready Signal $S_4$ is turned on when Busy Signal $S_3$ turns off, that is, when the released strip reaches position-sensing device 60$i$ for the first time. Ready Signal $S_4$ is turned off when any of the following situations occur: (1) return gate 70 opens, or (2) Drop Strip Signal $J_{10}$ initiates release of a new strip, or (3) a Call Strip Signal $J_9$ which releases a new strip is followed by Read Signal $J_5$ or Write Signal $J_6$, or (4) Wrong Strip Signal $S_5$ (described below) turns on.

*Wrong Strip Signal $S_5$.*—Wrong Strip Signal $S_5$ indicates to the data processor that no strip was on the capstan when Call Strip Signal $J_9$ was transmitted or, that following the release of a new strip by Call Strip Signal $J_9$, a read or write operation was not performed on a previous strip on the capstan, in response to Read Signal $J_5$ or Write Signal $J_6$. By means of Wrong Strip Signal $S_5$, therefore, the processor is able to prevent a read or write operation from being performed on the newly released card for which it is not intended.

Wrong Strip Signal $S_5$ is turned on if the return gate 70 is open when a Call Strip Signal $J_9$ is transmitted or, if following a Call Strip Signal $J_9$, the return gate 70 opens before a Read Signal $J_5$ or a Write Signal $J_6$ is given. Wrong Strip Signal $S_5$ is turned off when the next Call Strip Signal $J_9$ or Drop Strip Signal $J_{10}$ initiates the release of a new strip.

*Begin Signal $S_6$.*—Begin Signal $S_6$ indicates to the data processor that a strip on the capstan is in the minimum-access position—that is, in a position such that the leading edge of the strip is located between position-sensing devices 60$i$ and 60$j$. In such a position, the unit is able to perform a read or write operation in response to Read Signal $J_5$ or Write Signal $J_6$ with a minimum of delay.

Begin Signal $S_6$ is turned on whenever the leading edge of a released strip first reaches position-sensing device 60$i$ if Ready Signal $S_4$ is on, or immediately goes on, and the unit is set for unit interrupt operation. Begin Signal $S_6$ turns off when the leading edge of the card reaches the second position-sensing device 60$j$.

*Operate Signal $S_7$.*—Operate Signal $S_7$, when turned on, indicates to the data processor that a Read Signal $J_5$ or Write Signal $J_6$ has previously been given to the selected unit when the unit was ready, and that now the leading edge of a strip has reached position-sensing device 60$j$ so as to be in the proper position for the processor to start to receive and/or write data from and/or into the selected channel on the strip.

Operate Signal $S_7$ is turned on if the Wrong Strip Signal $S_5$ and Error Signal $S_2$ are both off when a strip on the capstan reaches position-sensing device 60$j$, following the transmission of Read Signal $J_5$ or Write Signal $J_6$ transmitted when Ready Signal $S_4$ was on. Operate Signal $S_7$ is turned off by Halt Signal $J_7$ transmitted by the processor after completion of the read or write operation.

*Unit Select Signal $M_1S_8$.*—Unit Select Signal $M_1S_8$ continuously indicates to the data processor whether or not its respective random access storage unit $M_1$ has been selected. If more than two units are selected, as will be indicated by having more than one unit select signal on at the same time, the data processor may be caused to take apropriate corrective action.

Unit Select Signal $M_1S_8$ is turned on whenever information signals $u_1$–$u_8$ transmitted concurrently with Select Signal $J_1$ cause unit $M_1$ to be selected, and is turned off whenever any other unit is selected.

*Unit Interrupt Signal $M_1S_9$.*—Unit Interrupt Signal $M_1S_9$ continuously indicates to the data processor whether or not its respective unit $M_1$ has been set for unit interrupt operation.

Unit Interrupt Signal $M_1S_9$ is turned on in a selected unit by Set Unit Interrupt Signal $J_2$, and turned off by Reset Unit Interrupt Signal $J_3$.

*Processor Interrupt Signal $M_1S_{10}$.*—Processor Interrupt Signal $M_1S_{10}$, upon being turned on, signals the processor that its respective unit $M_1$ has a strip in a minimum-access position and that the processor should interrupt its program to perform a read or write operation if it is possible for the processor to do so. Processor Interrupt Signal $M_1S_{10}$ differs from Begin Signal $S_6$ in that, unlike Begin Signal $S_6$, Processor Interrupt Signal $M_1S_{10}$, when turned on, is made available to the processor, whether or not unit $M_1$ is selected, or whatever else the processor may be doing, in order to permit the processor, if it chooses to do so, to interrupt its program and perform a read or write operation.

Processor Interrupt Signal $M_1S_{10}$ is turned on whenever the leading edge of a strip reaches position-sensing device 60$i$, if Unit Interrupt Signal $M_1S_9$ is on and if Ready Signal $S_4$ is also on, or immediately goes on. Processor Interrupt Signal $M_1S_{10}$ is turned off by any of the following: (1) the leading edge of a strip reaching position-sensing device 60$j$, or (2) the selection of unit $M_1$ in response to Select Signal $J_1$, or (3) by Reset Unit Interrupt Signal $J_3$.

GENERAL DESCRIPTION OF CONTROLLER 250 (FIGS. 19-21)

Figure 20:
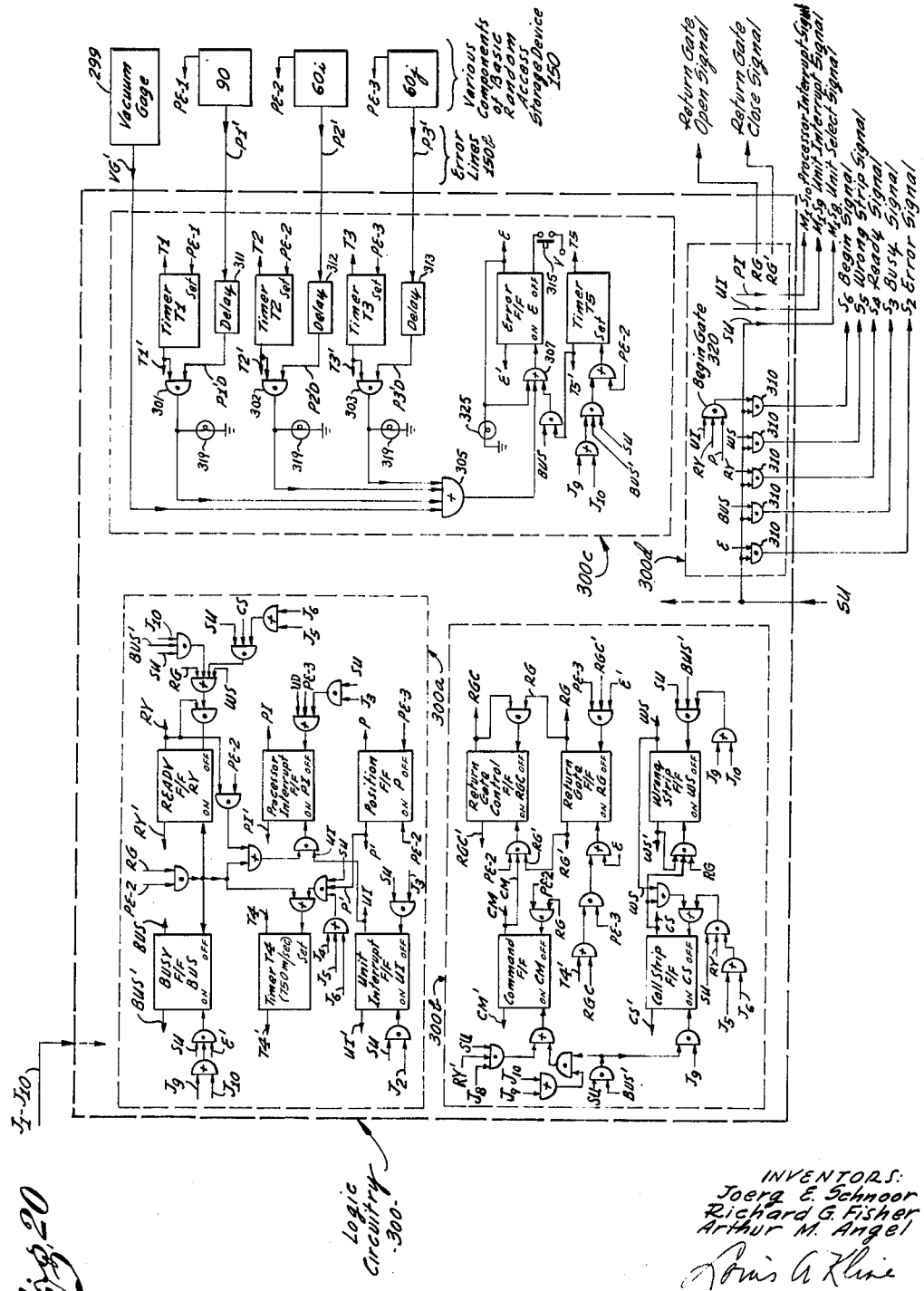
FIG. 20 is a circuit diagram of the logic circuitry 300 shown in block form in FIG. 19.
Figure 21:
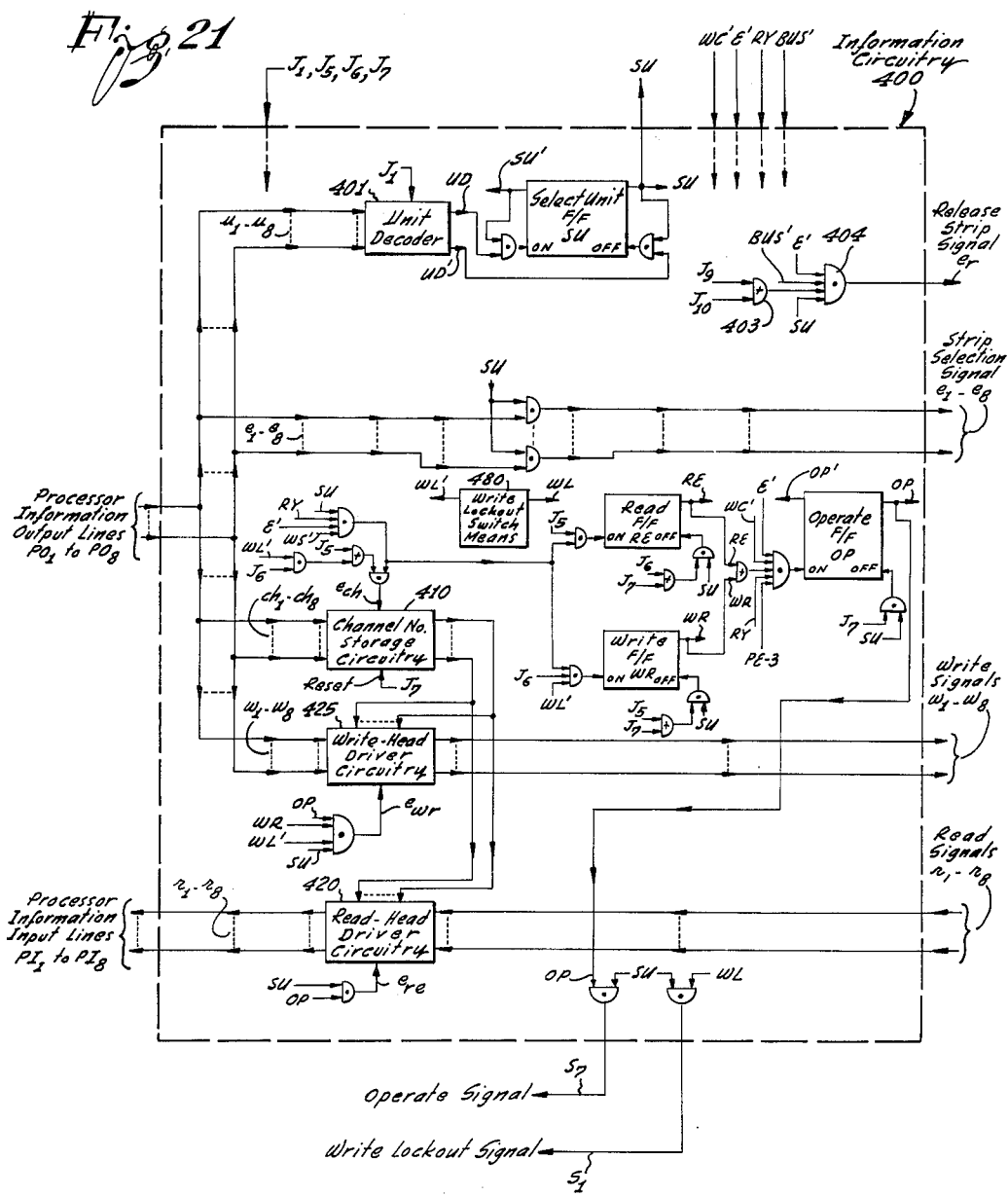
FIG. 21 is a circuit diagram of the information circuitry 400 shown in block form in FIG. 19.

Having described the general arrangement of the processor 180 with a plurality of random access storage units $M_1$ and $M_2$ and the signals carried by communication lines $J_1$ to $J_{10}$, $PO_1$ to $PO_8$, $PI_1$ to $PI_8$, $S_1$ to $S_7$, and $M_1S_8$ to $M_1S_{10}$ provided therebetween, a typical embodiment of the controller 250 contained in each random access storage unit will now be considered in detail. Before doing so, however, it will be helpful to note that the separation of each random access storage unit into a block designated as the basic random access storage device 150 (previously described in connection with FIGS. 1$a$ to 16) and a block designated as the controller 250 (FIG. 18) is done merely on a functional basis, in order to permit the present invention to be more easily described and understood. As a practical matter, it may be more suitable to physically locate various components of the controller 250 in close proximity to one or more components of the basic device 150, and vice versa. It is to be understood, therefore, that the separation of the random access storage unit into a controller 250 and a basic device 150 is merely functional, and that the specific physical arrangement may be provided in any desired manner which will be most appropriate taking into account various factors, such as engineering considerations, wiring connections, distributed capacitance, etc. It may also be noted at this time that the controller 250, a typical embodiment of which is illustrated in FIGS. 19-21, is also shown as being made up of various blocks or sections. However, as is the case for the device 150, the separation of the controller 250 into sections does not necessarily represent the physical arrangement of the components, but is merely a convenient functional separation provided for ease of description and illustration.

Referring now to FIG. 19, the basic arrangement of the controller 250 is illustrated. It will be seen that the controller 250 is functionally separated into a portion designated logic circuitry 300 and a portion designated information circuitry 400. As mentioned in the previous paragraph, this separation is merely on a functional basis and does not necessarily represent the physical location of the various components. Also illustrated in FIG. 19 are the connecting lines provided between the controller 250 and the data processor, as well as the connecting lines provided between the controller 250 and the basic device 150. Each connecting line is shown as emanating from or being fed to the particular block (either the logic circuitry 300 or the information circuitry 400) with which it is associated. Further shown in FIG. 19 are various internal connecting lines in the controller 250 provided between the logic circuitry 300 and the information circuitry 400, the purposes of which become evident as the description of the typical embodiment of the controller 250 progresses.

Now turning to the typical embodiments of the logic circuitry 300 and the information circuitry 400 shown in FIGS. 20 and 21, respectively, various preliminary considerations will first be considered. Starting with the various flip-flops shown in FIGS. 20 and 21 (and designated F/F), it is to be understood that all of these flip-flops may be of conventional design. More specifically, the exemplary flip-flops shown in FIGS. 20 and 21 are each provided with an on input and an off input to which trigger signals are applied to switch the flip-flop from one state to the other. Operation is such that when a trigger signal (hereinafter referred to as a true signal) is applied to the on input of a flip-flop, the flip-flop is switched on if it happens to be off, or, if the flip-flop is already on, it will remain on. In a like manner, when a true signal is applied to the off input of the flip-flop, the flip-flop will be switched off if it happens to be on, or if the flip-flop is already off, it will remain off.

Also, once a flip-flop has been switched to one of its two states, that is either on or off, it will remain in the state to which it was last switched until the opposite input again becomes true. For example, if a flip-flop was last switched to the on state, additional true signals applied to its on input merely cause the flip-flop to remain on. It is only when a true signal is applied to the off input that the flip-flop will be switched off. If true signals are applied to both on and off inputs concurrently, the input whose true signal persists the longest will determine the final state of the flip-flop.

As is conventional, each of the flip-flops shown in FIGS. 20 and 21 is provided with two inverse outputs, one output being designated by the flop-flop abbreviation, and the other output being designated by the flip-flop abbreviation primed. For example, the Busy flip-flop in section 300a of FIG. 20 has the abbreviation BUS. Thus, the unprimed output thereof is designated BUS and the primed output thereof is designated BUS'. As is also conventional, the unprimed output of the flip-flop is the one which is true when the flip-flop is on the flalse. when the flip-flop is off. The primed output of the flip-flop is, of course, always the inverse of the unprimed output and thus will be false when the flip-flop is on and true when the flip-flop is off. Using the Busy flip-flop as an example again, this means that when the Busy flip-flop is on the unprimed output BUS is true and the primed output BUS' is false, and vice versa when the Busy flip-flop is off.

An additional point to recognize with regard to the flip-flops shown in FIGS. 20 and 21, is that the block form representation thereof is to be considered as including any of various well-known forms of associated circuitry which may be necessary or desirable to provide the operation of each flip-flop required for the present invention. For example, each flip-flop may include suitable circuitry to prevent retriggering and/or reduce the sensitivity of the flip-flop to noise signals. Also, as will be considered more specifically later on in this description, each flip-flop may suitably include means for delaying switching of the flip-flop in response to a true signal applied to the on or off inputs thereof, or for delaying the effects of switching from appearing at the outputs of the flip-flop, such as may be required for proper operation of the system logic. Such means are well known in the art and will, therefore, not be considered in detail in this description.

Turning next to the logical networks provided in FIGS. 20 and 21 for triggering the flip-flops, it will be seen that these are comprised of combinations of two types of logic elements, these being the well-known AND gates and OR gates. Each AND gate is represented in FIGS. 20 and 21 by a semicircle having a dot in the center thereof, while each OR gate is represented by a seim-circle with a plus sign in the center thereof. As is well known, the output of an AND gate is true only if all of its input signals are true, while the output of an OR gate is true if any one of its inputs is true. By proper combination of these AND and OR gates, as shown in the typical embodiments of FIGS. 20 and 21, the conditions required for triggering each flip-flop in accordance with the present invention are achieved, as will become evident from the further description provided herein.

Still considering the AND and OR gates in FIGS. 20 and 21, it will be noted that instead of showing the specific wiring from each of the flip-flop outputs, or from each of the control signals $J_1$ to $J_{10}$, to every AND and OR gate to which that flip-flop output or control signal is applied, the inputs to the AND and OR gates are merely designated by the flip-flop output or control signal corresponding thereto. This is done in order to prevent confusion of FIGS. 20 and 21 and to make understanding thereof easier. Also, to further simplify FIGS. 20 and 21, driver or amplifier circuitry which may be desirable at various points in the logical networks formed by the AND and OR gates are not shown specifically. However, such circuits are well known in the art and may be considered as appropriately included in the AND and OR gates wherever desirable.

Besides the flip-flops and AND and OR gates, FIGS. 20 and 21 also illustrate a number of timers, namely timers T1 to T5, all of which, like the flip-flops may be of conventional form. Specifically, the operations of each of these timers is such that the application of a true signal to the set input of the timer causes the timer to be switched on for the predetermined time for which the timer is designed. If the timer is already on when a true signal is applied to its set input, the timer will remain on, but will start timing all over again from the beginning. For example, timer T4 shown in section 300a of FIG. 20 is designed to remain on for 750 milliseconds after being switched on by a true signal applied to its set input. If timer T4 has already been on for 500 milliseconds when the set input becomes true, it will remain on for an additional 750 milliseconds. Like each of the flip-flops, each of timers T1 to T5 has two inverse outputs, the unprimed output of the timer being true when the timer is on and false when the timer is off, and vice versa for the primed output. For example, when timer T4 is on, unprimed output T4 is true while primed output T4' is false, and vice versa when timer T4 is off.

Before leaving these preliminary considerations concerning FIGS. 20 and 21, it should be remembered that each of the control signals $J_1$ to $J_{10}$ is typically a short duration true pulse. Similarly, each of the signals PE–1, PE–2, and PE–3 is also typically a short duration true pulse, which is generated when the leading edge of a strip reaches the respective position-sensing device 90, 60i, or 60j.

In order to illustrate just how the flip-flops in FIGS. 20 and 21 are switched by the signals and logical networks associated therewith, typical signal waveforms are shown in FIG. 21a illustrating the switching on of the Busy flip-flop (section 300a in FIG. 20) in response to the release of a strip, and the switching off of the Busy flip-flop when the strip first reaches position-sensing device 60i. These waveforms in FIG. 21a may be considered as illustrative of the various other signals employed in the overall system logic.

Referring to FIG. 21a in detail, each signal waveform is given the same designation as its corresponding signal in FIGS. 20 and 21, the true level being typically 2 volts and the false level being typically 0 volts. Rise time and decay problems are ignored in FIG. 21a since they are not of particular significance in the present invention and it may be assumed that various well-known expedients are employed to overcome any such problems which may exist. It will be seen in FIG. 21a that, at time $t_0$, the processor transmits Select Signal $J_1$ causing the unit decoder 401 in FIG. 21 of the selected unit to produce the true pulse UD which in turns switches on the Select flip-flop of the selected unit to make SU true. Assuming that E' is also true (that is, there is no error in the selected unit so that the Error flip-flop of section 300c is off) then, when Call Strip Signal $J_9$ is transmitted at time $t_1$ to release a selected strip, the Busy flip-flop on input will become true to switch on the Busy flip-flop. The unprimed output BUS of the Busy flip-flop will then become true after the built-in delay period "$d$" which may be designed into the Busy flip-flop.

Still referring to FIG. 21a, when the strip released by Call Strip Signal $J_9$ reaches position-sensing device $60i$ for the first time at some later time $t_3$, the true pulse PE–2 will be generated. Since RG is also normally true (that is, the Return Gate flip-flop is on and the return gate is open), a true pulse now appears at the Busy flip-flop off input to switch off the Busy flip-flop and cause BUS to become false again after the built-in delay period "$d$."

BOOLEAN EQUATIONS FOR THE FLIP-FLOPS AND TIMERS (FIGS. 20 AND 21)

With the above preliminary considerations as background, the embodiments of FIGS. 20 and 21 may now be considered further. To simplify matters, the construction and design of the specific logical networks which determine the switching of the flip-flops and timers in FIGS. 20 and 21 will not be described in detail, since such mechanization is only exemplary and can be provided in any equivalent arrangements once the features of the present invention are understood. Instead, these logical networks of FIGS. 20 and 21 will be summarized in well-known form of Boolean equations, which are functionally equivalent to the corresponding logical networks shown in FIGS. 19 and 20. From these Boolean equations and the exemplary embodiment thereof in FIGS. 20 and 21, one skilled in the art will readily be able to provide suitable logical networks for switching the flip-flops and timers, as required in accordance with the invention. The manner in which these flip-flops and timers fit into the overall system will become apparent as this description progresses.

The Boolean equations for the flip-flops and timers of FIGS. 20 and 21 are presented below in the following manner. First, it should be noted that each flip-flop is represented by two equations, and each of the timers T1 to T5 by a single equation. For the flip-flops, the equation having the unprimed output of the flip-flop at the left side of the equal sign, represents the logical conditions which determine when a true signal will be applied to the on input of the flip-flop, that is, the conditions which will switch the flip-flop on (if it is not already on) so that the unprimed output will be true. Similarly, the equation having the primed output of the flip-flop at the left side of the equal sign, represents the logical conditions which determine when a true signal is applied to the off input of the flip-flop, that is, the conditions which will switch the flip-flop off (if it is not already off) so that the primed output will be true. The timers T1 to T5 are represented by only one equation, since they have only a single set input. This single equation for each timer represents the logical conditions which determine when a true signal will be applied to the set input thereof to turn the timer on for the predetermined time for which the timer is designed.

The second point to consider with regard to the manner in which the Boolean equations are presented is that the flip-flops and timers are grouped below in accordance with their location in FIGS. 20 and 21, the flip-flops in each of sections 300a, 300b, and 300c being separately grouped according to section, and the flip-flops in FIG. 21 being grouped together. A further point to note is that in order to provide a complete presentation, the conditions which govern the operation of two additional devices in FIG. 21, namely unit decoder 401 and write lockout means 480, are included along with the equations for the FIG. 21 flip-flops.

With the above points in mind, the Boolean equations corresponding to the logical mechanization of FIGS. 20 and 21 are now presented below as follows:

*Section 300a (FIG. 20)*

Busy F/F:
$BUS = (E')(SU)(J_9 + J_{10})$
$BUS' = (PE-2)(RG)$

Timer T4:
$T4 = (PE-2)(RG) + (J_4 + J_5 + J_6)(SU)(P')$

Unit Interrupt F/F:
$UI = J_2(SU)$
$UI' = J_3(SU)$

Ready F/F:
$RY = (PE-2)(RG)$
$RY' = (RY)[(WS) + (RG) + J_{10}(SU)(BUS') + (J_5 + J_6)(SU)(CS)]$ Processor Interrupt F/F:
$PI = (UI)[(PE-2)(RG) + (PE-2)(RY)]$
$PI' = (UD + J_3(SU)) + (PE-3)$ Position F/F:
$P = (PE-2)$
$P' = (PE-3)$

*Section 300b (FIG. 20)*

Command F/F:
$CM = J_8(SU)(RY') + (J_9 + J_{10})(SU)(BUS')$
$CM' = (PE-2)(RG)$

Call Strip F/F:
$CS = J_9(SU)(BUS')$
$CS' = (CS)(WS) + (J_5 + J_6)(SU)(RY)$

Return Gate Control F/F:
$RGC = (PE-2)(CM)(RG')$
$RGC' = (RGC)(RG)$

Return Gate F/F:
$RG = (PE-3)[(T4') + (RGC)] + E$
$RG' = (PE-3)(RGC')(E')$

Wrong Strip F/F:
$WS = (WS')(CS)(RG)$
$WS' = (J_9 + J_{10})(SU)(BUS')$

*Section 300c (FIG. 20)*

Timer T1: $T1 = (PE-1)$
Timer T2: $T2 = (PE-2)$
Timer T3: $T3 = (PE-3)$

Error F/F:
$E = (E) + (P1'D)(T1') + (P2'D)(T2') + (P3'D)(T3'D) + VG' + (T5')(BUS)$
$E' = V$ Timer T5: $T5 = (J_9 + J_{10})(SU)(BUS') + PE-2$

*Information circuitry 400 (FIG. 21)*

Select Unit F/F:
$SU = (UD)(SU')$
$SU' = (UD')(SU)$

Read F/F:
$RE = J_5(SU)(RY)(E')(WS')$
$RE' = (J_6 + J_7)(SU)$

Write F/F:
$WR = J_6(SU)(RY)(E')(WS')(WL')$
$WR' = (J_5 + J_7)(SU)$

Unit Decoder:
$UD = J_1(u_1 - u_8)_{M_1}$
$UD' = J_1(u_1 - u_8)_{M_1}$
$(u_1 - u_8)_{M_1}$ is true when unit $M_1$ is the unit which is to be selected.

Operate F/F:
$OP = (PE-3)(RY)(WC')(E')[(RE) + (WR)]$
$OP' = J_7(SU)$

Write Lockout Switch Means:
WL and WL' are determined by the position of a manual write lockout switch provided on each unit.

Before leaving this discussion of the flip-flops and timers, it should be remembered that the particular embodiments thereof illustrated in FIGS. 20 and 21, as well as the logical networks associated therewith, are merely exemplary and many modifications in both construction and arrangement are possible within the scope of this invention. For example, instead of using flip-flops having two inputs, as shown in FIGS. 20 and 21, single-ended flip-flops could be employed with appropriate interconnecting networks, such as illustrated in commonly assigned copending patent application Serial No. 107,109, filed May 2, 1961. In such an approach the logic is caused to be advanced by a recurring clock pulse applied to each flip-flop, at which time the flip-flop is switched in accordance with the state of the logic at the single-ended input thereof. Such a flip-flop and logic arrangement could be mechanized to provide the same functions as provided by the mechanization shown in FIGS. 20 and 21, and is to be considered as within the scope of the present invention.

DERIVATION OF STATUS SIGNALS $S_1$ TO $S_7$ AND $M_1S_8$ TO $M_1S_{10}$ (FIGS. 19 and 20)

Having set out above the Boolean equations which govern the switching of each flip-flop and timer in FIGS. 20 and 21, a second set of Boolean equations are next presented below which represent the manner in which various logical networks in FIGS. 20 and 21 are employed to combine predetermined ones of the flip-flop outputs so as to produce status signals $S_1$ to $S_7$ nd $M_1S_8$ to $M_1S_{10}$ having the general characteristics discussed previously in connection with FIG. 18. It will be noted that status signals $S_2$ to $S_6$ and $M_1S_8$ to $M_1S_{10}$ are formed in section 300d of FIG. 20, while status signals $S_1$ and $S_7$ are formed in FIG. 21. The Boolean equation for each status signal is as follows:

*Common status signals $S_1$ to $S_7$*

Write Lockout Signal $S_1 = (SU)(WL)$
Error Signals $S_2 = (SU)(E)$
Busy Signal $S_3 = (SU)(BUS)$
Ready Signal $S_4 = (SU)(RY)$
Wrong Strip Signal $S_5 = (SU)(WS)$
Begin Signal $S_6 = (Su)(UI)(RY)(P)$
Operate Signal $S_7 = (SU)(OP)$

*Individual unit $M_1$ status signals $M_1S_8$ to $M_1S_{10}$*

Unit Select Signal $M_1S_8 = (SU)$
Unit Interrupt Signal $M_1S_9 = (UI)$
Processor Interrupt Signal $M_1S_{10} = (PI)$ From the above Boolean equations for the status signals, various general points will be apparent. First, it will be noted that status signals $S_2$, $S_3$, $S_4$, $S_5$, and $S_7$ are nothing more than the logical product of SU with the unprimed output of a respectively named flip-flop. Begin Signal $S_6$, on the other hand, is the logical product of SU and the unprimed outputs RY, UI, and P of the Ready, Unit Interrupt and Position flip-flops in section 300a of FIG. 20, while Write Lockout Signal $S_1$ is the logical product of SU and the unprimed output WL of the write lockout means 480 in FIG. 21. In each of the equations for the common status signals $S_1$ to $S_7$, therefore, the term SU corresponding to the unprimed output of the Select Unit flip-flop is present in the equation as a product term. As a result, the unprimed output of the respective flip-flop from which each of status signals $S_2$, $S_3$, $S_4$, $S_5$, and $S_7$ is derived, the unprimed output from the write lockout switch means 480 from which Write Lockout Signal $S_1$ is derived, and the output of Begin Gate 320 from which Begin Signal $S_6$ is derived, can be made available to the data processor only when SU is true—that is, when the particular unit has been selected. As pointed out previously, this permits a common set of status lines to be used for the status signals $S_1$ to $S_7$, regardless of the number of random access storage units connected to the processor.

Next, it will be noted with respect to the equations for the individual unit status signals $M_1S_8$ to $M_1S_{10}$, that each is merely the output signal from the unprimed output of its respectively named flip-flop—that is, Unit Select Signal $M_1S_8$ is the unprimed output SU of the Select flip-flop in FIG. 21, Unit Interrupt Signal $M_1S_9$ is the unprimed output UI of the Unit Interrupt flip-flop in section 300a of FIG. 20, and Processor Interrupt Signal $M_1S_{10}$ is the unprimed output PI of the Processor Interrupt flip-flop in section 300a. Thus, the status of the unprimed output of the respective flip-flop corresponding to each of these individual unit status signals $M_1S_8$ to $M_1S_{10}$ of unit $M_1$ will be continuously available to the data processor on its respective individual unit status lines, regardless of which unit is selected. The same is also true for the individual unit status signals of any other random access storage units which may be connected to the data processor.

RETURN GATE LOGIC (FIGS. 16 AND 20)

It will be noted that section 300b in FIG. 20 also generally indicates that the return gate open signal RG and the return gate close signal RG' (which determine whether the return gate 70 in FIG. 16 is open or closed) are merely the respective unprimed output RG and primed output RG' of the Return Gate flip-flop shown in section 300b of FIG. 20. Because of the importance of the return gate 70 in overall system operation, it will be helpful at this time to supplement the Boolean equation representation previously provided for the Return Gate flip-flop with the following word summary of the conditions which govern the opening and closing of the return gate 70.

*Return Gate 70.*—Return Gate 70, as mentioned previously, serves to determine whether a strip on the capstan will be recirculated for another pass of the read and write heads 60m and 60n (return gate 70 closed), or will be peeled off the capstan (return gate 70 open) and thus caused to be returned to the stack of strips in the magazine. Since the return gate open and return gate close signals RG and RG', respectively, are directly derived from the unprimed and primed outputs RG and RG' of the Return Gate flip-flop of section 300b of FIG. 20, the return gate 70 will be open when the Return Gate flip-flop is on, and closed when the Return Gate flip-flop is off.

The return gate 70 will open when the leading edge of a strip on the capstan reaches position-sensing device 60j and any of the following has previously occurred: (1) a Call Strip Signal $J_9$ or a Drop Strip Signal $J_{10}$ has released a new strip; or (2) a Return Strip Signal $J_8$ was transmitted when the Ready Signal $S_4$ was on; or (3) the 750 millisecond timer T4 has run out, which occurs if a true signal has not been applied to the set input of timer T4 for a period of 750 milliseconds. Return gate 70 is closed, on the other hand, when the leading edge of a newly released strip reaches position-sensing device 60j for the first time.

The manner in which the above described operation of the return gate 70 is achieved by means of the Command flip-flop, the Return Gate Control flip-flop, and the Return Gate flip-flop in section 300b of FIG 20 will now be explained. This description will illustrate the manner in which the other logical mechanizations of FIGS. 20 and 21 are accomplished and, from this description, one skilled in the art should have no difficulty in readily understanding the logical mechanization of the remainder of FIGS. 20 and 21, as well as the previously presented Boolean equations.

Turning to section 300b of FIG. 20, therefore, it will be assumed that the random access storage unit $M_1$ has been selected so that the Unit Select flip-flop is on and its unprimed output SU is true. It will also be assumed that unit $M_1$ is in a condition such that initially all strips are in the magazine, that is, no strip is dropping or on the capstan. In such a case, the Return Gate flip-flop is on (so that RG is true and return gate 70 is open), while the Busy flip-flop, the Command flip-flop, and the Return Gate flip-flop are all off.

If a Call Signal $J_9$ or a Drop Signal $J_{10}$ is now transmitted by the processor to release a selected strip, the Command flip-flop is turned on, causing CM to become true. When the leading edge of the released strip is engaged by the capstan and reaches position-sensing device 60$i$ for the first time, the true pulse PE–2 is generated, turning off the Busy flip-flop to make BUS' true. Also, since RG is true (Return Gate flip-flop on) when PE–2 is generated, a true signal will be applied to the off input of the Command flip-flop, turning it off and thereby making CM false. However, since RG' is false (Return Gate flip-flop on) when PE–2 is generated, the Return Gate Control flip-flop remains off and the primed output RGC' thereof remains true. Thus, when the leading edge of the released strip reaches position-sensing device 60$j$ a short time later, RGC' will be true when the true pulse PE–3 is generated (as will E' if no error is detected by the Error flip-flop), causing the off input of the Return Gate flip-flop to become true, whereupon the Return Gate flip-flop turns off, RG' becomes true and the return gate 70 (FIG. 16) closes.

After one or more recirculations of the strip on the capstan, and with SU and BUS' still true, removal of the strip on the capstan will be initiated by (1) the release of a new strip in response to Call Strip Signal $J_9$ or Drop Strip Signal $J_{10}$, or (2) the transmission of a Return Strip Signal $J_8$ when RY is true (Ready flip-flop is on), or (3) the running out of 750 millisecond timer T4.

When removal is initiated by (1) or (2) above (that is, in response to signals $J_8$, $J_9$, or $J_{10}$), the Command flip-flop will be turned on making CM true; RG' remains true since the Return Gate 70 is still closed (Return Gate flip-flop off). When the strip on the capstan next reaches position-sensing device 60$i$, the true pulse PE–2 is again generated, but this time both CM and RG' will also be true. As a result, a true signal will be applied to the on input of the Return Gate Control flip-flop, turning it on and thereby making RGC true. Thus, when the leading edge of a strip on the capstan reaches position-sensing device 60$j$ a short time later, causing the true pulse PE–3 to be generated, RGC will also be true to cause a true signal to be applied to the on input of the Return Gate flip-flop, turning it on. RG thereby becomes true to open the return gate 70 and cause the strip to be peeled from the capstan and guided on a path back to the magazine, at which time the unit $M_1$ will again be in the condition initially assumed at the start of this gate logic description.

It should be noted that when removal of a strip from the capstan is initiated by (1) above (that is, the release of a new strip in response to Call Strip Signal $J_9$ or Drop Strip Signal $J_{10}$), the newly released strip will fall while the above described removal operation for the old strip on the capstan is occurring. In order to prevent the newly released strip from interfering with removal of the old strip, the time of fall of a released strip is chosen sufficiently long so that the new strip will not engage the capstan until removal of the old strip from the capstan has been completed.

If removal of a strip from the capstan is initiated by (3) above, that is, in response to the running out of the 750 millisecond timer T4, the unprimed output T4' thereof will become true. As a result, with T4' true, the next time the leading edge of the strip on the capstan reaches position-sensing device 60$j$, causing the generation of the true pulse PE–3, the on input of the Return Gate flip-flop will become true, turning the Return Gate flip-flop on to open return gate 70. Such operation is important to prevent excessive strip wear which could occur if a strip remained on the capstan indefinitely. Thus, if neither of the removal conditions (1) or (2) above occurs, before the 750 millisecond timer T4 runs out, the runout of timer T4 will then initiate automatic removal of a strip on the capstan, followed by return of the strip to the magazine by the magazine loader, both occurring independently of the data processor and without the need of any communication therewith. As will be noted from the previously presented Boolean equation for the timer T4 in section 300$a$ of FIG. 20, timer T4 is set for another 750 millisecond period (regardless of its previous state) whenever a newly released card first reaches position-sensing device 60$i$. Also, timer T4 is set for another 750 millisecond period whenever a Test Begin Signal $J_4$, a Read Signal $J_5$, or a Write Signal $J_6$ is transmitted to the selected unit, in order to prevent a strip from being removed from the capstan by runout of timer T4 if the data processor is shortly going to be in a condition to perform a read or write operation on the strip.

Besides providing for automatic removal of a strip from the capstan independently of the data processor, the above described logic governing the opening and closing of the return gate 70 also provides other advantages. First, the return gate logic insures that the return gate 70 is not in a transient position when the leading edge of a strip approaches and, secondly, as will become evident (if not already evident), the return gate logic in cooperation with other system logic guarantees knowledge by the system of which strip is on the capstan and prevents a read or write operation from being performed on the wrong strip. Also, as illustrated in section 300$b$ of FIG. 20 and included in the Return Gate flip-flop Boolean equations, the return gate logic is such as to cause the return gate to open when an error is detected (Error flip-flop turns on to make E true). This prevents a possible jam-up of strips on the capstan by providing for the opening of the return gate 70 as soon as an error is detected.

ERROR LOGIC (FIG. 20, SECTION 300$c$)

Having considered the return gate logic above, it will now be expedient to next consider the logic governing the switching of the Error flip-flop in section 300$c$ of FIG. 20. This error logic is, of course, already represented by the Boolean equations previously set out for section 300$c$. Consequently, the main purpose of the following description will be to bring out in somewhat more detail the operation of the exemplary circuitry of section 300$c$ of FIG. 20 by means of which this error logic is accomplished. It will be noted in FIG. 20 that on the right of section 300$c$ and external to logic circuitry 300, there are illustrated those components of the basic random access storage device 150 which communicate with the circuitry of section 300$c$, (by way of error lines 150$b$) to control the switching of the Error flip-flop in response to a detected error.

Considering first the vacuum gage 299 and its output signal VG', it will be noted that the vacuum gage 299 is not specifically shown in the basic device 150 of FIG. 16, but may be considered as suitably incorporated therein, as generally shown in FIG. 20. The operation of the vacuum gage 299 is such that the signal VG' becomes true when the pressure produced by the vacuum and blower means (FIG. 8) is not sufficient to provide the required suction for proper operation of the capstan 40$a$, and/or the required separation air currents for the grille 30$g$ (FIG. 10) disposed above the strips in the magazine.

In addition to the signal VG' fed to section 300$c$ in FIG. 20 from the vacuum gage 299, there is also fed to section 300$c$ (by way of error lines 150$b$) a plurality of signals P1', P2', and P3' obtained from position-sensing devices 90, 60$i$, and 60$j$, respectively. These signals P1', P2', and P3' are suitably provided by the position-sensing devices 90, 60$i$, and 60$j$, respectively, in addition to signals PE–1, PE–2, and PE–3, but were not shown in FIG. 16 primarily because they were not of concern at that point in the description. The characteristics of the signals P1', P2', and P3' are such that each is true only when a strip is traversing its respective position-sensing device—that is, when the respective position-sensing device is between the leading and trailing edges of a strip.

Each of the position-sensing devices 90, 60i, and 60j may typically be of the photoelectric type including a light source and a detecting element which receives light from the light source when no strip is covering the device. In such a case, each of the signals P1', P2', and P3' would be caused to be true whenever the detecting element of its respective position-sensing device is not receiving light from its respective light source. Also, each of the respective pulses PE-1, PE-2, and PE-3 could then be derived from the change occurring in its respective detecting element when the leading edge of a strip first blocks off light therefrom.

Having explained how signals P1', P2', P3', and VG' are obtained from the basic device 150, the manner in which these signals are employed to switch the Error flip-flop will next be considered. Referring to the signal VG' from the vacuum gage 299 first, it will be seen that VG' is fed to the on input of the Error flip-flop through OR gates 305 and 307. Thus, when VG' becomes true in response to some failure in the vacuum and blower means, the Error flip-flop will turn on and E will become true, causing a light bulb 325 connected thereacross to become illuminated to indicate that an error has been detected in the unit. The Error flip-flop is able to be turned off by means of a push-button switch 315, which when depressed applies a true signal V to the off input of the Error flip-flop to turn the Error flip-flop off and extinguish light bulb 325. The Error flip-flop will then remain off if the failure in the vacuum and blower means which caused VG' to become true has been corrected so that VG' is false, or if no other error is detected. As will be noted in section 300c of FIG. 20, a light bulb 327 is also provided across signal VG' just as was provided across the unprimed output E of the Error flip-flop; this is done in order to provide an indication that it is the vacuum and blower means which caused the error.

Now turning to signals P1', P2', and P3', these signals are employed to detect errors occurring either in the respective position-sensing devices 90, 60i, and 60j, or as a result of the improper traversal of a strip thereby. If these signals P1', P2', and P3' were fed directly to the on input of the Error flip-flop, the Error flip-flop would turn on for every traversal of a position-sensing device, whether or not the position-sensing devices are operating properly. To permit a true signal to be applied to the Error flip-flop only when an error is detceted, the signals P1', P2', and P3' are first delayed by respective delay networks 311, 321, and 313 and the resulting delayed signals P1'D, P2'D, and P3'D are then fed to respective AND gates 301, 302, and 303 along with the respective primed outputs T1', T2', and T3' of timers T1, T2, or T3, respectively, the timers T1, T2, and T3 being in turn set by signals PE-1, PE-2, and PE-3, respectively. The delay provided by each delay network is chosen to be somewhat greater than the time required for the respective true pulse PE-1, PE-2, or PE-3 to set the associated timer T1, T2, or T3. Also, the predetermined on time for which each of the timers T1, T2, and T3 is designed is chosen to be somewhat greater than the sum of the time required for a strip to traverse the corresponding position-sensing device plus the delay provided by the respective delay network. By this choice of the delay of each delay network and the on time of each of the timers T1, T2, and T3, the output of any one of the AND gates 301, 302, or 303 can become true only when the respective position-sensing device is not operating properly, or if the traversal of a strip past the position-sensing devices does not occur in a proper manner. To illustrate, the operation of the circuitry associated with position-sensing device 90 will next be explained as an example of the operation of the circuitry associated with all of the position sensing devices.

Thus, considering the operation of the circuitry associated with position-sensing device 90, it will be remembered that during normal operation, the arrival of the leading ledge of a strip in a position so as to just begin to cover position-sensing device 90 will result in generation of true signal PE-1 and, in addition, will turn P1' true. However, the signal P1', upon becoming true, is not directly applied to AND gate 301, but is delayed by a time sufficient to permit the true pulse PE-1 to turn timer T1 on and make T1' false before P1'D becomes true. As a result, when the delayed signal P1'D does become true after the delay provided by delay network 311, T1' will already have become false to prevent a true signal from appearing at the output of AND gate 301. Timer T1 then remains on for a time which is at least sufficient to permit traversal of a strip past device 90, and for both signals P1' and P1'D to have become false again. Thus, when timer T1 runs out and T1' becomes true, a true signal will still not be able to appear at the output of AND gate 301, since P1'D will be false. It will be understood, therefore, that the output of AND gate 301 is maintained false during proper operation of position-sensing device 90 and proper traversal of the strip thereby. The same applies in a like manner for AND gates 302 and 303 associated with position-sensing devices 60i and 60j, respectively.

If, it is now assumed that position-sensing device 90 fails for some reason, signal P1' will become true even though no strip is traversing the device 90. Also, there will be no pulse PE-1 to set timer T1 on and T1' will remain true. Since T1' and P1'D will thus both be true simultaneously, the output of AND gate 301 will also become true and be fed through OR gates 305 and 307 to switch the Error flip-flop on.

The Error flip-flop will not only be turned on when a position-sensing device fails, as described above for the device 90, but will also be switched on by a true signal applied to its on input when traversal past a position-sensing device is not proper. This feature is achieved because, as mentioned previously, each of the timers T1, T2, and T3 remains on only for a time somewhat greater than the time required for traversal of the strip, plus the delay time provided by the respective delay network. Thus, if a strip "hangs up" in a position so as to remain covering a position-sensing device, or else, the strip traverses the position-sensing device too slowly, the respective timer T1, T2, or T3 may run out and the respective primed output T1', T2', or T3' thereof become true while the respective delayed signal P1'D, P2'D, or P3'D is still true. The output of the respective AND gate 301, 302, or 303 will then also become true, turning the Error flip-flop on to indicate that operation is not proper. As pointed out previously, the Error flip-flop may be switched off by depressing the push-button switch 315 connected to its off input.

It will be noted in section 300c of FIG. 20 that the output of each of the AND gates 301, 302, and 303 has a light bulb 319 connected thereacross. This is done in order to provide a visual indication of the particular position-sensing device which caused the error.

INFORMATION CIRCUITRY 400
(FIG. 21)

Now that the flip-flops and timers and their associated logical networks have been considered in some detail, a description will next be provided of the manner in which the information circuitry 400 of FIG. 21 serves to transfer information between the data processor and the basic random access device 150, and vice versa.

Turning to FIG. 21, it will be seen that the processor information output lines $PO_1$ to $PO_8$ are shown as being separated into four separate sets of lines, each set serving to carry a particular set of information signals. More specifically: the uppermost set of lines carry the unit number information signals $u_1$–$u_8$, which are transmitted concurrently with Select Signal $J_1$; the next lower set of lines carry the strip selection signals $e_1$–$e_8$, which are transmitted concurrently with either Call Strip Signal $J_9$ or Drop Strip Signal $J_{10}$, the next lower set of lines carry the channel selection signals $ch_1$–$ch_8$, which are transmitted concurrently with either Read Signal $J_5$ or Write Signal $J_6$; and the lowest set of lines in FIG. 21 carry the write signals $w_1$–$w_8$, which are successively transmitted by the processor and constitute the data to be written in the selected channel of the selected strip. The processor information input lines $PI_1$ to $PI_8$, on the other hand, serve merely to carry the read signals $r_1$–$r_8$, which are read from a selected channel of the selected strip during a reading operation, or during a writing operation when performing a check on the data written in the selected channel.

In order to permit the transfer of information signals between the data processor and the basic device 150 to be clearly understood, the manner in which the circuitry of FIG. 21 operates during a typical sequence of control signals will now be explained. For this purpose, it will initially be assumed that the random access storage unit $M_1$ is in a condition such that all the strips are in the magazine, that is, no strip is dropping or on the capstan.

It will also be assumed that the write lockout switch means is off so that writing can be performed on a strip in unit $M_1$. If a Select Signal $J_1$ is now transmitted to the unit concurrently with unit number information signals $u_1$–$_4u_8$, these will be applied to a unit decoder 401 as shown in FIG. 21. The unit decoder 401 is constructed and arranged (in any well-known manner) so as nals $u_1$–$u_8$, these will be applied to a unit decoded 401 to operate, in response to the signals $J_1$ and $u_1$–$u_8$ applied thereto, to provide a true pulse at the unprimed output UD thereof if the unit information signals $u_1$–$u_8$ correspond to the unit number of unit $M_1$.

The true pulse thus caused to appear at UD then turns on the Select Unit flip-flop, if it is off, or leaves it on if it is already on. On the other hand, if signals $u_1$–$u_8$ correspond to another unit, then UD remains false and a true pulse appears at the primed output UD' of unit decoder 401 to turn off the Select Unit flip-flop, if it is on, or to leave it off if it is already off. Thus, the transmission by the data processor of Select Signal $J_1$ along with the concurrently applied unit number information signals $u_1$–$u_8$ results in the Select Unit flip-flop of the selected unit $M_1$ being switched on, while the Select Unit flip-flops of all other units are turned off, or caused to remain off.

Following the transmission of Select Signal $J_1$ by the data processor, the next signal ordinarily transmitted thereby is either a Call Strip Signal $J_9$, or a Drop Strip Signal $J_{10}$, which is applied concurrently with the strip selection signals $e_1$–$e_8$ for the purpose of releasing a selected strip from the magazine in the basic device 150. If it is assumed that unit $M_1$ was the one selected when the Select Signal $J_1$ was applied concurrently with the unit information signals $u_1$–$u_8$ then, when $J_9$ or $J_{10}$ is transmitted, the unprimed output SU of the Select Unit flip-flop will be true to permit AND gates 402 to gate the strip selection signals $e_1$–$e_8$ to the release strip actuation circuitry 230 of the basic device 150, as shown in FIG. 16. At the same time, either $J_9$ or $J_{10}$ (whichever is transmitted concurrently with strip selection signals $e_1$–$e_8$) is applied through an OR gate 403 to AND gate 404 to produce at the output thereof a true signal constituting the release strip signal $e_r$, which is applied to the release strip actuation circuitry 230 in FIG. 16 along with strip selection signals $e_1$–$e_8$ to initiate release of the selected strip. As indicated by the other inputs to AND gate 404 in FIG. 21, in order for the release strip signal $e_r$ to appear at the output of AND gate 404 when $J_9$ or $J_{10}$ is transmitted, unit $M_1$ must be the selected unit (SU of unit $M_1$ is true), there must be no error in unit $M_1$ (E' is true), and the Busy flip-flop must be off (BUS' is true). These conditions are satisfied since SU was made true in response to the previously transmitted Select Signal $J_1$, and BUS' is initially true at the time $J_9$ or $J_{10}$ is transmitted as a result of the initial assumption that no strip is falling; in addition, it is to be assumed that no error has been detected so that E' is also true. Thus, with the above conditions satisfied, signal $e_r$ appears at the output of AND gate 404 when either signal $J_9$ or $J_{10}$ is transmitted.

It may be noted at this point in the description that the Busy flip-flop in section 300a will be switched on in response to either Call Strip Signal $J_9$ or Drop Strip Signal $J_{10}$ assuming, of course, that SU and E' are both true. When this occurs the primed output BUS', which is fed to AND gate 404 in FIG. 21, will become false to extinguish the release strip signal $e_r$ provided at the output thereof. If it is desirable to prolong the duration of the release strip signal $e_r$, the Busy flip-flop may be suitably designed in any well-known manner so that the switching of the flip-flop in response to a true signal applied to the on or off input thereof is delayed for a period sufficient to permit the release strip signal $e_r$ to be present for the required time. This may be accomplished, for example, by a delay network provided in each of the on or off input circuits of the flip-flop. Alternatively, instead of delaying the switching of the flip-flop, the flip-flop may be permitted to switch immediately in response to a true signal applied to its on or off input, but the effect of the switching of the flip-flop is delayed from appearing at the outputs thereof. Similarly to the previous method, this alternative method of providing a delay may be accomplished by using suitable delay networks, but in this method they are connected in the output circuits. It will be understood that such delay means may be suitably incorporated in any other flip-flop, in addition to the Busy flip-flop, whenever such is desirable or necessary for proper operation of the system logic, as was the case in prolonging the strip release signal $e_r$ provided at the output of the AND gate 404 in FIG. 21.

The transmission by the data processor of Select Signal $J_1$ followed by either Call Strip Signal $J_9$ or Drop Strip Signal $J_{10}$ is normally followed by the transmission of either Read Signal $J_5$ or Write Signal $J_6$, which is transmitted by the processor concurrently with the channel number information signals $ch_1$–$ch_8$. As shown in FIG. 21, the channel number information signals $ch_1$–$ch_8$ are applied to channel number storage circuitry 410, which is constructed and arranged to store the channel number represented by these signals $ch_1$–$ch_8$ in response to the initiation signal $e_{ch}$ applied thereto.

It will be seen from the logical circuitry associated with the channel number storage circuitry 410 in FIG. 21 that the initiation signal $e_{ch}$ is produced in response to either Read Signal $J_5$ or Write Signal $J_6$, if certain conditions are all satisfied. These conditions are as follows: (1) the unit $M_1$ must be the selected unit (SU is true); (2) the unit $M_1$ must be ready (RY is true); (3) there must be no detected error in unit $M_1$ (E' is true); (4) the Wrong Strip flip-flop of section 300b of FIG. 20 must not be on (WS' is true); and (5) the write lockout switch means 480 must be off (WL' is true) if the transmitted signal is a Write Signal $J_6$. These conditions are satisfied in the present assumed operating sequence since the Select flip-flop was switched on when unit $M_1$ was selected in response to $J_1$, the Ready flip-flop is on since it will be assumed that the strip released by $J_9$ or $J_{10}$ has already reached the first position-sensing device 60i, the Error flip-flop is off since it is assumed no error has been detected, and both the Wrong Strip flip-flop and the write switch means 480 are off in view of the initial assumptions.

Thus, upon transmission of Read Singal $J_5$ or Write Signal $J_6$ by the data processor, the initiation signal $e_{ch}$ will be produced (become true) to cause the channel number storage circuitry 410 to store the channel number represented by the channel signals $ch_1$–$ch_8$ transmitted concurrently therewith. At the same time, Read Signal $J_5$ and Write Signal $J_6$ also operate to cause either the Read flip-flop of the Write flip-flop to be switched on under the same conditions as governed the production of initiation signal $e_{ch}$. That is, if the Read Signal $J_5$ is transmitted and SU, RY, E', and WS' are all true, then the on input of the Read flip-flop becomes true to switch the Read flip-flop on. Also, Read Signal $J_5$ causes the off input of the Write flip-flop to become true to turn the Write flip-flop off, if it is not already off. In a similar manner, if Write Signal $J_6$ is transmitted and SU, RY, E', WS', and WL' are all true, then the on input of the Write flip-flop becomes true, and the off input of the Read flip-flop will become true to switch off the Read flip-flop, if it is not already off.

The channel number storage circuitry 410 in FIG. 21 is further constructed and arranged so that, upon storing the channel number represented by signals $ch_1$–$ch_8$ in response to $J_5$ or $J_6$, a plurality of output signals are provided therefrom which are fed to read head driver circuitry 420 and write head driver circuitry 425 to activate those read and write drivers which drive the read and write heads (60m and 60n in FIG. 16) corresponding to the selected channel. For example, if there are seven available channels on each strip and signals $ch_1$–$ch_8$ are chosen to select channel 3, then the storage of $ch_1$–$ch_8$ in channel number storage circuitry 410 will activate those drivers in the read and write head driver circuitry 420 and 425 which are used to drive the read and write heads corresponding to channel 6; the read and write drivers for the read and write heads of all of the other six channels will remain unactivated. Although the selected drivers in the read and write head driver circuitry 420 and 425 in FIG. 21 are activated in this manner, they remain unconnected from their respective read and write heads until their respective circuitry 420 or 425 is properly initiated. The read head driver circuitry 425 is initiated by signal $e_{re}$, while the write head driver circuitry is initiated by signal $e_{wr}$.

As shown in FIG. 21, the read initiation signal $e_{re}$ is produced (becomes true) when the unprimed output OP of the Operate flip-flop becomes true assuming, of course, that the unit $M_1$ is still selected so that SU is also true. On the other hand, the write initiation signal $e_{wr}$ is produced (becomes true) only when both the primed output WL' of the write lockout switch means 480 and the unprimed output WR of the Write flip-flop are true, in addition to OP and SU being true. This difference in the production of the read initiation signal $e_{re}$ and the write initiation signal $e_{wr}$ is provided because reading is normally desired during both read and write operations. Consequently, while the selected write drivers are used to drive their respective write heads only during the write operation, the selected read drivers are used to amplify the read signals $r_1$–$r_8$ picked up by their respective read heads during both reading and writing. For example, during the reading operation, read signals $r_1$–$r_8$ are read from the selected channel, amplified by the activated drivers in read head driver circuitry 420, and transmitted to the processor along input lines $PI_1$–$PI_8$ to the processor. Similarly, during the writing operation, read signals $r_1$–$r_8$ are also read from the selected channel, amplified by the activated read drivers, and transmitted to the processor along input lines $PI_1$–$PI_8$, but in this case, the read signals are just the write signals written by the processor an instant before, and are provided to the processor merely to check that the write signals are being properly recorded. Such a checking arrangement is well known in the art and will not be detailed further. To achieve this type of operation of the selected read and write drivers, read initiation signal $e_{re}$ is caused to be produced whenever both OP and SU are true; however, write initiation signal $e_{wr}$ additionally requires that the unprimed output WR of the Write flip-flop be true, as well as requiring that WL' be true so that writing cannot occur if the unit has been placed in a write lockout condition.

Thus, transmission of Read Signal $J_5$ or Write Signal $J_6$ causes activation of the selected channel read and write drivers in read and write head driver circuitry 420 and 425 in accordance with channel number information signals $ch_1$–$ch_8$ and, in addition, switches on the respective Read or Write flip-flop so that either RE or WWR is true, depending upon whether a read or write operation is to be performed. As a result, when the released strip on the capstan next reaches position-sensing device 60j, causing the generation of the true pulse PE–3, and with WC', E', and RY still true, the on input of the Operate flip-flop will become true to switch the Operate flip-flop on and make OP true. When this occurs, and the Read flip-flop is on indicating a read operation is to be performed, read initiation signal $e_{re}$ will be produced to connect the activated read drivers in read head driver circuitry 425 to their respective read heads, the write initiation signal $e_{wr}$ remaining absent so that only reading takes place. If, on the other hand, the Write flip-flop is on indicating a write operation is to be performed, both write initiation signal $e_{wr}$ and read initiation signal $e_{re}$ will be produced to connect the activated read and write drivers in read and write driver circuitry 420 and 425 to their respective read and write heads to permit both reading and writing to take place.

At the same time that the initiation signals $e_{re}$ and/or $e_{wr}$ are being produced, switching on of the Operate flip-flop also turns on the Operate Signal $S_7$ to signal the processor to start the read or write operation, whichever is to be performed. These reading and writing operations may typically include an initial period during which erasing occurs, or a period during which the data processor waits until a particular location on the selected channel is reached. Techniques for accomplishing reading and writing in this manner, as well as other associated operations, are well within the skill of those in the art and need not be considered here. All that need be recognized is that when Operate Signal $S_7$ is turned on it signals the data processor to start transmitting write signals $w_1$–$w_8$ and/or to start receiving read signal $r_1$–$r_8$.

The read signals $r_1$–$r_8$ and the write signals $w_1$–$w_8$ may each typically be in the form of successive groups of eight parallel bits (six information bits plus one parity bit and one clock bit) which are read from or written into a selected channel of a strip on the capstan by eight adjacent heads provided for each channel as the strip traverses the heads, typical heads being illustrated in FIG. 4.

After a record of the desired length has been written into and/or read from the selected channel, the processor transmits the Halt Signal $J_7$ which acts to switch off the Operate flip-flop, reset the channel number storage circuitry 410, and turn off whichever of the Read or Write flip-flops is on, thereby terminating the writing and/or reading operation. The strip on the capstan may thereafter be permitted to remain for one or more additional read or write operations in one or more selected channels, in the same manner as described above, or may be removed from the capstan and returned to the magazine in any of the various ways explained in the previously presented RETURN GATE LOGIC portion of this description.

Before leaving the information circuitry 40 of FIG. 21, it may be noted that, in releasing a selected strip by applying release strip signal $e_r$ and strip selection signals $e_1$–$e_8$ to the strip actuation circuitry 230 in response to $J_9$ or $J_{10}$, no provision is made to reset the selecting and releasing means 30 generally shown in FIG. 16. This is done purposely so that, if the strip selection signals $e_1$–$e_8$ transmitted concurrently with either signal $J_9$ or $J_{10}$ correspond to a strip which is already on the capstan, when the strip is returned to the magazine, the setting of the selecting rods, having remained the same, will automatically release the strip without any additional signals being required.

DATA PROCESSOR COMMAND STRUCTURE FOR RANDOM ACCESS STORAGE UNIT COMMANDS (FIGS. 22–24)

Having considered typical embodiments of both the controller 250 (FIGS. 19–21) and the basic random access storage device 150 (FIGS. 1a to 16), there will next follow a description of a typical command structure which may be employed by the data processor 180 (FIG. 17) for the execution of random access storage unit commands, in accordance with the invention, particular reference being had to the command flow diagram of FIG. 22 and the illustrative circuitry shown in FIGS. 23 and 24 (which are on the same sheet as FIGS. 10 and 11).

As is well known in the art, a data processor operates in accordance with a stored program which can be varied by a programmer so as to permit the data processor to perform various types of processing activities. A stored program may typically comprise a plurality of commands, each of which is in turn comprised of a series of related operational blocks performed by the processor in a predetermined order and in a self-sequencing fashion. Self-sequencing of the processor from one operation block to another (as well as from one command to another) is achieved by designing the processor so that the decision as to which is the next operation block to be performed is determined by decisions made in the previous operation block. Such a command flow arrangement is, for example, illustrated in Patent No. 2,954,166, for General Purpose Computer, and the typical command flow arrangement shown in FIG. 22 is preferably of this type.

It is to be understood that the command structure illustrated in FIG. 22 is merely illustrative of one type of command structure which may be employed by the processor for providing operation thereof with a plurality of random access storage units, in accordance with the present invention. The command structure shown in FIG. 22 is, of course, only a relatively small portion of the total command structure which may be built into the data processor. The design or programming of a data processor to provide a command structure, such as illustrated in FIG. 22, is well within the skill of those in the art and, based on the disclosure provided herein, one skilled in the art should have no difficulty in providing a data processor with the required command structure for operation in accordance with the present invention.

A further point to note with regard to the command flow diagram of FIG. 22 is that the functional operations described in each of the operational blocks shown therein do not necessarily require the same period of time or the same number of operating cycles of the data processor. Both the time as well as the number of cycles required to perform each operation block may be chosen at the convenience of the programmer or designer, based on the particular characteristics of the data processor or any other system requirements. The only requirement is that where necessary for proper operation of the system logic previously described in connection with FIGS. 20 and 21, a new operation block is not entered until the logical operations initiated in the previous operation block have been completed. In this connection, it may be noted that, since the basic random access storage device 150 operates at millisecond speeds while the processor and the controller 250 operate at electronic speeds (in microseconds), there is no difficulty in providing the necessary spacing between transmission of the control signals $J_1$ to $J_{10}$ by the processor in successive operation blocks so as to permit proper operation of the system logic.

Now considering the command flow diagram of FIG. 22 more specifically, it will be seen that there are listed at the upper left thereof eight typical random access storage unit commands which the data processor may be designed or programmed to provide. These eight commands are as follows: the Set Unit Interrupt Command C1, the Reset Unit Interrupt Command C2, the Drop Strip Command C3, the Call Strip Command C4, the Return Strip Command C5, the Test Begin Command C6, the Read Command C7, and the Write Command C8. Obviously, either more or less commands may be provided, depending upon the particular use to be made of the random access storage units, in accordance with the present invention.

The manner in which each of the eight commands C1 to C8 shown in FIG. 22 is executed by means of the data processor command flow will now be considered more specifically. Initially, some comments with regard to the basic terminology employed in FIG. 22 are in order. First, it should be noted that each block contains a word description of the pertinent functions performed therein, as well as a block identifying number in the upper left corner thereof. For blocks having two digit numbers, the first digit represents the particular command to which that block corresponds, while the second digit represents the position of the block in the command. Operation blocks having three digit identifying numbers are common to two commands, the first two digits corresponding to the two commands to which the block is common, while the third digit represents the position of the block in each command. It is, of course, to be understood that each block additionally includes operations which may be desired for performance of other internal processor activity, as well as those operations required to cause the data processor to advance from one block to another in self-sequencing fashion, in accordance with the arrangement illustrated in FIG. 22.

The various branch rectangles also illustrated in FIG. 22, in addition to the operation blocks, represent various possible branches which the data processor may take in the event that the selected random access storage unit is in a particular state during the performance of certain operation blocks. These branch possibilities permit the data processor to branch to any portion of its command structure, including recirculation in the block which initiated branching, so as to provide any desired corrective or other action, or to start or continue with the execution of other commands. These branching possibilities will be brought out in more detail as they are considered in the description of FIG. 22.

With the above preliminary remarks in mind, the eight commands C1 to C8 illustrated in FIG. 22 may now be described in detail. It will initially be noted that operation blocks O1, O2, and O3 are common to all eight commands—that is, the operation of the data processor is such that these three operation blocks O1, O2, and O3 are performed at the beginning of each of the eight commands C1 to C8. The only exception is with regard to the read and write commands C7 and C8 which may be entered directly after completion of operation block 61 in the Test Begin Command C6, as will be explained later.

The first common operation block O1 is provided to permit various preliminary operations to be performed by the processor to begin a random access storage unit command, such as obtaining the address of the particular random access storage unit which is to be selected. After these preliminary operations are performed in operation block O1, the data processor then advances to the second common operation block O2, during which Select Signal $J_1$ is transmitted concurrently with unit number signals $u_1$–$u_8$ to permit a desired random access storage unit to be selected. Also, in operation block O2, a check is made for a possible selection error which would be present if no unit is selected, or if more than one unit is selected, or if the wrong unit is selected. This check may be accomplished by the processor, for example, using a circuit such as generally shown in FIG. 23.

The circuit of FIG. 23 illustrates how correct selection between the two units $M_1$ and $M_2$ (FIG. 17) is checked, the same procedure also applying to any number of random access storage units which may be employed. As indicated in FIG. 23, each of the unit select signals $M_1S_8$ and $M_2S_8$ is fed to comparison circuitry 505 along with the output signals from a unit number address storage circuit 511 which stores the address of the particular unit which is intended to be selected by the signals $u_1$–$u_8$ transmitted concurrently with Select Signal $J_1$. The comparison circuitry 505 is constructed and arranged in any of various well-known ways to operate, in response to a test signal $T_1$ generated by the data processor during operation block O2, to provide a true output signal on its output line 507 for any of the following conditions; (1) if neither $M_1S_8$ or $M_2S_8$ is turned on by $J_1$ and $u_1$–$u_8$, or (2) if both $M_1S_8$ or $M_2S_8$ is turned on, or (3) if the particular one of $M_1S_8$ or $M_2S_8$ which is turned on does not correspond to the unit number stored in the unit number address storage circuit 511. Since the output 507 of comparison circuitry 505 is fed to the on input of a Selection Error Branch flip-flop, if any one of the above three conditions occur (indicating a selection error), the output 507 of Comparison Circuitry 505 will become true to switch on the Selection Error Branch flip-flop, which in turn acts to cause the processor to make a decision in operation block O2 which causes the processor to take the Selection Error Branch shown in FIG. 22, instead of advancing to operation block O3. As a result of taking the Selection Error Branch the processor may be caused to enter any other portion of its command structure, such as a command which would halt processing action and provide a visual indication that a selection error occurred. After the data processor takes the Selection Error Branch, the Selection Error Branch flip-flop in FIG. 23 may conveniently be turned off again by a suitable signal $e_s$ applied to its off input.

Assuming that there is no selection error occurring during operation block O2, the data processor will then advance to the next common operation block O3, during which the data processor acts to check the states of Error Signal $S_2$ and Wrong Strip Signal $S_5$. As shown in FIG. 22, if $S_2$ is on alone or if both $S_2$ and $S_5$ are on the data processor will take the Unit Error Branch, while if $S_5$ is on alone, the processor will take the Wrong Strip Branch. As was pointed out in connection with the Selection Error Branch, these branches permit the data processor to enter any portion of its command flow structure so as to be able to take any suitable action which is desired. Typical circuitry which may be employed by the data processor for checking the state of a status signal, and for providing branching in response thereto, is illustrated in FIG. 24 for the check of the Wrong Strip Signal $S_5$. It is to be understood that the same approach as shown in FIG. 24 may also be employed in connection with the other branching possibilites indicated in FIG. 22.

Referring to FIG. 24, it will be seen that the Wrong Strip Signal $S_5$ is fed to an AND gate 513 along with the inverted Error Signal $S_2'$ and a test signal $T_5$ generated by the data processor in operation block O3 to check the state of Wrong Strip Signal $S_5$. The subscript 5 for the test signal $T_5$ indicates that it is provided to test the state of Wrong Strip Signal $S_5$. The data processor similarly provides a test signal $T_2$ in operation block O3 to test Error Signal $S_2$ in a manner which is similar to that illustrated for Wrong Strip Signal $S_5$ in FIG. 24. It will be understood from FIG. 24, therefore, that if the Wrong Strip Signal $S_5$ from the selected unit is on, or true, and a $S_2'$ is also true (indicating that only $S_5$ is on) then, when test signal $T_5$ is generated by the data processor during operation block O3, the output of AND gate 513 will become true to switch on the Wrong Strip Branch flip-flop. As was the case for the Selection Error Branch flip-flop in FIG. 23, the turning of the Wrong Strip Branch flip-flop causes the data processor to advance to the Wrong Strip Branch for suitable corrective or other action, rather than advancing to one of the random access storage unit blocks 11, 21, 341, 51, 61, or 781. After taking the Wrong Strip Branch the processor generates a suitable signal $e_w$ to turn off the Wrong Strip Branch flip-flop in preparation for the next test of Wrong Strip Signal $S_5$ during a subsequent random access storage unit command.

After completing operation block O3, assuming that both Error Signal $S_2$ and Wrong Strip Signal $S_5$ are off, the data processor then proceeds to any one of blocks 11, 21, 341, 51, 61, or 781, depending upon which of the eight commands C1 to C8 is being executed. As a first example, if the command being executed by the prosessor is the Set Unit Interrupt Command C1, the processor will advance to operation block 11 during which it will transmit the Set Unit Interrupt Signal $J_2$ to switch on the Unit Interrupt flip-flop (section 300a of FIG. 20) of the selected unit and thereby set the unit for unit interrupt operation. After completing operation block 11, the data processor will then proceed to the next command for which it has been programmed. If on the other hand, the Command being excuted is the Reset Unit Interrupt Command C2, the processor after completing operation block O3, will advance to operation block 21, during which Reset Unit Interrupt Signal $J_3$ is transmitted to turn off the Set Unit Interrupt flip-flop of the selected unit and thereby prevent unit interrupt operation. It should be noted with respect to operation blocks 11 and 21 of the Set and Reset Unit Interrupt Commands C1 and C2 that either may be executed concurrently with any other command. This is possible since the switching of the Unit Interrupt flip-flop in response to signals $J_2$ and $J_3$ may occur at any time in a selected unit without interfering with other logical operations.

Next to be considered in FIG. 22 are the Drop Strip Command C3 and the Call Strip Command C4. If either one of these commands is being executed, the processor after completing operation block O3, will advance to operation block 341 which is common to both the Drop Strip Command C3 and the Call Strip Command C4. In operation block 341 the processor checks the state of Busy Signal $S_3$ in a manner which may be basically similar to that illustrated in FIG. 24 for Wrong Strip Signal $S_5$. If the Busy Signal $S_3$ is on, indicating that a strip has been released but has not reached position-sensing device 60i, the processor will take the Busy Branch which may lead to any other portion of its command flow structure, or even back to operation block 341 so that the processor will recirculate in operation block 341 until Busy Signal $S_3$ turns off.

Assuming that Busy Signal $S_3$ is off in operation block 341, the processor will next proceed to either operation block 32 or 42, depending upon whether the command being executed is a Drop Strip Command C3, or a Call Strip Command C4. Assuming that a Drop Strip Command C3 is being executed, operation will be in block 32 during which the Drop Strip Signal $J_{10}$ is transmitted concurrently with the strip selction signals $e_1$–$e_8$ to release a selected strip and initiate drop strip operation. On the other hand, if the command is a Call Strip Command C4, operation will be in block 42 during which Call Strip Signal $J_9$ is transmitted concurrently with the strip selection signals $e_1$–$e_8$ to release a selected strip and initiate call strip operation of the selected unit. After either of blocks 32 or 42 have been completed, the processor will then proceed to execute the next command for which it has been programmed. It should be noted that the use of the Commands C3 and C4 for releasing a strip, either for drop strip or call strip operation, is advantageous in that the processor may then conveniently proceed to the next command and perform some other activity (such as printing out previously processed data) while the released strip is falling towards the capstan, without having to stand by and further communicate with the selected unit.

The next command to be considered in FIG. 22 is the Return Strip Command C5. If this is the command which is being executed by the processor then, after completion of the common operation block O3, the processor will advance to operation block 51, during which the processor checks the state of Ready Signal $S_4$. Ready Signal $S_4$ may be checked in a manner basically similar to that shown for Wrong Strip Signal $S_5$ in FIG. 24 and, in the same manner, a Return Strip Branch flip-flop could be employed to cause the processor to branch to the Return Strip Branch, if Ready Signal $S_4$ is off. The Return Strip Branch may, for example, merely cause the processor to recirculate in operation block 51 until Ready Signal $S_4$ does turn on.

Assuming that Ready Signal $S_4$ is on in operation block 51, the processor will then proceed to operation block 52, during which the processor transmits Return Strip Signal $J_8$ to initiate removal of a strip on the capstan, and return it to the magazine. After completing operation block 52, the processor may then proceed to the next command for which it is programmed, which of course may be any other command in its command flow structure including one of the random access storage unit Commands C1 to C8.

The next command to be considered is the Test Begin Command C6 which is normally executed by the processor when one or more of the random access storage units is set for unit interrupt operation. For example, assuming that unit $M_1$ is set for unit interrupt operation, when Processor Interrupt Signal $M_1S_{10}$ of unit $M_1$ switches on, indicating that unit $M_1$ is in its minimum access position, the processor wil be informed that it may interrupt its present program, if it chooses to do so, and perform a read or write operation on a previously released strip in unit $M_1$. In such a case, the processor may interrupt its program at some convenient point, such as at the end of a command, while storing the remaining commands to be performed in the interrupted program for later use. The processor will then advance to the first common operation block O1, followed by common operation blocks O2 and O3, after which the processor will advance to block 61 of the Test Begin Command C6. During block 61 Test Begin Signal $J_4$ is transmitted by the processor and the state of Begin Signal $S_6$ is checked in a manner similar to that illustrated in FIG. 24 for Wrong Strip Signal $S_5$. If Begin Signal $S_6$ is off, as might occur if the processor was not able to react to Processor Unit Interupt Signal $M_1S_{10}$ before unit $M_1$ leaves the minimum access position, then the processor takes the Begin Branch instead of proceeding to perform a read or write operation. In such a case, the processor may be caused to recirculate in block 61 until Begin Signal $S_6$ turns on, or may return to the particular program from which it was interrupted to complete execution of the unperformed commands in that program; if the latter is the course taken then, when the Processor Interrupt Signal $M_1S_{10}$ turns on again, the processor may again interrupt its program to execute another Test Begin Command C6. If this time the Begin Signal $S_6$ is on when it is checked in operation block 61, the processor will next advance to operation block 781, as shown in FIG. 22, without having to first execute the command operation blocks O1, O2, and O3.

It will thus be appreciated that operation block 781, which is common to both the Read Command C7 and the Write Command C8, may be entered either after the processor first executes the common operation blocks O1, O2, or O3 (as would ordinarily occur when a selected unit is not set for unit interrupt operation), or following completion of operation block 61 of the Test Begin Command C6 (as would ordinarily occur when a unit is set for unit interrupt operation). Operation block 781 may also be entered from the Ready Branch, as will be explained shortly. In operation block 781, the data processor checks the state of Ready Signal $S_4$ in order to make sure that the selected unit is ready for a read or write operation. The manner in which the ready signal $S_4$ is checked may be similar to that employed for the Wrong Strip Signal $S_5$ in FIG. 24. If Ready Signal $S_4$ is not on the processor will take the Ready Branch. Typically the Ready Branch may be programmed so that when a selected unit is not set for unit interrupt operation (for example, if $M_1$ is the selected unit and $M_1S_9$ is off), then the Ready Branch will cause the processor to re-enter operation block 781 and continue to recirculate in this manner until Ready Signal $S_4$ turns on. Such recirculation is desirable when a selected unit is not set for unit interrupt operation, since the processor will have no way of knowing when the unit is ready for a read or write operation without having to actually select the unit and check Ready Signal $S_4$. Of course, as pointed out in connection with the Test Begin Command C6, if the selected unit is set for unit interrupt operation, its processor interrupt signal (for example, $M_1S_{10}$) will inform the processor that it is in a position to perform a read or write command with a minimum of delay, regardless of what else the processor may be doing.

Assuming Ready Signal $S_4$ is on during operation block 781, the processor will then proceed to operation block 72 for a Read Command C7, or to operation block 82 for a Write Command C8. If the command is a Read Command C7, the processor will transmit Read Signal $J_5$ in block 72 concurrently with the channel number signals $ch_1$–$ch_8$, after which the processor will then advance to operation block 73 where it will wait until Operate Signal $S_7$ turns on. When Operate Signal $S_7$ does turn on, the processor will start the reading operation and, after a record of the desired length has been read from the selected channel of a strip on the capstan, the processor will transmit Halt Signal $J_7$ to terminate the reading operation and then proceed to the next command if no read error is detected. In the event that a read error is detected during the reading operation, such as may be detected by improper parity, provision is made in operation block 73 for the processor to take a Red Error Branch, instead of proceeding to the next command, for the purpose of taking any corrective or other action for which the processor is programmed.

If, on the other hand, the Write Command C8 is the one being executed, after completing operation block 781 the processor will advance to operation block 82, during which the processor will check the state of Write Lockout Signal $S_1$, in the same general way as was done for Wrong Strip Signal $S_5$ in FIG. 24. If Write Lockout Signal $S_1$ is off, the processor will take the Write Lockout Branch where it may be caused to enter any portion of its command structure to take suitable corrective or other action. Assuming, however, that Write Lockout Signal $S_1$ is off, the processor will then advance from operation block 82 to operation block 83, during which the processor will transmit Write Signal $J_6$ concurrently with the channel number signals $ch_1$–$ch_8$, after which the processor will advance to operation block 84. In operation block 84, the processor waits until Operate Signal $S_7$ turns on, and then starts the writing operation. When the desired length record has been written into the selected channel of a strip on the capstan, the processor will transmit Halt Signal $J_7$ and then proceed to the next command if no write error is detected. As was the case for the Read Command $C_7$, the Write Command C8 includes a Write Error Branch which the processor may take instead of proceeding to the next command if a write error is detected. Such error detection is possible either by a parity check, or as the result of the simultaneously performed read operation which checks that the write signals are being properly recorded, as described in connection with FIG. 21.

Before leaving the random access storage unit command structure illustrated in FIG. 22, it should be understood that, during normal operation of a data processor in accordance with its stored program, these random access storage unit commands will be intermixed with various other types of commands, such as arithmetical operation commands, printing out commands, commands for other input, output, or input-output units, etc. The ability of the data processor to proceed from a random access storage unit command to another type of command, and vice versa, permits the data processor to operate at a fast rate without having to wait unduly for the slower operating random access storage units. As will become evident (if not already evident), the operative relationship provided by the present invention for operation of the data processor with one or more random access storage units permits the processor to alternate between random access storage unit commands and other types of commands with unusual versatility, and without having to keep track of the state of each unit; that is, each random access storage unit is not only able to operate in synchronism with the processor but also, is able to operate independently thereof to perform various operations necessary for proper unit and overall system performance, while at the same time being able to keep track of the type of commands or other operations which the processor is attempting or shortly going to perform with respect to the unit. In addition, each unit has the capability of diverting and/or interrupting the processor program at any time to signal the processor that the unit is in a minimum access state, in which state the processor can perform a read or write operation if it chooses to do so, with a minimum of time being required to wait for the unit to reach the proper condition.

OVERALL SYSTEM OPERATION (FIGS. 25 to 27)

Now that typical embodiments of both the Controller 250 (FIGS. 19–21) and the basic random access storage device 150 (FIGS. 1a to 16) have been considered, as well as a typical command flow diagram of the data processor (FIG. 23), a detailed consideration of the typical operation of the overall system will follow next, using the timing diagrams of FIGS. 25 to 27.

Briefly, these timing diagrams of FIGS. 25 to 27 illustrate the operation of the system for three typical operating sequences. The timing diagram of FIG. 25 illustrates a relatively simple sequence in which unit $M_1$ is selected for non-interrupt operation and a single strip is released therefrom for the performance of a read and write operation in channel 3 thereof, after which the strip is returned to the magazine. The timing diagram of FIG. 26 shows a somewhat more involved sequence and better illustrates the features of the present invention, since it includes both interrupt operation of the selected unit $M_1$ and the successive release of a plurality of strips therefrom. The sequence represented by the timing diagram of FIG. 27 illustrates still other features of the invention by demonstrating how a plurality of random access storage units, each of which is set for unit interrupt operation, may operate simultaneously with the data processor so as to increase the speed of data processing. It is to be understood that the operative sequences illustrated in FIGS. 25 to 27 are only illustrative and those skilled in the art, from the disclosure provided herein, will readily be able to provide suitable operating sequences for a wide variety of computer applications.

With the above general description of the timing diagrams of FIGS. 25 to 27 in mind, some further general considerations regarding the arrangement and terminology employed in these timing diagrams will be pointed out in order to provide a basis for the detailed description of each timing diagram which will shortly follow.

The first column of each of the timing diagrams of FIGS. 24 to 27 is entitled "Control Signals" and lists in order, at the appropriate time designations, the particular control signals $J_1$ to $J_{10}$ which occur in the typical operational sequence represented by each timing diagram. The control signal column also indicates the particular command of FIG. 22 which the data processor is executing in order to transmit each corresponding group of control signals. It should, of course, be remembered as shown in FIG. 22 that information signals $u_1$–$u_8$, $ch_1$–$ch_8$, and $e_1$–$e_8$ are transmitted concurrently with control signals $J_1$, $J_5$, or $J_6$ and $J_9$ or $J_{10}$, respectively, and, thus, each time one of these control signals appears in the control column of the timing diagram it is to be considered as being accompanied by its respective concurrently transmitted information signals. Also, it should be noted that the commands shown in the control column are executed as the data processor is processing data in accordance with its stored program, and these will normally be intermixed with various other types of commands, as pointed out previously.

If further description of the control signals $J_1$ to $J_{10}$ is desired besides the short description given in the first column of the timing diagrams of FIGS. 25 to 27, reference may be had to the word description of each control signal presented earlier. It will also be found helpful in considering the timing diagrams of FIGS. 25 to 27 to refer to the typical random access storage unit command structure shown in FIG. 22, which illustrates the generation of control signals $J_1$ to $J_{10}$ by the processor during execution of the random access storage unit commands C1 to C8.

The second column in each of the timing diagrams of FIGS. 25 to 27, entitled "Approximate Time," provides typical approximate times at which various events in the sequence may occur. It should be noted that the time scale for the times listed is not linear, the spacing between adjacent times in the column being determined primarily on the basis of illustrative convenience, rather than being based on the specific time period therebetween. This should cause no difficulty in understanding the timing diagrams of FIGS. 25 to 27, since a specific time designation is provided in the timing column wherever necessary for a complete understanding of system operation. These specific time designations are merely illustrative of a typical embodiment of the basic device 150 and should not be considered as limiting the invention in any way.

As shown in each timing diagram, the control signals $J_1$ to $J_{10}$ in the control signal column have arrows pointing to predetermined locations in the timing column so as to illustrate the time at which each control signal is transmitted by the data processor during execution of a particular command. If the control signal arrow is directed to a point intermediate two time designations, it merely indicates that the control signal is transmitted at some time therebetween. Typically, the control signals $J_1$ to $J_{10}$ may be true pulses of the order of 20 microseconds duration, and each may be assumed to be terminated (that is, become false) before the next lower control signal in the column is transmitted, thereby permitting the logical operations initiated by each control signal (and its concurrently transmitted information signals) to be completed before the next control signal is transmitted. When control signals are grouped together with a common arrow, it merely means that the control signals may be such as to occur in rapid succession, but still with sufficient spacing in time so that, where necessary, the logical operations initiated by each control signal are terminated before the next lower control signal is transmitted. The grouping of control signals with a common arrow is done in order not to unduly complicate the timing diagram since, as far as the time scale of the timing column (which is in milliseconds) is concerned, the commonly grouped control signals occur so close together that they would appear to occur at approximately the same location in the timing column anyway.

The third column in the timing diagram of FIG. 25, the third, fourth, and fifth columns in the timing diagrams of FIGS. 26 and 27, which are entitled "Location of Leading Edge of Strip" are provided to illustrate the location of each released strip during the operative sequence represented by the timing diagrams. For example, in the timing diagram of FIG. 25, the third column thereof shows that the leading edge of a strip first reaches position-sensing device $60j$ approximately 164 milliseconds after being released, and first reaches position-sensing device $60j$ 1.75 milliseconds later, or 165.75 milliseconds after release. Thereafter, during a first recirculation, the leading edge of the strip again reaches position-sensing device $60i$ at 210.10 milliseconds and position-sensing device $60j$ at 211.85 milliseconds. Then during a second recirculation, the leading edge of the strip reaches position-sensing device $60i$ for a third time at 256.20 milliseconds and position-sensing device $60j$ for a third time at 257.95 milliseconds, after which the strip is returned to the magazine.

The next to the last column in each timing diagram of FIGS. 25 to 27 illustrates the states of pertinent ones of the flip-flops and/or the Begin Gate 270 (FIGS. 20 and 21) during the operative sequence represented by each timing diagram; the on (or true) state of a flip-flop or gate is indicated by the presence of a heavy line and the off (or false) state is indicated by the absence of a heavy line. Flip-flops which are not pertinent to a particular timing diagram or whose states are not important to the explanation thereof have been omitted in order not to unnecessarily complicate the timing diagrams. By the provision of this column, in conjunction with the previously described control signal column, timing column, and strip location column, it can visually be seen just how each of the flip-flops and/or the Begin Gate is switched between its on and off states at various times in the operative sequence, in response to the location of the leading edge of a released strip, and the transmission of the various control signals $J_1$ to $J_{10}$. The switching on and off of each flip-flop and the Begin Gate is, of course, directly in accordance with the previously presented Boolean equations and the typical logical mechanizations thereof shown in FIGS. 20 and 21. If, while considering the timing diagrams of FIGS. 25 to 27, a more general description of the switching characteristics of the flip-flop and the Begin Gate shown therein is desired, reference may be had to the previously presented word descriptions of the status signals $S_1$ to $S_7$ and $M_1S_8$ to $M_1S_{10}$, each of which has the same name, as well as the same characteristics as the flip-flop (or Begin Gate) from which it is derived. The difference, of course, is that each of the status signals $S_1$ to $S_7$ is combined with the unprimed output SU of the Select Unit flip-flop so that each is on only when the random access storage unit $M_1$ is selected.

The last column of each of the timing diagrams of FIGS. 22 to 24 is entitled "Remarks" and provides short pertinent comments at particular time designations for the purpose of presenting information to supplement or emphasize the information in the other columns of the timing diagram.

TYPICAL OPERATING SEQUENCE FOR A SINGLE UNIT $M_1$ AND A SINGLE RELEASED STRIP (FIG. 25)

Considering the timing diagram of FIG. 25 first, it should be noted at the outset that the sequence illustrated is one in which unit interrupt operation is not used—that is, there is no way by which the unit $M_1$ can indicate to the processor that it is ready for a read or write operation except by the processor selecting the unit and testing an appropriate one of the status signals $S_1$ to $S_7$. With this in mind and with appropriate reference to the commond flow diagram of FIG. 22, it will be seen in the timing diagram of FIG. 25 that operation is initiated by a strip in unit $M_1$ being released at zero time in response to Drop Strip Signal $J_{10}$, which is transmitted following Select Signal $J_1$ during a Drop Strip Command $C_4$. Thus, when the strip is released at zero time, Select Signal $J_1$ will have switched on the Select Unit flip-flop, while Drop Signal $J_{10}$ will have switched on the Busy flip-flop and the Command flip-flop, all the other flip-flops shown in FIG. 20 remaining in their previous states.

At approximately 164 milliseconds after the strip is released, the strip will have already engaged the capstan and the leading edge of the strip will just reach position-sensing device $60j$, as a result of which, the Busy flip-flop and the Commond flip-flop are turnned off, while the Ready flip-flop is switched on to switch on Ready Signal $S_4$. As indicated in the Remarks column, until the Busy flip-flop is switched off by the leading edge of the strip reaching $60i$, no other strip may be released, and the Busy Signal $S_3$ derived from the Busy flip-flop informs the processor of this condition.

After the leading edge of the strip passes position-sensing device $60i$ and approximately 165 milliseconds from the time of release, the data processor executes a Read Command C7 during which the processor first transmits the Select Signal $J_1$ and then checks that Ready Signal $S_4$ is turned on (Ready flip-flop on). Since Ready Signal $S_4$ is on, the processor transmits Read Signal $J_5$ to switch on the Read flip-flop, while concurrently transmitting channel number signals $ch_1$–$ch_8$, corresponding to channel 3 to activate the channel 3 read drivers in read head driver circuitry 420 (FIG. 21).

If Ready Signal $S_4$ were off during execution of the Read Command C7 (which would occur, for example, if the leading edge of the strip had not yet reached $60j$) then, since unit $M_1$ is not set for unit interrupt operation ($M_1S_9$ is off), the processor would wait (that is, the processor would recirculate in operation block 781 of FIG. 22) until Ready Signal $S_4$ turned on before transmitting signals $J_5$ and $ch_1$–$ch_8$. As shown in FIG. 25, following the transmission of signals $J_5$ and $ch_1$–$ch_8$, the leading edge of the strip reaches position-sensing device $60j$ for the first time at approximately 165.75 milliseconds, as a result of which, the Return Gate flip-flop is turned off to close return gate 70 (FIG. 16), while at the same time causing the Operate flip-flop to be switched on to turn on Operate Signal $S_7$ and signal the processor to start receiving (on input lines $PI_1$ to $PI_8$) to read signals $r_1$–$r_8$ from the selected channel 3. After a record of the desired length has been read from the selected channel 3 on the strip, the processor transmits Halt Signal $J_7$ at approximately 185.75 milliseconds to turn off both the Read flip-flop and the Operate flip-flop and thereby terminate the reading operation as well as the Read Command C7.

Continuing with the description of the timing diagram of FIG. 25, after the reading operation, the strip will remain on the capstan for another recirculation as a result of the Return Gate flip-flop having been closed when the strip first reached $60j$. However, before the leading edge of the release strip again reaches position-sensing device $60i$ for a second time at approximately 210.10 milliseconds, the data processor executes a Write Command C8, during which the Select Signal $J_1$ is again transmitted, Ready Signal $S_4$ is again checked, and since $S_4$ is on, a Write Signal $J_6$ is transmitted concurrently with channel number signals $ch_1$–$ch_8$ corresponding to channel number 3; this is the same channel from which data was read when the strip first passed the read and write heads. As a result, Write Signal $J_6$ acts to turn on the Write flip-flop, while channel number signals $ch_1$–$ch_8$ cause activation of the channel 3 read and write drivers in preparation for the writing operation. When the released strip reaches position-sensing device $60j$ for the second time at approximately 211.85 milliseconds, the Operate flip-flop is again switched on to turn on Operate Signal S7 and signal the processor to start the writing operation, whereupon the processor will then transmit (by way of output lines $PO_1$–$PO_8$) the write signals $w_1$–$w_8$ which are to be written in the selected channel 3, while at the same time receiving the read signals $r_1$–$r_8$ (by way of input lines $PI_1$–$PI_8$) in order to provide a check that the data being written is being properly recorded on the strip. After a record of the desired length has been written in the selected channel, the processor again transmits Halt Signal $J_7$ at approximately 231.85 milliseconds to turn off both the Operate flip-flop and the Write flip-flop and thereby terminate the reading operation and the Write Command C8. It will be noted that the period for which writing occurs (211.85 to 231.85 or 20 milliseconds) is the same period for which reading occurred previously (165.75 to 185.75 or 20 milliseconds) indicating that a record of the same length was read from and written into the same portion of channel 3.

Still continuing with the description of the timing diagram of FIG. 25, it will be noted that, following the above described writing operation, the Return Gate flip-flop is still off so that the strip remains on the capstan for a second recirculation. While on this second recirculation and before the leading edge of the strip reaches position-sensing device $60i$ for a third time at approximately 256.20 milliseconds, the processor executes a Return Strip Command C5 during which Select Signal $J_1$ is transmitted, the on state of Ready Signal $S_4$ is checked, and Return Strip Signal $J_8$ is then transmitted to turn on the Command flip-flop and initiate return of the strip on the capstan back to the magazine, without having to wait for the 750 millisecond timer T4 to run out. Thus, when the leading edge of the strip next reaches position-sensing device $60i$ for the third time at 256.20 milliseconds, the Return Gate control flip-flop is also switched on; then, when the leading edge of the strip reaches position-sensing device $60j$ for the third time at approximately 257.95 milliseconds, the Return Gate flip-flop is switched on, opening the return gate so as to remove the strip from the capstan and return it back to the magazine.

In summary, it will be seen that the above described operative sequence of the timing diagram of FIG. 25 has resulted in the release of a selected strip in unit $M_1$, and the performance of successive read and write operations in the same portion of a selected channel 3 thereof. Such operation is typical of an updating operation in which old stored data is updated to correspond to new data. For example, the data read in channel 3 of the released strip of the capstan in the sequence of FIG. 25 may represent the previous balance of a particular customer's account. After this data is read by the processor, it may then be operated on by the processor while the strip is beginning its first recirculation on the capstan and an up-to-date balance produced by the processor by the time the strip on the capstan is ready for a write operation, at which time the updated balance will be written into the same portion of channel 3. Since the released strip has remained on the capstan without returning to the magazine, the entire updating operation can be performed in the time required to release the strip plus the time required for a single recirculation, or approximately 230 milliseconds. Also, as pointed out in connection with the previous description of the basic device 150, the length of a strip is preferably designed to be of the order of ⅔ of the circumference of the capstan so that while the strip is making a recirculation the processor can conveniently perform its data processing action to produce an updated balance, which can then be written in the selected channel the next time the selected unit $M_1$ is ready.

TYPICAL OPERATING SEQUENCE FOR A PLURALITY OF STRIPS RELEASED FROM A SINGLE RANDOM ACCESS UNIT $M_1$ WHICH IS SET FOR UNIT INTERRUPT OPERATION (FIG. 26)

In the previous description of the timing diagram of FIG. 25 it was seen that, because the selected unit $M_1$ was not set for unit interrupt operation, the processor had to first select the unit $M_1$ and then, if Ready Signal $S_4$ was not on, would have to wait (that is recirculate in operation block 781 in FIG. 22) until Ready Signal $S_4$ did turn on before a Read Command C7 or a Write Command C8 could be completed. While this type of operation is not overly wasteful of processor operating time in situations where the processor does not have much else to do, there are many situations where such waiting would severely impair the efficiency of processor operation. Fortunately, this disadvantage is readily overcome in the present invention by taking advantage of the interrupt operation capability of a selected random access storage unit, as will now be illustrated by means of the operating sequence of FIG. 26. It will be shown how the processor is able to make maximum use of its processing time since, when unit interrupt operation is employed, a unit is able to signal the processor when it is in its minimum access condition, at which time a Read Command C7 or a Write Command C8 can be executed with a minimum of delay. The timing diagram of FIG. 26 will also be used to show how overlapping between two strips is advantageously achieved (that is, a new strip is released while a previous strip is on the capstan), while at the same time guarding against performing a read or write operation on the wrong strip. Also, it will become evident that this speed up in operation of the unit is accomplished without significantly increasing the burdens on the processor.

In considering the timing diagram of FIG. 26, a more summarized description will be given than was the case for the timing diagram of FIG. 25, since sufficient facility with the terminology and visual indications provided by this type of timing diagram should already have been gained from the detailed description of FIG. 25. During the course of the description, appropriate reference may be made wherever necessary or desirable to the information provided in each of the various columns, as well as to the details of the random access storage unit command structure shown in FIG. 22.

In the previous description of the timing diagram of FIG. 25, it was pointed out that the operating sequence shown therein may typically represent an updating operation in which an old account balance is read from channel 3 of a released strip, is updated by the processor, and the new account balance then written back into channel 3 of the released strip. In a like manner, the timing diagram of FIG. 26 may be considered to represent some useful function, namely a simple type of sorting operation in which an item of data, such as a customer account number, is read from a first file (file A) and placed in a second file (file B) if the account number is greater than a predetermined reference number, or in a third file (file C) if the account number is less than the reference number. In FIG. 26, it will be assumed that the strips 10 (FIG. 16) in unit $M_1$ represent these three files A, B, and C, strip 1 being a strip in file A, while strips 2 and 3 are strips in files B and C, respectively. It will also be assumed that channel 3 of strip 1 stores a first account number which is greater than the reference number and is thus to be written into a strip of file B, namely channel 5 of strip 2, while channel 4 of strip 1 will be assumed to store a second account number which is less than the reference number, and is thus to be written into file C, namely channel 6 of strip 3.

With the above assumptions in mind, the timing diagram of FIG. 26 will now be considered more specifically.

It will be noted that at zero time, unit $M_1$ is set for unit interrupt operation and strip 1 is released for drop strip operation as a result of the execution by the processor of the Set Unit Interrupt Command C1 and the Drop Strip Command C3. Since unit $M_1$ has thus been set for unit interrupt operation, when the leading edge of strip 1 reaches position-sensing device $60i$ for the first time at approximately 164.00 milliseconds, unit $M_1$ will signal the processor that it is in a minimum access condition—that is, the processor will be signaled that strip 1 is between position-sensing devices $60i$ and $60j$, at which position a Read or Write Command C7 or C8 can be executed with a minimum of processor waiting time. The processor then interrupts its program at some convenient point (assuming it chooses to do so) and at approximately 165.00 milliseconds executes the Test Begin Command C6 to check that unit $M_1$ is still in the minimum access condition. Finding that Begin Signal $S_6$ is on, the Read Command 7 follows in rapid succession to activate the read drivers of channel 3 and cause reading of the first account number contained therein; reading starts when Operate Signal $S_7$ turns on at approximately 165.75 milliseconds (in response to the leading edge of strip 1 (reaching position-sensing device $60_j$) and terminates, when Halt Signal $J_7$ is transmitted at approximately 185.75 milliseconds, a period of approximately 20 milliseconds. After the Read Command C7 is completed by transmission of Halt Signal $J_7$, the processor may then return to the program from which it was interrupted and continue with other types of commands.

At approximately 190.00 milliseconds, the processor again selects unit $M_1$ and executes the Call Strip Command C4 to release the next strip which is to communicate with the processor, even though another reading operation is still to be performed on strip 1 to read the second account number in channel 4 thereof. As mentioned previously, such overlapping of strips, considerably speeds up unit operation, and the execution of the Call Strip Command C4 (instead of the Drop Strip Command C3) still permits one more recirculation of strip 1 on the capstan in order to permit this second reading operation to be performed. Since it was previously assumed that the account number in channel 3 of strip 1 is greater than the reference number, the account number which has just been read in channel 3 is to be written into file B, and more specifically into channel 5 of strip 2 of file B. Thus, strip 2 is the strip released by the processor at approximately 190.00 milliseconds in order to permit this writing operation to occur.

While strip 2 is still falling, strip 1 on the capstan recirculates to reach position-sensing device $60i$ for the second time at approximately 210.10 milliseconds, at which time the processor is again interrupted by unit $M_1$, resulting in the execution of the Test Begin Command C6 at approximately 211.00 milliseconds, followed in rapid sequence by the execution of the Read Command C7. The second reading operation in channel 4 of strip 1 is thus caused to start at approximately 211.85 milliseconds (in response to the leading edge of the strip reaching $60j$) and is terminated at approximately 231.85 milliseconds when the processor transmits Halt Signal $J_7$. Because the Call Strip Command C4 was previously executed at approximately 190 milliseconds, the return gate will have opened when the leading edge of the strip reached position-sensing device $60j$ for the second time at approximately 211.85 milliseconds, causing strip 1 to be removed from the capstan and sent on its way back towards the magazine in plenty of time before strip 2 reaches the vicinity of the capstan. Also, it is to be noted that, as a result of the Call Strip Command C4 being executed at approximately 190.0 milliseconds so as to permit another read operation to be performed in channel 4 of strip 1, the Ready flip-flop remains on to maintain Ready Signal $S_4$ on until Read Signal $J_5$ is transmitted, which occurs during the execution of the Read Command C7 at approximately 211.00 milliseconds. Because the Ready Signal $S_4$ remains on, the Processor Interrupt flip-flop is then able to turn on again at approximately 210.10 milliseconds to again interrupt the processor for performance of this second reading operation in channel 4 of strip 1. As will become evident further on in this description of the timing diagram of FIG. 26, such is not the case if a Drop Strip Command C3 is executed, since the next read or write operation is intended for the newly released strip and not for the strip presently on the capstan.

Continuing with the description of the timing diagram of FIG. 26, it will be seen that strip 2 (which was released by the Call Strip Command C4 at approximately 190.00 milliseconds) reaches position-sensing device $60i$ for the first time at approximately 354 milliseconds, causing the Ready flip-flop to turn on again and permit unit $M_1$ to again interrupt the processor. As a result, a Test Begin Command C6 is executed by the processor at approximately 355 milliseconds, followed in rapid succession by a Write Command C8, causing the account number previously read from channel 3 of strip 1 to be written into channel 5 of strip 2 during the 30 millisecond period starting at approximately 355.75 milliseconds and ending at 385.75 milliseconds when Halt Signal $J_7$ is transmitted.

Having written the account number previously read from channel 3 of strip 1 into channel 5 of strip 2, the processor may then return to whatever else it was doing before interruption. Thereafter, the processor returns to unit $M_1$ at approximately 390 milliseconds, and executes a Drop Strip Command C3 to release strip 3, after having determined that the account number read from channel 4 of strip 1 during the second reading operation is smaller than the reference number and thus is to be written into file C, namely channel 6 of strip 3. A Drop Strip Command C3 is executed by the processor at this time instead of a Call Strip Command C4, since the writing operation in channel 5 of strip 2 has previously been completed, and although strip 2 is still on the capstan, the next writing operation is intended for newly released strip 3 and not for strip 2. By executing the Call Strip Command C4, proper operation is assured since the Ready flip-flop is immediately turned off and, along with the Processor Interrupt flip-flop, is prevented from turning on until strip 3 reaches position-sensing device $60i$ for the first time. This prevents writing on the wrong strip (strip 2) as well as preventing an unnecessary interruption of the processor when strip 2 on the capstan again reaches position-sensing device $60i$ at approximately 400.10 milliseconds. Also, as a result of the Drop Strip Command C3 having been executed at approximately 390.00 milliseconds, the return gate will open when strip 2 reaches position-sensing device $60j$ at approximately 401.85 milliseconds to send strip 2 back on its way to the magazine.

When strip 3 now reaches position-sensing device $60i$ for the first time at approximately 554.00 milliseconds, unit $M_1$ again interrupts the processor causing execution of another Test Begin Command C6 at approximately 555.00 milliseconds, followed by another Write Command C8. Thus, when the leading edge of strip 3 reaches position-sensing device $60j$ for the first time at approximately 555.75 milliseconds, writing of the account number previously read from channel 4 of strip 1 into channel 6 of strip 3 is started, and continues for approximately 30 milliseconds until terminated by the Halt Signal $J_7$ transmitted by the processor at approximately 585.75 milliseconds. Since strip 3 is no longer needed after this writing operation, a Return Strip Command C5 is executed by the processor at approximately 590.00 milliseconds, causing the return gate to open at approximately 601.85 milliseconds (when the leading edge of strip 3 reaches position-sensing device $60j$ for the second time), as a result of which, strip 3 is returned to the magazine.

Alternatively, removal of strip 3 could have been accomplished by permitting the 750 millisecond timer T4 (FIG. 20, section 300a) to run out, in which case removal of strip 3 would have been automatic without requiring any processor command. It will be noted that simultaneously with the execution of the Return Strip Command C5, a Reset Unit Interrupt Command C2 is executed to terminate unit interrupt operation of unit $M_1$.

Having completed the description of the timing diagram of FIG. 26, one possible variation will now be considered. If for some reason the processor, in response to being interrupted by unit $M_1$ at 210.10 milliseconds, was not able to react in time to execute the Test Begin Command C6 (which is shown as being executed at 211.00 milliseconds) until after the Begin Signal $S_6$ derived from the Begin Gate turned off, no Read Command C7 would have been able to be executed. However, because the Call Strip Command C4 was executed at 190.00 milliseconds, the return gate will nevertheless open at 211.85 milliseconds when the leading edge of strip 1 reaches position-sensing device $60j$ to caust srtip 1 to be removed from the capstan and returned to the magazine, even though this will result in preventing performance of the reading operation which is intended to be performed to read the the account number in channel 4 of strip 1. Fortunately, this unperformed reading operation is preventing from being performed on the next strip to reached the capstan, which is strip 2, because, when the Begin Command C6 finds the Begin Signal off, there will be no Read Command C7 executed to cause the Read Signal $J_5$ to be transmitted to turn off the Call Strip flip-flop. Thus, when the return gate opens at approximately 211.85 milliseconds, the Wrong Strip flip-flop (FIG. 20, section 300b) will be switched on, turning on the Wrong Strip Signal $S_5$ derived therefrom. As a result, when the processor next executes a random access storage unit command, the fact that the Wrong Strip Signal $S_5$ is on will cause the processor to take the Wrong Strip Branch (operation block O3) by means of which the processor will prevent the unperformed write operation from being performed on the newly released strip 3 for which it is not intended. For example, the processor could store the Read Command intended for channel 4 of strip 1 for performance at a later time and, in the meantime, skip to the operation of writing the account number previously read from channel 3 of strip 1 into channel 5 of strip 2. Then, strip 1 could be released again, prior to the release of strip 3, to permit the unperformed reading operation in channel 4 of strip 1 to be performed. Strip 3 could then be released so that the account number read from channel 4 of strip 1 can be written into channel 6 of strip 3, as required.

It is to be understood with respect to the timing diagram of FIG. 26 that the basic sorting operation illustrated therein, in which an account number in a file A of unit $M_1$ is written into either a file B or a file C of unit $M_1$, depending upon its relation to a reference number, may be applied to any desired number of account numbers, in which case, at the end of such an operation, all the account numbers read from file A which are greater than the reference number will be in file B, while all those smaller than the reference number will be in file C. It is also to be understood that much more complicated sorting operations may be employed in which additional files, besides A and B, are provided in unit $M_1$, and a plurality of reference numbers, instead of a single reference number, are employed for determining into which file an account number read from file A is to be written. Still further, different reference numbers may be used for each account number read from file A, the values of which may be made dependent upon the sorting previously accomplished. Also, the location and/or order in which the account numbers read from file A are written into each of the various other files B, C, etc. may be controlled as desired for the particular sorting operation.

TYPICAL OPERATING SEQUENCE FOR A PLURALITY OF RANDOM ACCESS STORAGE UNITS $M_1$ AND $M_2$ AND A PLURALITY OF RELEASED STRIPS THEREFROM (FIG. 27)

So far, the typical operating sequences illustrated in the timing diagrams of FIGS. 25 and 26 have involved only a single random access storage unit. The purpose of the timing diagram of FIG. 27 is to illustrate a typical operative sequence where more than one unit is involved, namely the two units $M_1$ and $M_2$. For this purpose, it will be assumed that the same basic sorting operation as assumed for the timing diagram of FIG. 26 is to be performed. Thus, as was done for the timing diagram of FIG. 26, it will be assumed that strip 1 is a strip located in file A of unit $M_1$, and has a first account number in channel 3 thereof, which is greater than a predetermined reference number and thus is to be written into file B, or more specifically, channel 5 of strip 2. It will also be assumed, as in the timing diagram of FIG. 26, that strip 1 has a second account number in channel 4 thereof, which is less than the reference number, and thus is to be written into file C, or more specifically, channel 6 of strip 3. Also, as was done in FIG. 26, it will be assumed that both files A and B and their respective strips 1 and 2 are located in unit $M_1$. However, unlike in FIG. 26, it is to be assumed for the timing diagram of FIG. 27 that file C and its respective strip 3 are located in a second random access storage unit, namely unit $M_2$.

With the above assumptions in mind, the typical operating sequence of FIG. 27 which involves both unit $M_1$ and $M_2$ will now be considered more specifically and, as was the case for the timing diagram of FIG. 26, the description of FIG. 27 will be in a more summarized manner than was presented for the timing diagram of FIG. 25, in view of the facility which should now have been obtained with respect to these timing diagrams. Thus, referring to FIG. 27 in detail, it will be seen that at zero time, the processor executes the Set Interrupt Command C1 and the Drop Strip Command C3 to select unit $M_1$, set the unit for unit interrupt operation, and release strip 1 therefrom for drop strip operation. Approximately two milliseconds later, the processor executes another Drop Strip Command C3 which this time selects unit $M_2$ and releases strip 3 therefrom for drop strip operation. However, unit $M_2$ is not yet set for unit interrupt operation, since it is not intended that strip 3 be written into until some time later. In this manner, unit $M_2$ is prevented from unnecessarily interrupting the processor until the processor is ready to make use of strip 3.

To simplify the remaining description of the timing diagram of FIG. 27, it will be helpful to note that except for the release of strip 3 at 2 milliseconds in response to Drop Strip Command C3, operation of the processor and unit $M_1$ during the first 250 milliseconds is identical to that described in connection with the timing diagram of FIG. 26, as will be seen from a comparison of the two figures. The fact that the time scales in the two figures are made somewhat different for illustrative purposes does not, of course, change this equivalence of operation. Thus, it will be expedient to advance this description to a point approximately 250.00 milliseconds after release of strip 1, at which time the account numbers in both channel 3 and 4 of strip 1 of unit $M_1$ will have been read by the processor, strip 1 will be on its way back to the magazine, and strip 2 in unit $M_1$ will have been released and will be in the process of falling towards the capstan. Also, at 250.00 milliseconds strip 3 in unit $M_2$ (which was released 2 milliseconds after the release of strip 1 in unit $M_1$) will have reached position-sensing device $60i$ for the first time at approximately 166.00 milliseconds, and will just be beginning a second recirculation on the capstan of unit $M_2$. However, since unit $M_2$ has not previously been set for unit interrupt operation, the processor is not interrupted by unit $M_2$ during the first 250.00 milliseconds and the strip 3 on the capstan of unit $M_2$ merely recirculates, as a result of the return gate having been closed when strip 3 first reached position-sensing device 60j.

With the processor thus having completed reading in channels 3 and 4 of strip 1, with strip 2 still falling, and with strip 3 of unit $M_2$ already on the capstan, the time is now ripe to set unit $M_2$ for unit interrupt operation, which is accomplished by the processor executing the Unit Interrupt Command C1 at 250.00 milliseconds. As a result, the next time the leading edge of strip 3 reaches position-sensing device 60i of unit $M_2$ at approximately 258.20 milliseconds, unit $M_2$ interrupts the processor for the first time, and the processor reacts by executing a Test Begin Command C5 at approximately 259.00 milliseconds, followed in rapid sequence by the Write Command C8. Consequently, the account number previously read from channel 4 of strip 1 will be written into channel 6 of strip 3 during the 30 millisecond period starting at approximately 259.95 milliseconds and ending at approximately 289.95 milliseconds when Halt Signal $J_7$ is transmitted by the processor. It is to be noted that since strip 3 of unit $M_2$ corresponds to file C, in which account numbers lower than the reference number are to be written, the account number from channel 4 of strip 1 which has been assumed to be less than the reference number is the one which is written in channel 6 of strip 3. It is also to be noted in the timing diagram of FIG. 27, that the account number read from channel 4 of strip 1 is written first in time, since strip 3 is available first; in the timing diagram of FIG. 26, on the other hand, the account number from channel 3 of strip 1 is written first because in this diagram strip 2 is available first.

After the account number read from channel 4 of strip 1 has been written into channel 6 of strip 3 in unit $M_2$, strip 3 is not needed any longer and, therefore, unit interrupt operation of unit $M_2$ is terminated by the execution of the Reset Unit Interrupt Command C2 at approximately 290.00 milliseconds, thereby preventing unit $M_2$ from unnecessarily interrupting the processor. Alternatively, the processor could be programmed to prevent any interruption by unit $M_2$ once writing in strip 3 has been completed. Also, at approximately 290.00 milliseconds, the Return Strip Command C5 is executed to cause the return gate in unit $M_2$ to open at approximately 306.05 milliseconds (when the leading edge of strip 3 next reaches position-sensing device 60j), whereupon strip 3 is removed from the capstan and sent on its way back to the magazine in unit $M_2$.

While the above-described operations are being performed on strip 3 in unit $M_2$, strip 2 continues to fall towards the capstan in unit $M_1$ and at approximately 354 milliseconds reaches position-sensing device 60i for the first time. Since unit $M_1$ is still set for Unit Interrupt Operation, the processor is again interrupted to execute a Test Begin Command C6 at approximately 355.00 milliseconds, followed in rapid sequence by the Write Command C8 as a result of which, the account number previously read from channel 3 of strip 1 is written into channel 5 of strip 2 during the 20 millisecond period starting at 355.75 milliseconds and end at 375.75 milliseconds when the processor transmits Halt Signal $J_7$. Since the account number in channel 3 of strip 1 is the one which is assumed to be greater than the reference number, it is the one which is written in strip 2 located in file B.

With operations in strip 2 and unit $M_1$ now completed, the Reset Unit Interrupt Command C2 and the Return Strip Command C5 are simultaneously executed by the processor at approximately 390.00 milliseconds to terminate unit interrupt operation of unit $M_1$, and cause strip 2 to be returned to the magazine of unit $M_1$. Alternatively, strip 2 could be automatically returned to the magazine without any command from the processor merely by permitting the 750 millisecond timer T4 to run out.

As was the case for the timing diagram of FIG. 26, the equivalent operative sequence of FIG. 27 described above can be extended to perform much more complicated sorting operations, where many files are used as well as any desired plurality of random access storage units. Also, as pointed out in connection with FIG. 26, the reference number may be changed for each account number read, and the order of writing in each file may be controlled in any suitable manner.

From the above description of the timing diagram of FIG. 27, as well as the previous diagrams of FIGS. 25 and 26, it should now be appreciated just how the processor is able to operate with a plurality of units, and how overlapping of strips both in the same unit and in different units is readily accomplished to maximize system efficiency without sacrificing reliability or accuracy of system performance. Also, it will be noted that the time required for performance of the illustrative operation in the typical operative sequence of FIG. 27, using the two units $M_1$ and $M_2$, is more than 30% less than the time required for the equivalent operation to be performed using only the single unit $M_1$, as in the operative sequence of FIG. 26. This is a very considerable saving in operating time, and the percentage will increase directly in accordance with the number of random access storage units employed. Thus, by suitable choice of the number of units and the processor program, both the processor and the units may be caused to operate at maximum efficiency, while at the same time, the important random access capability of each unit in the overall system is maintained. In addition, it should be noted that if sequential operation is desired, this can also be readily accomplished by sequentially releasing strips in a single unit, or in a plurality of units, the rate of sequencing depending upon the number of random access storage units which are involved. In fact, sequencing rates may be greater than in conventional tape systems where two or more random access storage units are used in overlapping strip operation, such as described in connection with FIGS. 26 and 27.

MODIFIED EMBODIMENT OF THE RANDOM ACCESS DEVICE 150 (FIG. 28)

As has been pointed out previously, the specific version of the basic random access storage device 150 illustrated in FIGS. 1a to 16 is only exemplary and innumerable modifications and variations in the construction and arrangement thereof are possible in accordance with the present invention. In FIG. 28, some important modifications are illustrated which permit greater system versatility as well as permitting the invention to be extended to a wider range of uses. Referring to FIG. 28, it will be seen that this figure is basically the same as FIG. 16, with the addition of certain modifications which will be considered in detail in this portion of the description.

First, it will be noted that just above the capstan 40a a solenoid 670 is provided having a platform element member 671, which is capable of moving into the path of a released strip upon actuation of the solenoid 670 by platform actuation circuitry 675. The dashed lines projecting from the platform member 671 represent the position of the platform member 671 when the solenoid 670 is actuated, and the dashed lines 10′ extending from the stack of strips 10 represent the position of a released strip when it is stopped by platform member 671. Platform actuation circuitry 675 is in turn controlled by the outputs of AND gates 680 and 685, solenoid 670 being actuated (or set) in response to the output of AND gate 680 becoming true, and being de-actuated (or reset) in response to the output of AND gate 685 becoming true.

The unprimed output SU of the Select flip-flop (FIG. 21) is fed as one input to both AND gates 680 and 685, while control signals $J_{11}$ and $J_{12}$, are fed to AND gates 680 and 685, respectively. These additional control signals $J_{11}$ and $J_{12}$ have not previously been disclosed, but it will be understood that they may be caused to be transmitted by the processor during one or more commands in a manner similar to that employed for control signals $J_1$ to $J_{10}$. Thus, where appropriate, a released strip in a selected random access storage unit can be stopped just short of engaging the capstan 40a in response to control signal $J_{11}$, and then suitably released in response to signal $J_{12}$ to fall the remaining short distance to the capstan 40a. Such operation is of value since, as will be seen from the illustrative times given in the timing diagrams of FIGS. 25–27, it may take approximately 164 milliseconds for a strip to reach position-sensing device 60i after being released from the stack of strips 10 in the magazine, which in some cases may be wasteful. However, with the modification shown in FIG. 28, if it is known that a particular strip is to be released, it will be of value in various operations to prematurely release the strip and permit it to fall most of the distance to the capstan 40a and be stopped by platform member 671 in response to signal $J_{11}$, where it will remain while a previous strip is caused to recirculate on the capstan any desired number of times. Then, when the previous strip is about to leave the capstan, the signal $J_{12}$ may be transmitted by the processor to permit the strip to fall the remainder of the distance to the capstan. In this manner, a considerable portion of the 164.00 millisecond dropping time may be saved. Such a modification as illustrated in FIG. 28 and the operative modifications derivable therefrom are to be considered as within the scope of this invention, and those skilled in the art will have no difficulty in providing a suitable mechanization from the schematic arrangement shown in FIG. 28, and the previous disclosure provided herein.

Another modification illustrated in FIG. 28 involves the use of boosters 610 in an extended guide arrangement in which the boosters 610 serve to maintain the velocity of travel of a strip in the guide. These boosters 610 may be constructed as smaller versions of the capstan 40a and, thus, may similarly include vacuum means as well as rotation means which act on a strip traversing the booster 610 so as to accelerate and/or maintain the strip velocity at a desired speed. By using such boosters 610, the range of speeds at which the capstan 40a may be operated may be chosen with greater flexibility, since the capstan need no longer provide the centrifugal force to return the strip to the magazine, the necessary strip velocity being obtained by means of one or more boosters 610.

More importantly, the use of boosters 610, as illustrated in FIG. 28, permits a strip, after being removed from the capstan 40a, to be sent anywhere else one may desire, either to another basic random access storage device, or to whatever device or other means may be able to make use of the strip. For example, as generally illustrated by the modification shown in FIG. 28, the input and output strip guide means in each of a plurality of random access storage devices 150 may be connected to a common guide system 85' so that each of the devices 150 can both receive and return strips from and to the common guide system. Boosters 610 would then be provided as necessary or desired to permit a strip to be maintained at a velocity sufficient to permit it to travel among the various random access storage devices. Also, one or more direction controlling gates, such as schematically illustrated at 690 in FIG. 28, could be provided to direct a strip in the guide system 85' to a particular branch thereof. The solid representation of the direction controlling gate 690 designates one position of the gate while the dashed representation represents the other position of the gate.

While the foregoing disclosure has been concerned primarily with certain illustrative embodiments, it is to be understood that the invention is susceptible of many modifications and variations in both construction and arrangement, as well as having many other uses, besides those disclosed herein. The present invention, therefore, is not to be considered as limited to the specific disclosure provided herein, but is to be considered as covering all modifications and variations falling within the scope of the invention as defined in the appended claims.

We claim:
1. Random access storage means comprising:
   a plurality of individual data-storage elements retained in an assembled group from which any selected one may be removed regardless of its position in the group for the performance of a transducing operation thereon,
   transducing means for performing a transducing operation on a removed data-storage element,
   at least one position-sensing means for sensing the position of a removed element in said random access storage means, and
   means cooperating with said position-sensing means for controlling the time spacing between the successive selection of said data-storage elements so that a newly selected element may be removed while a previously removed element is undergoing a transducing operation.

2. Random access storage means comprising:
   a plurality of individual data-storage elements,
   means for retaining said elements as an assembled group in said random access storage means,
   means for selectively removing any one of said elements from said group regardless of its position therein,
   transducing and operating means for engaging a removed element and for performing a transducing operation thereon,
   disengaging means for disengaging an element from said transducing and operating means and for causing the disengaged element to be returned to said assembled group,
   at least one position-sensing means for sensing the position of a removed element in said random access storage means; and
   means cooperating with said position-sensing means and said removing means for controlling the operation of said disengaging means so that a previously removed data-storage element is automatically disengaged from said transducing and operating means before a newly removed data-storage element is applied thereto.

3. A random access storage system comprising:
   a plurality of individual data-storage elements,
   means for retaining said elements as an assembled group,
   removing means for selectively releasing any one of said elements from said group regardless of its position therein,
   transducing and operating means for engaging a removed data-storage element and for performing a transducing operation thereon,
   disengaging means for disengaging an element from said transducing and operating means and for causing the disengaged element to be returned to said assembled group,
   at least one position-sensing means for sensing the position of a removed data-storage element with respect to said transducing and operating means,
   first means constructed and arranged to cooperate with said position-sensing means and said removing means for controlling the operation of said disengaging means so that a previously removed data-storage element is automatically disengaged from said transducing and operating means before a newly removed data-storage element is applied thereto, and second means constructed and arranged to cooperate with said position-sensing means and said removing means so that the next data-storage element to be selected is not removed until a previously removed element has reached a predetermined position with respect to said position-sensing means.

4. A random access storage system comprising:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element and of successively applying said element to said transducing means, at least one position-sensing means for sensing the position of an element with respect to said transducing means when said element is engaged by said operating means, disengaging means operable to disengage an element from said operating means, means constructed and arranged to cause an element disengaged by said disengaging means to automatically be returned to said assembled group, and means constructed and arranged to cooperate with said releasing means, said disengaging means and said position-sensing means so that the release of a new data-storage element causes said disengaging means to operate to disengage a previously released data-storage element from said operating means in response to said previous data-storage element next reaching a predetermined position with respect to said position-sensing means.

5. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element and of successively applying the engaged element to said transducing means, disengaging means operable to cause disengagement of an element from said operating means, means constructed and arranged to cause an element disengaged from said operating means by said disengaging means to automatically be returned to said assembled group, circuit means for controlling the operation of said releasing means, said disengaging means and said transducing means, said circuit means including first means capable of being operated to cause said releasing means to release a selected data-storage element while preventing said transducing means from performing any further transducing operations until the newly released data-storage element reaches a predetermined position with respect to said transducing means, and said circuit means also including second means capable of being operated as an alternative to the operation of said first means to cause said releasing means to release a selected data-storage element while controlling said transducing means and said disengaging means to permit at least one more transducing operation to be performed on a previously released data-storage element.

6. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element applied thereto and of successively applying the engaged element to said transducing means, disengaging means operable to cause disengagement of an element from said operating means, position-sensing means for sensing the position of an element with respect to said transducing means, and circuit means cooperating with said position-sensing means for controlling the operation of said releasing means, said transducing means and said disengaging means, said circuit means including first means capable of being operated to cause said releasing means to release a selected data-storage element while preventing said transducing means from performing any further transducing operations until the newly released data-storage element reaches a predetermined position with respect to said position-sensing means, said circuit means also including second means capable of being operated as an alternative to the operation of said first means to cause said releasing means to release a selected data-storage element while controlling said transducing means and said disengaging means to provide at least one more opportunity for the performance of a transducing operation on a previously released data-storage element in engagement with said operating means, said circuit means further including means automatically operable in response to the release of a newly selected element by said releasing means to cause said disengaging means to operate to disengage a previously released data-storage element in engagement with said operating means in response to the engaged element next reaching a predetermined position with respect to said position-sensing means.

7. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element applied thereto and of successively applying the engaged element to said transducing means, disengaging means operable to cause disengagement of an element from said operating means, means constructed and arranged to cause an element disengaged from said operating means by said disengaging means to be automatically returned to said assembled group, position-sensing means for sensing the position of an element with respect to said transducing means, and circuit means cooperating with said position-sensing means for controlling the operation of said releasing means, said transducing means and said disengaging means, said circuit means including first means capable of being operated to cause said releasing means to release a selected data-storage element while preventing said transducing means from performing any further transducing operations until the newly released data-storage element reaches a predetermined position with respect to said position-sensing means, said circuit means also including second means capable of being operated as an alternative to the operation of said first means to cause said releasing means to release a selected data-storage element while controlling said transducing means and said disengaging means to provide an opportunity for the performance of at least one more transducing operation on a previously released data-storage element in engagement with said operating means, said circuit means further including means automatically operable to prevent said releasing means from releasing a new data-storage element until a previously released element is engaged by said operating means and has reached a predetermined position with respect to said position-sensing means.

8. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operation means capable of engaging a released data-storage element applied thereto and of successively applying the engaged element to said transducing means, disengaging means operable to cause disengagement of an element from said operating means, position-sensing means for sensing the position of an element with respect to said transducing means, and circuit means cooperating with said position-sensing means for controlling the operation of said releasing means, said transducing means and said disengaging means, said circuit means including first means capable of being operated to cause said releasing means to release a selected data-storage element while preventing said transducing means from performing any further transducing operations until the newly released data-storage element reaches a predetermined position with respect to said position-sensing means, said circuit means also including second means capable of being operated as an alternative to the operation of said first means to cause said releasing means to release a selected data-storage element while controlling said transducing means and said disengaging means to provide an opportunity for the performance of at least one more transducing operation on a previously released data-storage element in engagement with said operating means, said circuit means further including means automatically operable in response to the release of a newly selected element by said releasing means to cause said disengaging means to operate to disengage a previously released data-storage element in engagement with said operating means in response to the engaged element next reaching a predetermined position with respect to said position-sensing means, said circuit means still further including means automatically operable to prevent said releasing means from releasing a new data-storage element until a previously released element is engaged by said operating means and has reached a predetermined position with respect to said position-sensing means.

9. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element applied thereto and of successively applying the engaged element to said transducing means, disengaging means operable to cause disengagement of an element from said operating means, means constructed and arranged to cause an element disengaged from said operating means by said disengaging means to be automatically returned to said assembled group, position-sensing means for sensing the position of an element with respect to said transducing means, and circuit means cooperating with said position-sensing means for controlling the operation of said releasing means, said transducing means and said disengaging means, said circuit means including first means capable of being operated to cause said releasing means to release a selected data-storage element while preventing said transducing means from performing any further transducing operations until the newly released data-storage element reaches a predetermined position with respect to said position-sensing means, said circuit means also including second means capable of being operated as an alternative to the operation provided by said first means to cause said releasing means to release a selected data-storage element while controlling said transducing means and said disengaging means to provide an opportunity for the performance of at least one more transducing operation on a previously released data-storage element in engagement with said operating means, said circuit means further including means automatically operable in response to the release of a newly selected element by said releasing means to cause said disengaging means to operate to disengage a previously released data-storage element in engagement with said operating means in response to the engaged element next reaching a predetermined position with respect to said position-sensing means, said circuit means further including means automatically operable to prevent said releasing means from releasing a new data-storage element until a previously released element is engaged by said operating means and has reached a predetermined position with respect to said position-sensing means, said circuit means additionally including means automatically operable to provide a signal indication in the event that upon operation of said second means a previous data-storage element in engagement with said operating means is disengaged therefrom without a transducing operation having been performed.

10. The invention in accordance with claim 9, wherein:

said last-mentioned means is also operable to provide a signal indication in the event that said first means is operated when there is no previous data-storage element in engagement with said operating means.

11. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element applied thereto and of successively applying the engaged element to said transducing means, disengaging means operable to cause disengagement of an element from said operating means, means constructed and arranged to cause an element disengaged from said operating means by said disengaging means to be automatically returned to said assembled group, position-sensing means for sensing the position of an element with respect to said transducing means, and circuit means cooperating with said position-sensing means for controlling the operation of said releasing means, said transducing means and said disengaging means, said circuit means including means automatically operable in response to the release of a newly selected element by said releasing means to cause said disengaging means to operate to disengage a previously released data-storage element in engagement with said operating means in response to the engaged element next reaching a predetermined position with respect to said position-sensing means, said circuit means further including means settable in response to a first electrical signal and resettable in response to a second electrical signal for providing, when set, a signal indication that a released data-storage element is within a predetermined range with respect to said transducing means.

12. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operation means capable of engaging a released data-storage element applied thereto and of successively applying the engaged element to said transducing means, disengaging means operable to cause disengagement of an element from said operating means, means constructed and arranged to cause an element disengaged from said operating means by said disengaging means to be automatically returned to said assembled group, position-sensing means for sensing the position of an element with respect to said transducing means, and circuit means cooperating with said position-sensing means for controlling the operation of said releasing means, said transducing means and said disengaging means, said circuit means including means automatically operable in response to the release of a newly selected element by said releasing means to cause said disengaging means to operate to disengage a previously released data-storage element in engagement with said operating means in response to the engaged element next reaching a predetermined position with respect to said position-sensing means, said circuit means also including means automatically operable to prevent said releasing means from releasing a new data-storage element until a previously released element is engaged by said operating means and has reached a predetermined position with respect to said position-sensing means, said circuit means additionally including means automatically operable to provide an error signal indication in response to the failure of a released data-storage element to reach a predetermined position with respect to said position-sensing means within a predetermined time after the data-storage element has been released.

13. The invention in accordance with claim 12 wherein:

said last-mentioned means is also operable to provide an error signal indication when a released data-storage element does not traverse said position-sensing means within a predetermined time after first reaching said position-sensing means.

14. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element applied thereto and of successively applying the engaged element to said transducing means, disengaging means operable to cause disengagement of an element from said operating means, means constructed and arranged to cause an element disengaged from said operating means by said disengaging means to be automatically returned to said assembled group, position-sensing means for sensing the position of an element with respect to said transducing means, and circuit means cooperating with said position-sensing means for controlling the operation of said releasing means, said transducing means and said disengaging means, said circuit means including first means capable of being operated to cause said releasing means to release a selected data-storage element while preventing said transducing means from performing any further transducing operations until the newly released data-storage element reaches a predetermined position with respect to said position-sensing means, said circuit means also including second means capable of being operated as an alternative to the operation of said first means to cause said releasing means to release a selected data-storage element while controlling said transducing means and said disengaging means to provide an opportunity for the performance of at least one more transducing operation on a previously released data-storage element in engagement with said operating means, said circuit means further including means automatically operable in response to the release of a newly selected element by said releasing means to cause said disengaging means to operate to disengage a previously released data-storage element in engagement with said operating means in response to the engaged element next reaching a predetermined position with respect to said position sensing means, said circuit means still further including means automatically operable to prevent said releasing means from releasing a new data-storage element until a previously released element is engaged by said operating means and has reached a predetermined position with respect to said position-sensing means, said circuit means additionally including means operable independently of said first and second means and in response to an electrical signal to cause said disengaging means to operate to disengage a data-storage element from engagement with said operating means in response to the engaged data-storage element next reaching a predetermined position with respect to said position-sensing means.

15. In combination:

a plurality of individual data-storage elements, means for retaining said elements as an assembled group, releasing means for selectively releasing any one of said elements from said group regardless of its position therein, transducing means capable of performing a transducing operation on a data-storage element applied thereto, operating means capable of engaging a released data-storage element applied thereto and of successively applying the engaged element to said transducing means, disengaging means operable to cause disengagement of an element from said operating means, means constructed and arranged to cause an element disengaged from said operating means by said disengaging means to be automatically returned to said assembled group, position-sensing means for sensing the position of an element with respect to said transducing means, and circuit means cooperating with said position-sensing means for controlling the operation of said releasing means, said transducing means and said disengaging means, said circuit means including first means capable of being operated to cause said releasing means to release a selected data-storage element while preventing said transducing means from performing any further transducing operations until the newly released data-storage element reaches a predetermined position with respect to said position-sensing means, said circuit means also including second means capable of being operated as an alternative to the operation of said first means to cause said releasing means to release a selected data-storage element while controlling said transducing means and said disengaging means to provide an opportunity for the performance of at least one more transducing operation on a previously released data-storage element in engagement with said operation means, said circuit means further including means automatically operable in response to the release of a newly selected element by said releasing means to cause said disengaging means to operate to disengage a previously released data-storage element in engagement with said operating means in response to the engaged element next reaching a predetermined position with respect to said position-sensing means, said circuit means still further including means automatically operable to prevent said releasing means from releasing a new data-storage element until a previously released element is engaged by said operating means and has reached a predetermined position with respect to said position-sensing means, said circuit means additionally including third means operable independently of said first and second means and in response to an electrical signal to cause said disengaging means to operate to disengage a data-storage element from engagement with said operating means in response to the engaged data-storage element next reaching a predetermined position with respect to said position-sensing means, said circuit means further including means automatically operable after a predetermined time period to cause said disengaging means to operate to disengage a data-storage element from engagement with said operating means when disengagement is not otherwise accomplished in response to the operation of said first, second or third means.

16. In combination:
a plurality of individual data-storage elements,
means for retaining said elements as an assembled group,
releasing means for selectively releasing any one of said elements from said group regardless of its position therein,
transducing means capable of performing a transducing operation on a data-storage element applied thereto,
operating means capable of engaging a released data-storage element applied thereto and of successively applying the engaged element to said transducing means,
disengaging means operable to cause disengagement of an element from said operating means,
means constructed and arranged to cause an element disengaged from said operating means by said disengaging means to be automatically returned to said assembled group,
position-sensing means for sensing the position of an element with respect to said transducing means, and
circuit means cooperating with said position-sensing means for controlling the operation of said releasing means, said transducing means and said disengaging means,
said circuit means including means automatically operable in response to the release of a newly selected element by said releasing means to cause said disengaging means to operate to disengage a previously released data-storage element in engagement with said operating means in response to the engaged element next reaching a predetermined position with respect to said position-sensing means,
said circuit means also including means automatically operable to prevent said releasing means from releasing a new data-storage element until a previously released element is engaged by said operating means and has reached a predetermined position with respect to said position-sensing means,
said circuit means further including means providing a busy signal indication from the time that a data-storage element is released to the time when the released element first reaches a predetermined position with respect to said position-sensing means.

17. In combination:
a plurality of individual data-storage elements,
means for retaining said elements as an assembled group,
releasing means for selectively releasing any one of said elements from said group regardless of its position therein,
transducing means capable of performing a transducing operation on a data-storage element applied thereto,
operating means capable of engaging a released data-storage element applied thereto and of successively applying the engaged element to said transducing means,
disengaging means operable to cause disengagement of an element from said operating means,
means constructed and arranged to cause an element disengaged from said operating means by said disengaging means to be automatically returned to said assembled group,
position-sensing means for sensing the position of an element with respect to said transducing means, and
circuit means cooperating with said position-sensing means for controlling the operation of said releasing means, said transducing means and said disengaging means,
said circuit means including means automatically operable in response to the release of a newly selected element by said releasing means to cause said disengaging means to operate to disengage a previously released data-storage element in engagement with said operating means in response to the engaged element next reaching a predetermined position with respect to said position-sensing means,
said circuit means also including means automatically operable to prevent said releasing means from releasing a new data-storage element until a previously released element is engaged by said operating means and has reached a predetermined position with respect to said position-sensing means, said circuit means further including means for providing a ready signal indication from the time that a released data-storage element first reaches a predetermined position with respect to said position-sensing means to the time when said disengaging means operates to cause disengagement of the element from said operating means.

18. In combination:
a plurality of individual data-storage elements,
means for retaining said elements as an assembled group,
releasing means for selectively releasing any one of said elements from said group regardless of its position therein,
transducing means capable of performing a transducing operation on a data-storage element applied thereto,
operating means capable of engaging a released data-storage element applied thereto and of successively applying the engaged element to said transducing means,
platform means actuated in response to a first electrical signal to stop a data-storage element on its way to said operating means and to hold the element at a position just prior to engagement therewith, and deactuated in response to a second electrical signal to permit the data-storage element to continue on its way to said operating means so as to become engaged therewith,
disengaging means operable to cause disengagement of an element from said operating means, and
means constructed and arranged to cause an element disengaged from said operating means by said disengaging means to be automatically returned to said assembled group.

19. In combination:
a plurality of individual data-storage strips of generally rectangular shape,
magazine means for suspending said strips as an assembled group in a generally upright position,
releasing means for selectively releasing any one of said strips so as to permit the released strip to drop from said group regardless of its position therein,
operating means for engaging a dropped strip and capable of successively driving the engaged strip through a transducing region,
transducing means defining said transducing region and capable of performing a transducing operation on a data-storage strip driven through said transducing region by said operating means,
at least one position-sensing means for sensing the position of a strip as the strip passes thereby,
disengaging means operable to cause disengagement of an engaged strip from said operating means,
means constructed and arranged for causing a disengaged strip to be returned to said assembled group, and
circuit means automatically operable in response to the release of a strip by said releasing means to cause said disengaging means to operate to disengage a previously released data-storage strip from engagement with said operating means in response to an engaged strip next reaching a predetermined position with respect to said position-sensing means.

20. In combination:
a plurality of individual data-storage strips of generally rectangular shape,
magazine means for suspending said strips as an assembled group in a generally upright position,
releasing means for selectively releasing any one of said strips so as to permit the released strip to drop from said group regardless of its position therein,
operating means for engaging a dropped strip and capable of successively driving the engaged strip through a transducing region,
transducing means defining said transducing region and capable of performing a transducing operation on a data-storage strip driven through said transducing region by said operating means,
at least one position-sensing means for sensing the position of a strip as the strip passes thereby,
disengaging means operable to cause disengagement of an engaged strip from said operating means,
means constructed and arranged for causing a disengaged strip to be returned to said assembled group, and
circuit means automatically operable in response to the release of a strip by said releasing means to cause said disengaging means to operate to disengage a previously released data-storage strip from engagement with said operating means in response to the engaged strip next reaching a predetermined position with respect to said position-sensing means.

21. In combination:
a plurality of individual data-storage strips of generally rectangular shape,
magazine means for suspending said strips as an assembled group in a generally upright position,
releasing means for selectively releasing any one of said strips so as to permit the released strip to drop from said group regardless of its position therein,
operating means for engaging a dropped strip and capable of successively driving the engaged strip through a transducing region,
transducing means defining said transducing region and capable of performing a transducing operation on a data-storage strip driven through said transducing region by said operating means,
at least one position-sensing means for sensing the position of a strip as the strip passes thereby,
disengaging means operable to cause disengagement of an engaged strip from said operating means,
returning means constructed and arranged for causing a disengaged strip to be returned to said assembled group, and
circuit means cooperating with said position-sensing means for controlling the operation of said releasing means, said transducing means and said disengaging means,
said circuit means including first means automatically operable to prevent said releasing means from releasing a new data-storage strip until a previously released strip is engaged by said operating means and has reached at least one of said position-sensing devices,
said circuit means also including second means automatically operable in response to the release of a strip by said releasing means to cause said disengaging means to operate to disengage a previously released data-storage strip from engagement with said operating means in response to the engaged strip next reaching a predetermined position with respect to said position-sensing means.

22. In combination:
a plurality of individual data-storage strips of generally rectangular shape,
magazine means for suspending said strips as an assembled group in a generally upright position,
releasing means for selectively releasing any one of said strips so as to permit the released strip to drop from said group regardless of its position therein,
operating means for engaging a dropped strip and capable successively driving the engaged strip through a transducing region,
transducing means defining said transducing region and capable of performing a transducing operation on a strip driven through said transducing region by said operating means,
at least one position-sensing means for sensing the position of a strip as the strip passes thereby, disengaging means operable to cause disengagement of an engaged strip from said operating means, and circuit means cooperating with said position-sensing devices for controlling the operation of said releasing means, said transducing means and said disengaging means, said circuit means including first means capable of being operated to cause said releasing means to release a selected data-storage element while preventing said transducing means from performing a transducing operation until the newly released data-storage strip reaches at least one of said position-sensing devices, said circuit means still also including second means capable of being operated as an alternative to the operation of said third means to cause said releasing means to release a selected data-storage strip while controlling said transducing means to provide an opportunity for the performance of at least one more transducing operation on a previously released data-storage strip in engagement with said operating means.

23. In combination:

a plurality of individual data-storage strips of generally rectangular shape, magazine means for suspending said strips as an assembled group in a generally upright position, releasing means for selectively releasing any one of said strips so as to permit the released strip to drop from said group regardless of its position therein, operating means for engaging a dropped strip and capable of driving the engaged strip through a transducing region, transducing means defining said transducing region and capable of performing a transducing operation on a strip passed through said transducing region by said operating means, at least one position-sensing means for sensing the position of a strip as the strip passes thereby, disengaging means operable to cause disengagement of an engaged strip from said operating means, and circuit means cooperating with said position-sensing devices for controlling the operation of said releasing means, said transducing means and said disengaging means, said circuit means including first means capable of being operated to cause said releasing means to release a selected data-storage element while preventing said transducing means from performing a transducing operation until the newly released data-storage strip reaches at least one of said position-sensing devices, said circuit means also including second means capable of being operated as an alternative to the operation of said first means to cause said releasing means to release a selected data-storage element while controlling said transducing means to provide an opportunity for the performance of at least one more transducing operation on a previously released data-storage strip in engagement with said operating means, said circuit means further including means constructed and arranged in conjunction with the construction and arrangement of said disengaging means so that said disengaging means is set to a first position in which an engaged strip is caused to remain engaged with said operating means in response to a released data-storage strip first reaching a predetermined position with respect to said position-sensing means, and so that said disengaging means is set to a second position in which an engaged strip is caused to be disengaged from said operating means in response to the engaged strip next reaching a predetermined position with respect to said position-sensing means following operation of either of said first and second means.

24. In combination:

a plurality of individual data-storage strips of generally rectangular shape, magazine means for suspending said strips as an assembled group in a generally upright position, releasing means for selectively releasing any one of said strips so as to permit the released strip to drop from said group regardless of its position therein, operation means for engaging a dropped strip and capable of driving the engaged strip through a transducing region, transducing means defining said transducing region and capable of performing a transducing operation on a strip passed through said transducing region by said operating means, first and second spaced position-sensing devices defining a minimum-access region in the vicinity of said transducing zone, each position-sensing device being constructed and arranged to sense the position of a strip as the strip passes thereby, disengaging means operable to cause disengagement of an engaged strip from said operating means, means constructed and arranged for causing a disengaged strip to be automatically returned to said assembled group, and circuit means cooperating with said position-sensing devices for controlling the operation of said releasing means, said transducing means and said disengaging means, said circuit means including first means capable of being operated to cause said releasing means to release a selected data-storage element while preventing said transducing means from performing a transducing operation until the newly released data-storage strip reaches at least one of said position-sensing devices, said circuit means also including second means capable of being operated as an alternative to the operation of said first means to cause said releasing means to release a selected data-storage element while controlling said transducing means to provide an opportunity for the performance of at least one more transducing operation on a previously released data-storage strip in engagement with said operating means, said circuit means further including means for providing a signal indication whenever the leading edge of a released strip is between said first and second position-sensing devices so as to indicate that the strip is in said minimum-access region.

25. In combination:

a plurality of individual data-storage strips of generally rectangular shape, magazine means for suspending said strips as an assembled group in a generally upright position, releasing means for selectively releasing any one of said strips so as to permit the released strip to drop from said group regardless of its position therein, operating means for engaging a dropped strip and capable of driving the engaged strip through a transducing region, transducing means defining said transducing region and capable of performing a transducing operation on a strip passed through said transducing region by said operating means, first and second spaced position-sensing devices defining a minimum-access region in the vicinity of said transducing zone, each position-sensing device being constructed and arranged to sense the position of a strip as the strip passes thereby, disengaging means operable to cause disengagement of an engaged strip from said operating means, means constructed and arranged for causing a disengaged strip to be automatically returned to said assembled group, and circuit means coperating with said position-sensing devices for controlling the operation of said releasing means, said transducing means and said disengaging means, said circuit means including means settable in response to a first electrical signal and resettable in response to a second electrical signal for providing an interrupt signal indication whenever the leading edge of a released strip is between said first and second position-sensing devices so as to indicate that the strip is in said minimum-access position.

26. In combination:

a plurality of individual data-storage strips of generally rectangular shape, magazine means for suspending said strips as an assembled group in a generally upright position, releasing means for selectively releasing any one of said strips so as to permit the released strip to drop from said group regardless of its position therein, operating means for engaging a dropped strip and capable of driving the engaged strip through a transducing region, transducing means defining said transducing region and capable of performing a transducing operation on a strip passed through said transducing region by said operating means, position-sensing means for sensing the position of a strip as the strip passes thereby, disengaging means operable to cause disengagement of an engaged strip from said operating means, means constructed and arranged for causing a disengaged strip to be automatically returned to said assembled group, and circuit means cooperating with said position-sensing means for controlling the operation of said releasing means, said transducing means and said disengaging means, said circuit means including first means capable of being operated to cause said releasing means to release a selected data-storage element while preventing said transducing means from performing a transducing operation until the newly released data-storage strip reaches at least one of said position-sensing devices, said circuit means also including second means capable of being operated as an alternative to the operation of said first means to cause said releasing means to release a selected data-storage element while controlling said transducing means to provide an opportunity for the performance of at least one more transducing operation on a previously released data-storage strip in engagement with said operating means, said circuit means further including means automatically operable to provide a wrong strip signal indication in the event that upon operation of said second means a previous data-storage strip in engagement with said operating means is disengaged therefrom without a transducing operation having been performed thereon.

27. In combination:

a plurality of individual data-storage strips of generally rectangular shape, magazine means for suspending said strips as an assembled group in a generally upright position, releasing means for selectively releasing any one of said strips so as to permit the released strip to drop from said group regardless of its position therein, operating means for engaging a dropped strip and capable of successively driving the engaged strip through a transducing region, transducing means defining said transducing region and capable of performing a transducing operation on a data-storage strip driven through said transducing region by said operating means, at least one position-sensing device for sensing the position of a strip as the strip passes thereby, disengaging means operable to cause disengagement of an engaged strip from said operating means, means constructed and arranged for causing a disengaged strip to be returned to said assembled group, and circuit means cooperating with said position-sensing device to provide an error signal indication when a released data-storage strip does not traverse the position-sensing device within a predetermined time after first reaching the device.

28. The invention in accordance with claim 21 wherein: said operating means comprises a rotary capstan means disposed in close cooperative relationship with said transducing means and effective to engage a dropped strip when the strip reaches the capstan means and to transport the engaged strip past said transducing means.

29. The invention in accordance with claim 28 wherein: the velocity of rotation of said capstan means is made sufficient to permit a strip disengaged therefrom to have sufficient momentum to be automatically returned to said assembled group by way of said returning means.

30. The invention in accordance with claim 21 wherein: said returning means includes at least one booster means for maintaining the strip velocity of a disengaged strip so as to permit the disengaged strip to automatically be returned to said assembled group.

31. In combination:

a plurality of individual data-storage strips of generally rectangular shape, magazine means for suspending said strips as an assembled group in a generally upright position, releasing means for selectively releasing any one of said strips so as to permit the released strip to drop from said group regardless of its position therein, operating means for engaging a dropped stip and capable of successively driving the engaged strip through a transducing region, transducing means defining said transducing region and capable of performing a transducing operation on a data-storage strip driven through said transducing region by said operating means, at least one position-sensing means for sensing the position of a strip as the strip passes thereby, disengaging means operable to cause disengagement of an engaged strip from said operating means, means constructed and arranged for causing a disengaged strip to be returned to said assembled group, and platform means operable to stop and hold a dropped data-storage strip just before engagement with said operating means, and thereafter operable to permit the held data-storage strip to complete its fall and become engaged with said operating means.

32. In combination:

a plurality of individual data-storage strips of generally rectangular shape, magazine means for suspending said strips as an assembled group in a generally upright position, releasing means for selectively releasing any one of said strips so as to permit the released strip to drop from said group regardless of its position therein, operating means capable of engaging a dropped strip and of driving the engaged strip through a transducing region, transducing means defining said transducing region and capable of performing a transducing operation on a strip passed through said transducing region by said operating means, first and second spaced position-sensing devices defining a minimum-access region in the vicinity of said transducing zone, each position-sensing device being constructed and arranged to sense the position of a strip as the strip passes thereby, disengaging means operable to cause disengagement of an engaged strip from said operating means, means constructed and arranged for causing a disengaged strip to be automatically returned to said assembled group, and circuit means cooperating with said position-sensing devices for controlling the operation of said releasing means, said transducing means and said disengaging means, said circuit means including first means automatically operable to prevent said releasing means from releasing a new data-storage strip until a previously released strip is engaged by said operating means and has reached at least one of said position-sensing devices, said circuit means also including second means automatically operable in response to the release of a strip by said releasing means to cause said disengaging means to operate to disengage a previously released data-storage strip from engagement with said operating means in response to the engaged strip next reaching a predetermined position with respect to one of said position-sensing devices, said circuit means further including means settable in response to a first electrical signal and resettable in response to a second electrical signal for providing an interrupt signal indication whenever the leading edge of a released strip is between said first and second position-sensing devices so as to indicate that the strip is in said minimum-access position, said circuit means still further including third means capable of being operated to cause said releasing means to release a selected data-storage element while preventing said transducing means from performing a transducing operation until the newly released data-storage strip reaches at least one of said position-sensing devices, said circuit means additionally including fourth means capable of being operated as an alternative to the operation of said first means to cause said releasing means to release a selected data-storage element while controlling said transducing means to provide an opportunity for the performance of at least one more transducing operation on a previously released data-storage strip in engagement with said operating means, said circuit means also including means automatically operable to provide a wrong strip signal indication in the event that upon operation of said third means a previous data-storage strip in engagement with said operating means is disengaged therefrom without a transducing operation having been performed thereon.

33. In combination:

random access storage means constructed and arranged so that a plurality of individual data-storage elements are retained in an assembled group from which any selected one of said elements may be removed regardless of its position in the group and then applied to a transducing zone after which the selectively chosen element is returned to said assembled group, controller means coupled to said random access storage means for producing status signals in response to the operation of said random access storage means, and processor means coupled to said controller means for receiving said status signals therefrom and for producing random access control signals and information signals in a predetermined manner dependent upon the states of said status signals, said controller means being constructed and arranged to apply said random access control signals and said information signals from said processor means to said random access storage means to control the operation thereof, said controller means being further constructed and arranged to coordinate the operation of said processor means and said random access storage means so that when a removed data-storage element in said random access storage means reaches a predetermined position therein as indicated by at least one status signal said processor means are caused to produce predetermined ones of said random access control signals and said information signals so as to permit information to be transferred between said processor means and said random access storage means during the performance of a transducing operation on a selectively removed data-storage element which is selected in accordance with information signals previously applied by said processor means.

34. In combination:

random access storage means constructed and arranged so that a plurality of individual data-storage elements are retained in an assembled group from which any selected one of said elements may be removed regardless of its position in the group and then applied to a transducing region after which the selectively chosen element is returned to said assembled group, said random access storage means including position-sensing means for producing at least one position-indicating signal representing the position of a selectively removed data-storage element with respect to said transducing zone, controller means coupled to said random access storage means for producing status signals in response to the operation of said random access storage means and the position-indicating signal produced by said position-sensing means, and processor means coupled to said controller means for receiving said status signals therefrom and for producing random access control signals and information signals in a predetermined manner dependent upon the states of said status signals, said controller means being constructed and arranged to apply said random access control signals and said information signals from said processor means to said random access storage means to control the operation thereof, said controller means being further constructed and arranged to coordinate the operation of said random access storage means and said processor means so that when a removed data-storage element in said random access storage means reaches a predetermined position therein as indicated by at least one status signal said processor means are caused to produce predetermined ones of said random access control signals and said information signals so as to permit information to be transferred between said processor means and said random access storage means during the performance of a transducing operation on a selectively removed data-storage element which is selected in accordance with information signals previously applied by said processor means.

35. In combination:

random access storage means constructed and arranged so that a plurality of individual data-storage elements are retained in an assembled group from which any selected one of said elements may be removed regardless of its position in the group and then applied to a transducing region after which the selectively chosen element is returned to said assembled group, said random access storage means including position-sensing means for producing at least one position-indicating signal representing the position of a selectively removed data-storage element with respect to said transducing zone, controller means coupled to said random access storage means for producing status signals in response to the operation of said random access storage means and the position-indicating signal produced by said position-sensing means, and processor means coupled to said controller means for receiving said status signals therefrom and for producing random access control signals and information signals in a predetermined manner dependent upon the states of said status signals, said controller means being constructed and arranged to apply said random access control signals and said information signals from said processor means to said random access storage means to control the operation thereof, said controller means being further constructed and arranged to coordinate the operation of said random access storage means and said processor means so that when a removed data-storage element in said random access storage means reaches a predetermined position therein as indicated by at least one status signal said processor means are caused to produce predetermined ones of said random access control signals and said information signals so as to permit information to be transferred between said processor means and said random access storage means during the performance of a transducing operation on a selectively removed data-storage element which is selected in accordance with information signals previously applied by said processor means, said controller means being still further constructed and arranged to cooperate with said processor means and said random access storage means so that both can operate independently of one another when said status signals indicate that a removed data-storage element is not in position for a transducing operation, and can operate in synchronism with one another when said status signals indicate that a removed data-storage element is in position for a transducing operation.

36. In combination:
processor means for producing a plurality of random access control signals and a plurality of information signals in a manner dependent upon the states of a plurality of status signals applied thereto,
a plurality of individual data-storage elements,
means for retaining said elements as an assembled group,
removing means for selectively removing any one of said elements from said assembled group regardless of its position therein,
transducing means for perfroming a transducing operation on a removed data storage element applied thereto,
operation means capable of engaging a removed data-storage element and of applying the engaged element to said transducing means,
disengaging means operable to disengage an element from said operating means,
means constructed and arranged to cause an element disengaged by said operating means to be automatically returned to said assmbled group, and
controller means responsive to said control signals from said processor for controlling said removing means, said transducing means and said disengaging means so that overlapping removal of data-storage elements is achieved in response to predetermined ones of said control signals while only one data-storage element is permitted to be engaged by said operating means at any one time.

37. In combination:
processor means for producing a plurality of random access control signals and a plurality of information signals in a manner dependent upon the states of a plurality of status signals applied thereto,
a plurality of individual data-storage elements,
means for retaining said elements as an assembled group,
removing means for selectively removing any one of said elements from said assembled group regardless of its position therein,
transducing means for performing a transducing operation on a removed data-storage element applied thereto,
operating means capable of engaging a removed data-storage element and of applying the engaged element to said transducing means,
disengaging means operable to disengage an element from said operating means, and
controller means constructed and arranged to produce the status signals applied to said processor means in response to the position of any removed data-storage elements and any previously applied control signals.

38. In combination:
processor means for producing a plurality of random access control signals and a plurality of information signals in a manner dependent upon the states of a plurality of status signals applied thereto,
a plurality of individual data-storage elements,
means for retaining said elements as as assembled group,
removing means for selectively removing any one of said elements from said assembled group regardless of its position therein,
transducing means for performing a transducing operation on a removed data-storage element applied thereto,
operating means capable of engaging a removed data-storage element and of applying the engaged element to said transducing means,
disengaging means operable to disengage an element from said operating means, and
controller means constructed and arranged to produce the status signals applied to said processor means in response to the position of any removed data-storage elements and any previously applied control signals,
said controller means being further constructed and arranged so that said processor means and said transducing means will be caused to be synchronized during the performance of a transducing operation on a data-storage element as a result of the states of said status signals achieving a predetermined pattern.

39. In combination:
processor means for producing a plurality of random access control signals and a plurality of information signals in a manner dependent upon the states of a plurality of status signals applied thereto,
a plurality of individual data-storage element,
means for retaining said data-storage elements as an assembled group,
releasing means for selectively releasing any one of said elements from said assembled group regardless of its position therein,
transducing means for performing a transducing operation on a released data-storage element applied thereto,
operating means capable of engaging a released data-storage element and of successively applying the engaged element to said transducing means,
disengaging means operable to disengage an element from said operating means,
returning means constructed and arranged to cause an element disengaged by said disengaging means to be automatically returned to said assembled group,
position-sensing means for sensing the position of a released data-storage element with respect to said transducing means,
first circuit means cooperating with said position-sensing means for providing a busy status signal indication to said processor means which is caused to be on from the time a data-storage element is released by said releasing means to the time when the released data-storage element reaches a predetermined position with respect to said position-sensing means, and
second circuit means cooperating with said position-sensing means for providing a ready status signal indication to said processor means which is caused to be on from the time that a released data-storage element first reaches a predetermined position with respect to said position-sensing means to the time that said disengaging means is caused to operate to disengage a data-storage element from said operating means,
said processor means including means for checking the states of said busy status signal indication and said ready status signal indication in order to determine the manner in which said control signals and said information signals are to be produced thereby.

40. In combination:
processor means for producing a plurality of random access control signals and a plurality of information signals in a manner dependent upon the states of a plurality of status signals applied thereto,
a plurality of individual data-storage elements,
means for retaining said data-storage elements as an assembled group,
releasing means for selectively releasing any one of said elements from said assembled group regardless of its position therein, said releasing means being operative in response to first and second control signals derived from the control signals produced by said processor means and a plurality of information signals also derived therefrom to select the particular data-storage element which is to be released,
transducing means for performing a transducing operation on a released data-storage element applied thereto in response to at least one control signal derived from said processor means,
operating means capable of engaging a released data-storage element and of successively applying the engaged element to said transducing means,
disengaging means operable to disengage an element from said operating means,
returning means constructed and arranged to cause an element disengaged by said disengaging means to be automatically returned to said assembled group,
position-sensing means for sensing the position of a released data-storage element with respect to said transducing means,
circuit means cooperating with said position-sensing means and responsive to previously applied control signals from said processor for providing status signals to said processor means having states which are dependent upon the position of any released data-storage elements and any previously applied control signals, and
means initiating synchronized operation between said processor means and said transducing means in response to a status signal being turned on by said circuit means to indicate that the proper time has come for the performance of a transducing operation on a data-storage element.

41. In combination:
processor means for producing a plurality of random access control signals and a plurality of information signals in a manner dependent upon the states of a plurality of status signals applied thereto,
a plurality of individual data-storage elements,
means for retaining said data-storage elements as an assembled group,
releasing means for selectively releasing any one of said elements from said assembled group regardless of its position therein, said releasing means being operative in response to first and second control signals derived from the control signals produced by said processor means and a plurality of information signals also derived therefrom to select the particular data-storage element which is to be released,
transducing means for performing a transducing operation on a released data-storage element applied thereto in response to at least one control signal derived from said processor means,
operating means capable of engaging a released data-storage element and of successively applying the engaged element to said transducing means,
disengaging means operable to disengage an element from said operating means,
returning means constructed and arranged to cause an element disengaged by said disengaging means to be automatically returned to said assembled group,
position-sensing means for sensing the position of a released data-storage element with respect to said transducing means,
first circuit means responsive to said first control signal applied to said releasing means and cooperating with said transducing means to prevent the performance of a transducing operation from the time of release of a data-storage element to the time that the data-storage element first reaches a predetermined position with respect to said position-sensing means,
second circuit means responsive to said second control signal applied to said releasing means and cooperating with said transducing means and said disengaging means to provide an opportunity for the performance of at least one more transducing operation on a previously released data-storage element in engagement with said operating means, and
third circuit means cooperating with said position-sensing means and responsive to signals derived from the control signals produced by said processor means for providing status signals to said processor means having states which are dependent upon the position of any released data-storage elements and any control signals previously produced by said processor means.

42. In combination:
processor means for producing a plurality of random access control signals and a plurality of information signals in a manner dependent upon the states of a plurality of status signals applied thereto,
a plurality of individual data-storage elements,
means for retaining said data-storage elements as an assembled group,
releasing means for selectively releasing any one of said elements from said assembled group regardless of its position therein, said releasing means being operative in response to first and second control signals derived from the control signals produced by said processor means and a plurality of information signals also derived therefrom to select the particular data-storage element which is to be released,
transducing means for performing a transducing operation on a released data-storage element applied thereto in response to at least one control signal derived from said processor means,
operating means capable of engaging a released data-storage element and of successively applying the engaged element to said transducing means,
disengaging means operable to disengage an element from said operating means,
returning means constructed and arranged to cause an element disengaged by said disengaging means to be automatically returned to said assembled group, position-sensing means for sensing the position of a released data-storage element with respect to said transducing means, first circuit means responsive to said first control signal applied to said releasing means and cooperating with said transducing means to prevent the performance of a transducing operation from the time of release of a data-storage element to the time that the data-storage element first reaches a predetermined position with respect to said position-sensing means, second circuit means responsive to said second control signal applied to said releasing means and cooperating with said transducing means and said disengaging means to provide an opportunity for the performance of at least one more transducing operation on a previously released data-storage element in engagement with said operating means, fourth circuit means cooperating with said releasing means and responsive to either of said first or second control signals applied to said releasing means to prevent said releasing means from releasing a new data-storage element until a previously released data-storage element first reaches a predetermined position with respect to said position-sensing means, and fifth circuit means cooperating with said disengaging means to automatically release a data-storage element in engagement with said operating means in response to the engaged element next reaching a predetermined position with respect to said position-sensing means following the release of a new data-storage element by said releasing means.

43. In combination:

processor means for producing a plurality of random access control signals and a plurality of information signals in a manner dependent upon the states of a plurality of status signals applied thereto, a plurality of individual data-storage elements, means for retaining said data-storage elements as an assembled group, releasing means for selectively releasing any one of said elements from said assembled group regardless of its position therein, said releasing means being operative in response to first and second control signals derived from the control signals produced by said processor means and a plurality of information signals also derived therefrom to select the particular data-storage element which is to be released, transducing means for performing a transducing operation on a released data-storage element applied thereto in response to at least one control signal derived from said processor means, operating means capable of engaging a released data-storage element and of successively applying the engaged element to said transducing means, disengaging means operable to disengage an element from said operating means, returning means constructed and arranged to cause an element disengaged by said disengaging means to be automatically returned to said assembled group, position-sensing means for sensing the position of a released data-storage element with respect to said transducing means, first circuit means responsive to said first control signal applied to said releasing means and cooperating with said transducing means to prevent the performance of a transducing operation from the time of release of a data-storage element to the time that the data-storage element first reaches a predetermined position with respect to said position-sensing means, second circuit means responsive to said second control signal applied to said releasing means and cooperating with said transducing means and said disengaging means to provide an opportunity for the performance of at least one more transducing operation on a previously released data-storage element in engagement with said operating means, and third circuit means responsive to the second control signal applied to said releasing means for providing a predetermined status signal to said processor means in the event that upon application of said second control signal to said releasing means a previous data-storage element in engagement with said operating means is disengaged therefrom without a transducing operation having been performed thereon.

44. In combination:

processor means for producing a plurality of random access control signals and a plurality of information signals in a manner dependent upon the states of a plurality of status signals applied thereto, a plurality of individual data-storage elements, means for retaining said data-storage elements as an assembled group, releasing means for selectively releasing any one of said elements from said assembled group regardless of its position therein, said releasing means being operative in response to first and second control signals derived from the control signals produced by said processor means and a plurality of information signals also derived therefrom to select the particular data-storage element which is to be released, transducing means for performing a transducing operation on a released data-storage element applied thereto in response to at least one control signal derived from said processor means, operating means capable of engaging a released data-storage element and of successively applying the engaged element to said transducing means, disengaging means operable to disengage an element from said operating means, returning means constructed and arranged to cause an element disengaged by said disengaging means to be automatically returned to said assembled group, first and second spaced position-sensing devices defining a minimum-access region in the vacinity of said transducing zone, each position-sensing device being constructed and arranged to sense the position of a data-storage element as the element passes thereby, and circuit means cooperating with said position-sensing devices and settable in response to a first control signal from said processor means and resettable in response to a second control signal from said processor means for providing an interrupt status signal to said processor means when a released data-storage element is within said minimum-access region.

45. In combination:

processor means and a plurality of random access storage units cooperating therewith, first means in each random access storage unit constructed and arranged so that only the first means of a selected unit is caused to become operative in response to a selection signal and unit number signals applied to each unit from said processor means, second means in each random access storage unit for producing common status signals and individual status signals representing the condition of each unit, said individual status signals in each unit being separately applied to said processor means while said common status signals of each unit are applied to said processor means in parallel with the common status signals of all of the other of said plurality of random access storage units, and means in each unit to permit said common status signals to be on only when the first means in said unit has been made operative.

46. In combination:

processor means and a plurality of random access storage units cooperating therewith, first means in each random access storage unit constructed and arranged so that only the first means of a selected unit is caused to become operative in response to a selection signal and unit number signals applied to each unit from said processor means, second means in each random access storage unit for producing common status signals and individual status signals representing the condition of each unit, said individual status signals in each unit being separately applied to said processor means while said common status signals of each unit are applied to said processor means in parallel with the common status signals of all of the other of said plurality of random access storage units, and means in each unit to permit said common status signals to be on only when the first means in said unit has been made operative, said processor means including means for checking the states of said status signals and for producing control signals and information signals in a manner dependent thereon to control the selection of particular ones of said random access storage units and permit the transfer of data between the processor means and the selected unit when a predetermined pattern of status signals has been received therefrom, said processor means also including means for checking that only the first means of a predetermined random access storage unit has been selected in response to said selection signal and said unit number selection signals.

47. In combination:

processor means for producing a plurality of random access control signals and a plurality of information signals in a manner dependent upon the states of a pluraltiy of status signals applied thereto; and a plurality of random access storage units cooperating with said processor means any one of which may be selected for communication therewith, each random access storage unit comprising:
 a plurality of individual data-storage elements,
 means for retaining said elements as an assembled group,
 removing means for selectively removing any one of said elements from said assembled group regardless of its position therein,
 transducing means for performing a transducing operation on a removed data-storage element applied thereto,
 operating means capable of engaging a removed data-storage element and of applying the engaged element to said transducing means,
 disengaging means operable to disengage an element from said operating means,
 means constructed and arranged to cause an element disengaged by said disengaging means to be automatically returned to said assembled group,
 position-sensing means for sensing the position of a removed data-storage element, and
 controller means cooperating with said position-sensing means and responsive to said control signals from said processor means to control the operation of its respective random access storage unit while producing status signals representing the condition thereof, one of said status signals being an interrupt signal provided in response to the position of a removed element with respect to said position-sensing means for indicating to the processor means that a removed data-storage element in the unit is in a condition such that a transducing operation can be performed thereon with a minimum of delay;

said processor means including means for checking predetermined ones of the status signals of a selected random access unit while being capable of continuously receiving the interrupt signal provided by each unit regardless of which unit is selected for communication with said processor means.

48. A random access storage system comprising in combination:
 a plurality of individual data-storage elements,
 a plurality of random access storage devices each comprising:
  receiving means for receiving data-storage elements,
  retaining means for retaining a plurality of said individual data-storage elements as an assembled group,
  loading means cooperating with said retaining means for automatically loading a data-storage element received by said receiving means in the assembled group in said retaining means,
  removing means for selectively removing any one of said elements from said assembled group regardless of its position therein,
  transducing means for performing a transducing operation on a removed data-storage element,
  operating means capable of engaging a removed data-storage element and of applying the engaged element to said transducing means, and
  disengaging means operable to disengage an element from said operating means; and
 means to which the disengaged data-storage elements from each of said random access storage devices are fed, said means being constructed and arranged to selectively feed a data-storage element applied thereto to the receiving means of predetermined ones of said random access storage devices.

49. A random access storage system comprising in combination:
 a plurality of flexible data-storage strips of generally rectangular shape;
 a plurality of random access storage devices each comprising:
  receiving guide means for receiving data-storage strips applied thereto,
  magazine retaining means for retaining a plurality of said strips as an assembled group in a generally upright position,
  loading means cooperating with said magazine retaining means for automatically loading a data-storage strip received by said receiving means in the assembled group in said retaining means,
  releasing means for selectively releasing any one of said strips from said magazine retaining means so that the released strip drops under the influence of gravity,
  transducing means for performing a transducing operation on a released data-storage strip,
  operating means capable of engaging a dropped strip and of successively applying the engaged strip to said transducing means, and
  disengaging means operable to disengage a strip from said operating means; and
 means to which the disengaged strips from each of said random access storage devices are fed, said means being constructed and arranged to selectively feed a data-storage strip applied thereto to the receiving means of predetermined ones of said random access storage devices.

50. A random access storage system comprising in combination:
 a plurality of flexible data-storage strips of generally rectangular shape;
 a plurality of random access storage devices each comprising:
  receiving guide means for receiving data-storage strips applied thereto, magazine retaining means for retaining a plurality of said strips as an assembled group in a generally upright position, loading means cooperating with said magazine retaining means for automatically loading a data-storage strip received by said receiving means in the assembled group in said retaining means, releasing means for selectively releasing any one of said strips from said magazine retaining means so that the released strip drops under the influence of gravity, transducing means for performing a transducing operation on a released data-storage strip, operating means capable of engaging a dropped strip and of successively applying the engaged strip to said transducing means, and disengaging means operable to disengage a strip from said operating means, platform means operable to stop and hold a dropped data-storage strip just before engagement with said operating means, and thereafter operable to permit the held data-storage strip to continue to fall and become engaged with said operating means; and means to which the disengaged strips from each of said random access storage devices are fed, said means being constructed and arranged to selectively feed a data-storage strip applied thereto to the receiving means of predetermined ones of said random access storage devices.

51. The invention in accordance with claim 49 wherein:
said operating means comprises a rotary capstan means disposed in close cooperative relationship with said transducing means and effective to engage a dropped strip when the strip reaches the capstan means and to transport the engaged strip past said transducing means.

52. The invention in accordance with claim 49 wherein:
said last-mentioned means includes at least one booster means for maintaining the velocity of a strip in its passage therethrough.

53. The invention in accordance with claim 49 wherein:
said last-mentioned means includes at least one direction-controlling gate means to control the manner in which a data-storage element is passed therethrough.

54. The invention in accordance with claim 19 wherein:
each of said data storage strips is of the magnetic type capable of storing binary data thereon, said operating means is a rotary capstan disposed in close cooperative relationship with said transducing means and effective to engage a dropped strip when the strip reaches the capstan and to transport the engaged strip past said transducing means, said transducing means includes a plurality of magnetic read and write heads for permitting reading from and writing into selected portions of a data-storage strip, said disengaging means is constructed and arranged to operate so that when said disengaging means is in a first position an engaged strip is caused to recirculate on said capstan and when said disengaging means is in a second position an engaged strip is caused to be disengaged from said capstan, and said returning means includes guide means for guiding a disengaged strip back to said assembled group and loading means for loading a disengaged strip back into said retaining means.

55. A method of controlling a plurality of data-storage strips comprising the steps of:
suspending said strips as an assembled group,
releasing any selected one of said strips so as to permit the selected strip to drop from said group regardless of its position therein,
engaging the dropped strip after it has fallen a predetermined distance and applying the engaged strip to a transducing means,
releasing a new data-storage strip from said assembled group while the previous data-storage strip is still engaged,
disengaging the previous data-storage strip prior to engagement of the new data-storage strip, and
automatically returning each disengaged strip back to said assembled group.

56. The method of controlling a plurality of data-storage strips comprising the steps of:
suspending said strips as an assembled group,
releasing any selected one of said strips so as to permit the selected strip to drop from said group regardless of its position therein,
engaging the dropped strip after it has fallen a predetermined distance and applying the engaged strip to a transducing means,
releasing a new data-storage strip from said assembled group while the previous data-storage strip is still engaged,
disengaging the previous data-storage strip prior to engagement of the new data-storage strip,
automatically disengaging the new strip in the event that the next strip is not released to initiate disengagement thereof within a predetermined time, and
automatically returning each disengaged strip back to said assembled group.

57. The method of controlling a plurality of data-storage strips comprising the steps of:
suspending said strips as an assembled group,
releasing any selected one of said strips so as to permit the selected strip to drop from said group regardless of its position therein,
engaging the dropped strip after it has fallen a predetermined distance and successively appyling the engaged strip to a transducing means,
sensing the position of the engaged strip with respect to said transducing means,
releasing a new data-storage strip after the previously released strip has been sensed at least once while in engagement with said transducing means,
disengaging the previous data-storage strip prior to engaging the newly released strip,
automatically returning each disengaged strip back to said assembled group, and
performing a transducing operation on a strip in response to the sensing of a predetermined position of the strip with respect to said transducing means.

58. The method of controlling a plurality of data-storage strips comprising the steps of:
suspending said strips as an assembled group,
releasing any selected one of said strips so as to permit the selected strip to drop from said group regardless of its position therein,
engaging the dropped strip after it has fallen a predetermined distance and successively applying the engaged strip to a transducing means,
sensing the position of the engaged strip with respect to said transducing means,
releasing a new data-storage strip after the previously released strip has been sensed at least once while in engagement with said transducing means,
disengaging the previous data-storage strip prior to engaging the newly released strip,
automatically returning each disengaged strip back to said assembled group,
providing status signals representing the position of a released strip in response to the sensing of the strip during said engaging, and
performing a transducing operation on a strip in response to the status signals achieving a predetermined pattern.

59. The method of controlling a plurality of data-storage strips comprising the steps of:
 suspending said strips as an assembled group,
 releasing any selected one of said strips so as to permit the selected strip to drop from said group regardless of its position therein,
 engaging the dropped strip after it has fallen a predetermined distance and successively applying the engaged strip to a transducing means,
 releasing a new data-storage strip from said assembled group while the previous data-storage strip is still engaged,
 performing a transducing operation on the previous engaged strip prior to engagement of the newly released strip only if the release of the new strip was accompanied by a predetermined electrical signal,
 disengaging the previous data-storage strip prior to engagement of the newly released strip, and
 automatically returning each disengaged strip back to said assembled group.

60. The method of controlling a plurality of data-storage strips comprising the steps of:
 suspending said strips as an assembled group in each of a plurality of devices,
 releasing selected ones of said strips from their respective assembled groups in selected ones of said devices in a manner so that each selected strip drops from its respective group regardless of its position therein,
 engaging each of the dropped strips after it has fallen a predetermined distance and applying the engaged strip to a respective transducing means,
 sensing the position of each engaged strip with respect to its respective transducing means,
 releasing an additional selected one of said strips from at least one group from which a previous strip was released,
 disengaging each of the previous engaged strips prior to engagement of the newly released strip in each respective device,
 automatically returning each engaged strip back to its respective assembled group, and
 performing a transducing operation on an engaged strip in response to the sensing of a predetermined position of the strip with respect to said transducing means.

References Cited by the Examiner
UNITED STATES PATENTS

| | | | |
|---|---|---|---|
| 2,602,451 | 7/1952 | Hofgaard | 340—174.1 |
| 3,029,021 | 4/1962 | Azari et al. | 271—5 |
| 3,104,099 | 9/1963 | Checketts et al. | 271—5 |

ROBERT C. BAILEY, *Primary Examiner.*

MALCOLM A. MORRISON, *Examiner.*

UNITED STATES PATENT OFFICE
CERTIFICATE OF CORRECTION

Patent No. 3,238,509                            March 1, 1966

Joerg E. Schnoor et al.

It is hereby certified that error appears in the above numbered patent requiring correction and that the said Letters Patent should read as corrected below.

Column 2, line 20, for "understsood" read -- understood --; column 5, line 6, for "diagarams" read -- diagrams --; column 12, line 35, for "two" read -- into --; column 14, line 8, for "i", in italics, read -- 60i --; column 16, line 56, after "position-sensing" insert -- means --; column 18, line 23, for "$_2$" read -- $M_2$ --; column 20, line 7, for "head" read -- read --;

column 21, line 48, for "Of" read -- If --; line 59, after "Drop", second occurrence, insert -- Strip --; column 22, line 17, for "stauts" read -- status --; line 36, for "on" read -- of --; column 24, line 26, for "controler" read -- controller --; column 25, line 71, for "seim-circle" read -- semi-circle --; column 28, line 49, for "(T3'D)" read --(T3') --; column 29, line 44, for "(Su)" read -- (SU) --; column 35, line 31, for "$u_1$-$4u_8$" read -- $u_1$-$u_8$ --; line 34, strike out "nals $u_1$-$u_8$, these will be applied to a unit decoded 401"; column 37, line 6, for "of" read -- or --; line 33, for "6" read -- 3 --; column 38, line 12, for "WWR" read -- WR --; line 46, for "signal" read -- signals --; line 69, for "40" read -- 400 --; column 42, line 2, after "turning" insert -- on --; column 44, line 43, for "Red" read -- Read --; column 47, line 13, and column 48, line 18, for "60j", each occurrence, read -- 60i --; column 48, line 52, for "to" read -- the --; column 51, line 72, for "190.0" read -- 190.00 --; column 53, line 21, for "caust srtip" read -- cause strip --; line 28, for "reached" read -- reach --; column 71, line 4, for "coperating" read -- cooperating --; column 75, line 57, for "perfroming" read -- performing --; line 67, for "assmbled" read -- assembled --; column 76, line 30, for "as", second occurrence, read -- an --; line 60, for "element" read -- elements --; column 80, line 40, for "vacinity" read -- vicinity --; column 84, line 38, for "appyling" read -- applying --.

Signed and sealed this 24th day of January 1967.

• (SEAL)
Attest:

ERNEST W. SWIDER                                   EDWARD J. BRENNER
Attesting Officer                                       Commissioner of Patents